(12) United States Patent  (10) Patent No.: US 8,433,755 B2
Garcia, Jr. et al.  (45) Date of Patent: Apr. 30, 2013

(54) DYNAMIC DESIGNATION OF A CENTRAL DISTRIBUTOR IN A MULTI-PARTICIPANT CONFERENCE

(75) Inventors: Roberto Garcia, Jr., Sunnyvale, CA (US); Hyeonkuk Jeong, Saratoga, CA (US); Nirav Patel, Sunnyvale, CA (US); Berkat S. Tung, Rancho Cordova, CA (US); Joe S. Abuan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 12/832,057

(22) Filed: Jul. 7, 2010

(65) Prior Publication Data
US 2011/0252090 A1 Oct. 13, 2011

Related U.S. Application Data

(60) Provisional application No. 61/321,868, filed on Apr. 7, 2010.

(51) Int. Cl.
G06F 15/16 (2006.01)
(52) U.S. Cl.
USPC ............................ 709/204; 370/260; 709/227
(58) Field of Classification Search ................ 370/94.3, 370/260, 254; 709/220
See application file for complete search history.

(56) References Cited

U.S. PATENT DOCUMENTS

| | | | |
|---|---|---|---|
| 4,847,829 A | 7/1989 | Tompkins et al. | |
| 5,392,285 A * | 2/1995 | Kurts | 370/407 |
| 5,513,182 A * | 4/1996 | Kawamura et al. | 370/254 |
| 5,533,112 A | 7/1996 | Danneels | |
| 5,548,346 A | 8/1996 | Mimura et al. | |
| 5,604,738 A | 2/1997 | Shibata et al. | |
| 5,646,678 A | 7/1997 | Bonja et al. | |
| 5,838,664 A | 11/1998 | Polomski | |
| 5,896,128 A | 4/1999 | Boyer | |
| 5,933,417 A | 8/1999 | Rottoo | |
| 5,936,662 A | 8/1999 | Kim et al. | |

(Continued)

FOREIGN PATENT DOCUMENTS

| | | |
|---|---|---|
| EP | 0 744 857 | 11/1996 |
| EP | 1 875 769 | 1/2008 |

(Continued)

OTHER PUBLICATIONS

U.S. Appl. No. 10/877,507, filed Jun. 25, 2004, Arthur, Bruce, et al.

(Continued)

*Primary Examiner* — Wing F Chan
*Assistant Examiner* — Kostas Katsikis
(74) *Attorney, Agent, or Firm* — Meyertons, Hood, Kivlin, Kowert & Goetzel, P.C.

(57) ABSTRACT

Some embodiments dynamically designate one of several network nodes as a network hub of a star network, at the start of a network communication session among the several network nodes that is facilitated by a mesh network and the star network. Some embodiments dynamically designate a new network hub when the previously designated network hub leaves the communication session, which continues among the other network nodes. Different embodiments use different techniques to dynamically designate the network hub of the star network. For instance, some embodiments use communications transmitted along the mesh network to dynamically identify the network hub at the start of the network communication session or after the departure of a previously designated network hub.

26 Claims, 29 Drawing Sheets

U.S. PATENT DOCUMENTS

| | | | |
|---|---|---|---|
| 5,953,049 A | 9/1999 | Horn et al. | |
| 6,008,838 A | 12/1999 | Iizawa | |
| 6,025,870 A * | 2/2000 | Hardy | 348/14.1 |
| 6,097,707 A * | 8/2000 | Hodzic et al. | 370/321 |
| 6,167,033 A | 12/2000 | Chang et al. | |
| 6,167,432 A | 12/2000 | Jiang | |
| 6,496,216 B2 | 12/2002 | Feder et al. | |
| 6,624,841 B1 | 9/2003 | Buchner et al. | |
| 6,633,985 B2 | 10/2003 | Drell | |
| 6,697,341 B1 | 2/2004 | Roy | |
| 6,697,476 B1 | 2/2004 | O'Malley et al. | |
| 6,728,221 B1 | 4/2004 | Shaffer et al. | |
| 6,744,460 B1 | 6/2004 | Nimri et al. | |
| 6,757,005 B1 | 6/2004 | Elbaz et al. | |
| 6,760,749 B1 | 7/2004 | Dunlap et al. | |
| 6,882,971 B2 | 4/2005 | Craner | |
| 6,915,331 B2 | 7/2005 | Fuller et al. | |
| 6,989,856 B2 | 1/2006 | Firestone et al. | |
| 7,096,037 B2 | 8/2006 | Canova, Jr. et al. | |
| 7,266,091 B2 | 9/2007 | Singh et al. | |
| 7,280,492 B2 | 10/2007 | Magnuski | |
| 7,313,593 B1 | 12/2007 | Pulito et al. | |
| 7,321,382 B2 | 1/2008 | Okajima et al. | |
| 7,328,240 B2 | 2/2008 | El-Gebaly et al. | |
| 7,362,349 B2 | 4/2008 | Nelson et al. | |
| 7,379,450 B2 | 5/2008 | Gu et al. | |
| 7,421,471 B2 | 9/2008 | Van Datta | |
| 7,454,460 B2 | 11/2008 | Ivashin | |
| 7,474,326 B2 | 1/2009 | Le Pennec | |
| 7,474,634 B1 | 1/2009 | Webster et al. | |
| 7,492,387 B2 | 2/2009 | Yang et al. | |
| 7,577,110 B2 | 8/2009 | Zimmermann et al. | |
| 7,606,181 B1 | 10/2009 | Whynot et al. | |
| 7,627,678 B2 | 12/2009 | Van Datta et al. | |
| 7,653,250 B2 | 1/2010 | Jeong et al. | |
| 7,692,682 B2 | 4/2010 | Pun et al. | |
| 7,817,180 B2 | 10/2010 | Jeong et al. | |
| 7,864,209 B2 | 1/2011 | Jeong et al. | |
| 7,881,235 B1 | 2/2011 | Arthur et al. | |
| 7,899,170 B2 | 3/2011 | Jeong et al. | |
| 7,949,117 B2 | 5/2011 | Jeong et al. | |
| 8,095,120 B1 * | 1/2012 | Blair et al. | 455/416 |
| 2001/0019354 A1 | 9/2001 | Einarsson et al. | |
| 2002/0126626 A1 | 9/2002 | Singh et al. | |
| 2002/0154210 A1 | 10/2002 | Ludwig et al. | |
| 2002/0156919 A1 * | 10/2002 | Maeno | 709/238 |
| 2003/0217158 A1 * | 11/2003 | Datta | 709/228 |
| 2004/0022202 A1 | 2/2004 | Yang et al. | |
| 2004/0028199 A1 | 2/2004 | Carlson | |
| 2004/0215722 A1 | 10/2004 | Mukherjee | |
| 2005/0018828 A1 | 1/2005 | Nierhaus et al. | |
| 2005/0086273 A1 * | 4/2005 | Loebbert et al. | 707/204 |
| 2005/0097169 A1 | 5/2005 | Mukherjee et al. | |
| 2005/0099492 A1 | 5/2005 | Orr | |
| 2005/0132044 A1 * | 6/2005 | Guingo et al. | 709/225 |
| 2005/0286443 A1 | 12/2005 | McMillen et al. | |
| 2006/0029092 A1 | 2/2006 | Luo et al. | |
| 2006/0146737 A1 * | 7/2006 | Ohrstrom Sandgren et al. | 370/261 |
| 2006/0187860 A1 | 8/2006 | Li | |
| 2006/0244812 A1 | 11/2006 | Jeong et al. | |
| 2006/0245377 A1 * | 11/2006 | Jeong et al. | 370/260 |
| 2006/0245378 A1 | 11/2006 | Jeong et al. | |
| 2006/0245379 A1 * | 11/2006 | Abuan et al. | 370/261 |
| 2006/0247045 A1 | 11/2006 | Jeong et al. | |
| 2007/0162612 A1 * | 7/2007 | Paggen | 709/238 |
| 2007/0201381 A1 * | 8/2007 | Ekl et al. | 370/254 |
| 2008/0143818 A1 * | 6/2008 | Ferren et al. | 348/14.08 |
| 2008/0204542 A1 * | 8/2008 | Ferren et al. | 348/14.08 |
| 2008/0219277 A1 * | 9/2008 | Pratap et al. | 370/406 |
| 2008/0316297 A1 * | 12/2008 | King et al. | 348/14.09 |
| 2009/0252315 A1 | 10/2009 | Ratmanski et al. | |
| 2009/0303902 A1 * | 12/2009 | Liu et al. | 370/254 |
| 2010/0017606 A1 | 1/2010 | Bradley et al. | |
| 2010/0189178 A1 | 7/2010 | Pun et al. | |
| 2010/0225736 A1 * | 9/2010 | King et al. | 348/14.09 |
| 2010/0321469 A1 | 12/2010 | Jeong et al. | |
| 2011/0074914 A1 | 3/2011 | Jeong et al. | |
| 2011/0116409 A1 | 5/2011 | Jeong et al. | |
| 2011/0187813 A1 * | 8/2011 | Musgrave | 348/14.09 |
| 2011/0205332 A1 | 8/2011 | Jeong et al. | |
| 2011/0252157 A1 | 10/2011 | Garcia, Jr. et al. | |
| 2011/0252319 A1 | 10/2011 | Garcia, Jr. et al. | |
| 2012/0069134 A1 | 3/2012 | Garcia, Jr. et al. | |

FOREIGN PATENT DOCUMENTS

| | | |
|---|---|---|
| EP | 1 877 148 | 1/2008 |
| EP | 1 878 229 | 1/2008 |
| EP | 1 936 996 | 6/2008 |
| EP | 11192109 | 12/2011 |
| EP | 11192110 | 12/2011 |
| EP | 2439945 | 4/2012 |
| EP | 12164796 | 4/2012 |
| EP | 2457625 | 5/2012 |
| GB | 2 313 250 | 11/1997 |
| JP | 2001-128132 | 5/2001 |
| WO | WO 99/62259 | 12/1999 |
| WO | WO 2006/116644 | 11/2006 |
| WO | WO 2006/116659 | 11/2006 |
| WO | WO 2006/116750 | 11/2006 |
| WO | WO 2007073234 A1 * | 6/2007 |

OTHER PUBLICATIONS

U.S. Appl. No. 12/643,958, filed Dec. 21, 2009, Jeong, Hyeonkuk, et al.

U.S. Appl. No. 12/832,046, filed Jul. 7, 2010, Garcia Jr., Roberto, et al.

U.S. Appl. No. 12/832,049, filed Jul. 7, 2010, Garcia Jr., Roberto, et al.

U.S. Appl. No. 12/870,780, filed Aug. 27, 2010, Jeong, Hyeonkuk, et al.

Portions of prosecution history of U.S. Appl. No. 11/118,931, Aug. 2, 2010, Jeong, Hyeonkuk, et al.

Portions of prosecution history of U.S. Appl. No. 11/118,554, Dec. 1, 2009, Jeong, Hyeonkuk, et al.

Portions of prosecution history of U.S. Appl. No. 11/118,932, Mar. 24, 2010, Abuan, Joe, et al.

Portions of prosecution history of U.S. Appl. No. 11/118,555, Aug. 2, 2010, Jeong, Hyeonkuk, et al.

Portions of prosecution history of U.S. Appl. No. 11/118,297, Jul. 30, 2010, Jeong, Hyeonkuk, et al.

Portions of prosecution history of U.S. Appl. No. 11/118,553, Sep. 9, 2010, Jeong, Hyeonkuk, et al.

Portions of prosecution history of U.S. Appl. No. 11/118,615, Jan. 12, 2010, Pun, Thomas, et al.

International Search Report and Written Opinion of PCT/US2006/016123, Sep. 26, 2008 (mailing date), Apple Computer, Inc.

International Preliminary Report on Patentability of PCT/US2006/016123, Apr. 28, 2009 (issuance date), Apple Computer, Inc.

International Search Report and Written Opinion of PCT/US2006/016469, Sep. 18, 2006 (mailing date), Apple Computer, Inc.

International Preliminary Report on Patentability of PCT/US2006/016469, Oct. 30, 2007 (issuance date), Apple Computer, Inc.

EP Search Report of EP 06 75 1923.1, Oct. 14, 2009 (mailing date), Apple Computer, Inc.

International Search Report and Written Opinion of PCT/US2006/016169, Oct. 16, 2008 (mailing date), Apple Computer, Inc.

International Preliminary Report on Patentability of PCT/US2006/016169, Nov. 27, 2008 (issuance date), Apple Computer, Inc.

Triebel, Tonio, et al., "Peer-to-peer Voice Communication for Massively Multiplayer Online Games", 6$^{th}$ IEEE Conference on Consumer Communications and Networking Conference, Jan. 10-13, 2009, pp. 1-5.

Updated portions of prosecution history of U.S. Appl. No. 13/099,331, Mar. 21, 2012, Jeong, Hyeonkuk, et al.

Updated portions of prosecution history of U.S. Appl. No. 12/702,287, Feb. 3, 2012, Pun, Thomas, et al.

Updated portions of prosecution history of EP06769904, Dec. 27, 2011 (mailing date), Apple Inc.

Portions of prosecution history of EP11192109, Mar. 8, 2012 (mailing date), Apple Inc.

Updated portions of prosecution history of EP06758716, Jan. 25, 2012 (filing date), Apple Inc.
Updated portions of prosecution history of EP08075236, Jan. 26, 2012 (filing date), Apple Inc.
Portions of prosecution history of U.S. Appl. No. 13/011,848, Mar. 29, 2012, Jeong, Hyeonkuk, et al.
Updated portions of prosecution history of U.S. Appl. No. 13/099,331, Apr. 2, 2012, Jeong, Hyeonkuk, et al.
Updated portions of prosecution history of U.S. Appl. No. 12/702,287, May 3, 2012, Pun, Thomas, et al.
Portions of prosecution history of U.S. Appl. No. 12/832,046, Jun. 21, 2011, Garcia, Jr., Robert, et al.
Portions of prosecution history of U.S. Appl. No. 12/832,049, Jun. 21, 2011, Garcia, Jr., Robert, et al.
Portions of prosecution history of EP11192110, Apr. 25, 2012 (mailing date), Apple Inc.
U.S. Appl. No. 13/099,331, filed May 2, 2011, Jeong, Hyeonkuk, et al.
Updated portions of prosecution history of U.S. Appl. No. 11/118,931, Jan. 14, 2011, Jeong, Hyeonkuk, et al.
Updated portions of prosecution history of U.S. Appl. No. 11/118,554, Dec. 9, 2009, Jeong, Hyeonkuk, et al.
Updated portions of prosecution history of U.S. Appl. No. 11/118,555, Dec. 2, 2010, Jeong, Hyeonkuk, et al.
Portions of prosecution history of U.S. Appl. No. 12/955,902, Jan. 24, 2011, Jeong, Hyeonkuk, et al.
Updated portions of prosecution history of U.S. Appl. No. 11/118,297, Apr. 21, 2011, Jeong, Hyeonkuk, et al.
Portions of Prosecution history of U.S. Appl. No. 13/099,331, Jun. 2, 2011, Jeong, Hyeonkuk, et al.
Updated portions of prosecution history of U.S. Appl. No. 11/118,553, Sep. 21, 2010, Jeong, Hyeonkuk, et al.
Updated portions of prosecution history of U.S. Appl. No. 11/118,615, Feb. 16, 2010, Pun, Thomas, et al.
Portions of prosecution history of U.S. Appl. No. 12/702,287, Nov. 5, 2010, Pun, Thomas, et al.
Portions of prosecution history of EP 06769904.1, Feb. 23, 2011, Apple Inc.
Updated portions of prosecution history of EP 06751923.1, Feb. 18, 2010, Apple Inc.
Portions of prosecution history of EP 06758716.2, Jun. 28, 2011, Apple Inc.
Portions of prosecution history of EP 08075236.3, Jun. 28, 2011, Apple Inc.
Thom, Gary, A., "H.323: The Multimedia Communications Standard for Local Area Networks," IEEE Communications Magazine, Dec. 1, 1996, pp. 52-56, vol. 34, No. 12, IEEE.
Updated portions of prosecution history of U.S. Appl. No. 11/118,932, Jun. 13, 2012, Abuan, Joe, et al.
Portions of prosecution history of U.S. Appl. No. 12/870,780, Jun. 13, 2012, Jeong, Hyeonkuk, et al.
Updated portions of prosecution history of U.S. Appl. No. 12/702,287, May 25, 2012, Pun, Thomas, et al.
U.S. Appl. No. 13/543,733, filed Jul. 6, 2012, Jeong, Hyeonkuk, et al.
Updated portions of prosecution history of U.S. Appl. No. 13/011,848, Jun. 27, 2012, Jeong, Hyeonkuk, et al.
Updated portions of prosecution history of U.S. Appl. No. 13/099,331, Jul. 9, 2012, Jeong, Hyeonkuk, et al.
Updated portions of prosecution history of U.S. Appl. No. 12/870,780, Jul. 10, 2012, Jeong, Hyeonkuk, et al.
Updated portions of prosecution history of U.S. Appl. No. 12/702,287, Jul. 19, 2012, Pun, Thomas, et al.
Portions of prosecution history of EP12164796, Jun. 27, 2012, Apple Inc.

* cited by examiner

DYNAMIC DESIGNATION OF A CENTRAL DISTRIBUTOR IN A MULTI-PARTICIPANT CONFERENCE

CLAIM OF BENEFIT TO PRIOR APPLICATION

This Application claims the benefit of U.S. Provisional Patent Application 61/321,868, entitled "Multi-Participant Conference," filed Apr. 7, 2010.

CROSS REFERENCE TO RELATED APPLICATIONS

This Application is related to the following applications: U.S. patent application Ser. No. 12/832,046, filed Jul. 7, 2010; and U.S. patent application Ser. No. 12/832,049, filed Jul. 7, 2010.

BACKGROUND

With proliferation of general-purpose computers, many networks have been implemented to connect the computers. Many different types of data are exchanged between the computers through the networks. Examples of such data types include audio data, video data, text data, picture data, game data, and/or other media data.

Different networks have different topologies. Examples of such network topologies include mesh networks, star networks, bus networks, ring networks, tree networks, etc. A mesh network allows several network nodes (i.e., several computers connected by the network) to route signals to several other nodes, and thereby allows network nodes to connect to each other via one or more hops through other network nodes. In a star network, each network node is connected to a central hub, so that all traffic that traverses the network passes through the central hub. In a bus network, all network nodes are connected to a single bus communication line, and a signal from one node travels in both directions of the bus until it finds a destination node. A ring network connects its network nodes in a closed loop or ring, and a signal from one node passes through each node in one direction of the ring until it finds a destination node. In a tree network, each network node is connected to a central hub through which all traffic that traverse the network passes, but some nodes are connected to the central hub via several hierarchies of intermediate hubs.

Different networks have different advantages and disadvantages. To establish communication between sets of computing devices, most solutions establish one type of network between the computing devices. Accordingly, these solutions enjoy certain advantages provided by their choice of network while also suffering from the disadvantages of their chosen network.

BRIEF SUMMARY

Some embodiments of the invention use several different types of networks to relay several different types of media content among several different computing devices (such as desktop computers or mobile computing devices). The media content of some embodiments is data that a computing device can process in order to provide a presentation of the media content to a user of the device. Examples of types of such media content include audio data, video data, text data, picture data, game data, and/or other media data.

In some embodiments, two different networks relay media content of two different types among multiple computing devices. Specifically, in some embodiments, a first network routes among the computing devices one type of media data content (e.g., game data), while a second network routes among the computing devices another type of media data content (e.g., audio and/or video data of game participants).

The two networks differ in some embodiments based on their topology. For example, in some embodiments, the first network is a mesh network, while the second network is a star network. A mesh network allows several network nodes (i.e., several computing devices connected by the network) to route signals to several other nodes, and thereby allows network nodes to connect to each other via one or more hops through other network nodes. In a star topology, each network node is connected to a central hub, so that all traffic that traverses the network passes through the central hub. Some embodiments use a particular type of star network, called a focus point network, which has a network hub (i.e., a focus node) that processes (e.g., composites) all the data that it receives from the other networks nodes before re-transmitting that data to the other network nodes.

Some embodiments provide a method that dynamically designates one of the network nodes as a network hub (e.g., as a focus node) of the star network (e.g., of the focus-point network), at the start of a network communication session among the network nodes that is facilitated by the mesh and star networks. In some embodiments, this method also dynamically designates a new network hub when the previously designated network hub leaves the communication session, which continues among the other network nodes. This method uses different techniques in different embodiments to dynamically designate the network hub of the star network. For instance, the method of some embodiments uses communications transmitted along the mesh network to dynamically identify the network hub at the start of the network communication session or after the departure of a previously designated network hub.

In some embodiments, a computing device designated as a network hub of the star network receives audio signals from computing devices of participants in an audio chat session. The network hub generates a composite signal for each participant using the received signals. To generate each of these signals, the network hub performs a number of operations including decoding, buffering, additional processing, mixing, encoding, etc. Some of these operations are especially costly, in that their performance consumes substantial computational resources (e.g., CPU cycles, memory, etc.) of the focus point computing device.

In some embodiments, audio processing performed by the network hub can be optimized in a manner that reduces the amount of computational resources needed to process the received audio signals. Some embodiments optimize the audio processing by accounting for silent participants. In some embodiments, a silent participant is either (i) a participant that is not presently speaking or otherwise making noise or (ii) a participant whose audio is muted with respect to another participant.

The network hub of some embodiments improves its audio processing performance by selectively bypassing some or all of the operations that would have been performed to generate mixed audio signals. In some situations, the network hub sends an audio signal from a first participant to a second participant without processing or mixing the audio signal. In other situations, the network hub sends a single mixed audio signal to multiple participants.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
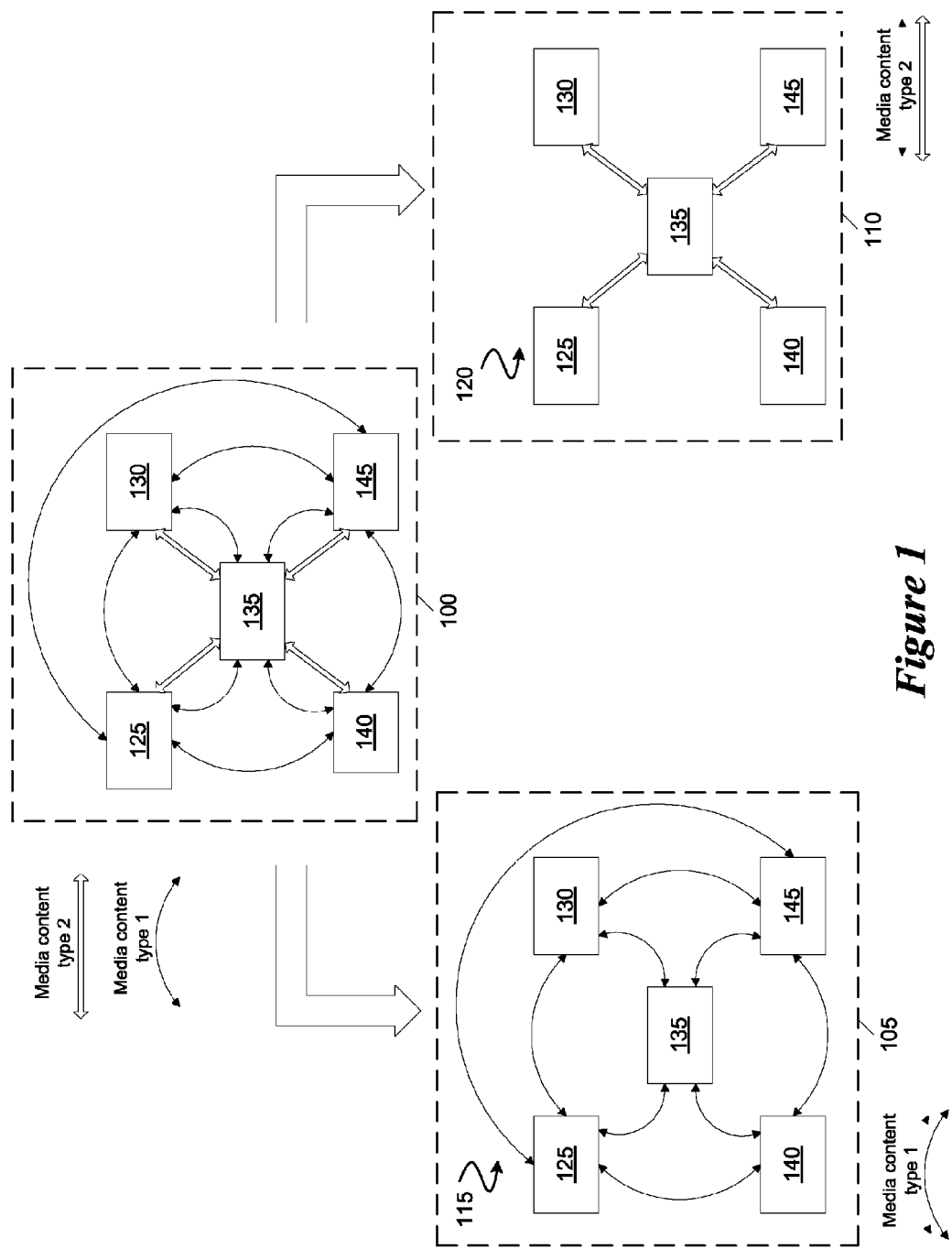
FIG. 1 illustrates an example of a multi-network approach to relay several different types of media content among several different computing devices.

Some embodiments of the invention use several different types of networks to relay several different types of media content among several different computing devices. FIG. 1 illustrates one example of such a multi-network approach. Specifically, it illustrates two different networks 115 and 120 that relay media content of two different types among five different computing devices 125-145.

FIG. 1 illustrates this dual network approach in terms of three views: (1) a combined view 100 of the two networks 115 and 120 connecting the five computing devices 125-145, (2) a spotlight view 105 of the first network 115 connecting these computing devices, and (3) a spotlight view 110 of the second network 120 connecting these computing devices.

Computing devices 125-145 are devices that can perform computational operations, and that can exchange data with other computing devices through networks to which they can connect. Examples of such computing devices include desktop computers, mobile devices, etc. A desktop computer is generally a computer intended for use in one location. A mobile device broadly refers to, without limitation, a cellular phone, a smart phone, a personal digital assistant ("PDA"), a wireless email system (e.g., a BlackBerry™ handheld device), a portable computer, portable electronic music device (e.g., an MP3 player), a portable electronic game device (a PlayStation™ Portable) or any device that can be easily moved around by a person.

In the example illustrated in FIG. 1, the computing devices 125-145 are in a communication session to exchange data with each other. Specifically, in FIG. 1, the computing devices 125-145 are exchanging media content of at least two different types through two different networks 115 and 120.

The media content of some embodiments is data that a computing device can process in order to provide a presentation of the media content to a user of the device. Examples of types of such media content include audio data, video data, text data, picture data, game data, and/or other media data.

In the example illustrated in FIG. 1, the network 115 routes among the computing devices one of these media data types (e.g., game data), while the network 120 routes among the computing devices another one of these media data types (e.g., audio and/or video data of game participants). A network is a collection of devices (e.g., computers, routers, switches, etc.) that is connected by communication interconnects (e.g., wireless connections and/or wired interconnects).

A network facilitates communications among other computing devices and allows these other devices to share resources.

A network is typically depicted as a collection of point-to-point links between the computing devices connected by the network. The network is a physical network when each point-to-point link of a network presents an actual wired or wireless direct connection between a pair of computing devices. The network is a logical network when one or more of the point-to-point links between pairs of computing devices does not represent an actual direct connection between one or more pairs of computing devices, but instead represents only logical connections that indicate the passing of data between the pairs of computing devices. In the example illustrated in FIG. 1, the networks 115 and 120 can be either physical networks or logical networks.

The links that are established in a physical or logical network might be ephemeral links that exist during a single communication session. In other words, each point-to-point communication link can be a communication-session connection between two computing devices that disappears upon termination of the session.

Physical or logical networks are often characterized by their network architectures. Different network architectures have different network topologies that specify different arrangement of communication links between the computing devices and different attributes for these communication links For instance, one communication link between two devices can be a uni-directional link that specifies that data is only exchanged in one direction between the two devices (i.e., one device only sends data while the other device only receives data), while another communication link between two devices can be a bi-directional link that specifies that the two devices can send and receive data to each other.

Through the arrangement and properties of their specified links, different network topologies provide different schemes for distributing data among the computing devices in their networks. Specifically, a topology for a network specifies a scheme for each computing device in the network for distributing to other computing devices in the network its data (e.g., its media content data) and in some cases the data (e.g., the media content data) of one or more other computing device devices in the network. For instance, different types of network topologies include mesh networks, star networks, bus networks, ring networks, tree networks, etc., and each of these provides a different network topology that specifies a different scheme for each device to distribute its own data and in some cases the data of other devices to the other devices in their networks.

In the example illustrated in FIG. 1, the network 115 is a mesh network, while the network 120 is a star network. A mesh network specifies is a type of network topology that allows several nodes in the network (e.g., computing device connected by the network) to route their own data and the data of other nodes to several other nodes. With mesh networks, computing devices can connect to each other via one or more hops through other computing devices on the network (i.e., computing devices connected by the network can serve to relay data between other computing devices connected by the network).

In a star network, the network topology specifies one node as a central hub of the network and specifies a link between this central hub and each other network node. Through these links, all data that traverses the network passes through the central hub, in contrast to a mesh network. The central hub often routes the data that it receives from one node to another node and it is the only node in the network that can pass the data of one node to another node. The central hub can also send its own data to other nodes. It may also act as a signal booster or repeater.

In FIG. 1, the spotlight view 105 provides an illustration of the mesh network 105 that allows the computing devices 125-145 to exchange a first type of media content. In this example, the mesh network 115 includes nine links that interconnect the five computing devices 125-145. Each of these links is illustrated as a curved line. Through each link, a computing device can send media content to the computing device at the other end of the link, or to a computing device that directly connects, or indirectly connects through other links, to the computing device at the other end of the link. For example, computing device 130 can exchange media content with computing device 145 through the link between these two devices. Also, despite no link existing between computing devices 130 and 140, the media content from computing device 130 can reach computing device 140 through the link that connects devices 130 and 145 and the link that connects devices 145 and 140.

The spotlight view 110 of FIG. 1 provides an illustration of the star network 120 that allows the computing devices 125-145 to exchange a second type of media content. In this example, the star network 110 has four links (each represented by a hollow line) that interconnect each of the devices 125, 130, 140 and 145 with the device 135, which serves as the hub of the network. As the hub, the computing device 135 can receive media content of the second type from the other computing devices, and it can distribute the received media content to other computing devices. The computing devices 125, 130, 140 and 145 are not allowed to be connected to any other computing device other than computing device 130 in such a star network.

Several more detailed embodiments are provided below by reference to mesh and star networks. However, irrespective of the examples provided above and below, one of ordinary skill will realize that other embodiments might use other combination of networks to distribute different types of media content. For instance, other embodiments might use other pairs of network topologies (e.g., mesh and ring networks) to distribute different types of media content. As mentioned above, different network topologies provide different schemes for their computing devices to route their own data as well as the data of other devices amongst the devices. For instance, while a star network only allows one computing device to route the data of other computing devices, and a mesh network allows more than one computing device to route the data of more than one other computing devices to more than one other computing devices, a ring network allows each computing device to send the content of other computing devices to at most one other computing device. A ring network also only allows each computing device to receive the content of other computing devices through at most one other computing device.

In several embodiments described below, the mesh and star networks are created to allow multiple players to play a game. In these embodiments, the mesh network is used to allow the exchange of game data between the players, while the star network is used to relay audio and/or video data from the participants of the games. One of ordinary skill will realize that instead of using the dual network approach of some embodiments to exchange game and audio/video data, other embodiments might use such an approach to exchange other types of media content.

Before describing the dual network approach for exchanging game and related audio/video data in Section II, Section I below describes the use of a mesh network to exchange game data, and the use of a particular star network (called a focus point network) to exchange audio data. Finally, Section III describes conducting an audio/video conference using the mesh and focus point networks of some embodiments.

I. Mesh Network and Focus Point Network

As described above, some embodiments simultaneously connect several computing devices using two or more different network topologies. In some embodiments, the computing devices use a mesh network to exchange game data while also using a star network to exchange audio data. Some such embodiments use a specific type of star network referred to as a focus point network. A focus point network, as will be described in further detail below, enables all of the computing devices to obtain data captured by other computing devices, through the computing device at the center of the star (the focus point device), which may perform additional processing on the data that originated from one non-focus device before re-transmitting that data to one or more of the non-focus devices.

A. Mesh Network

A mesh network, as described above, is a network topology in which several of the computing devices have links established with multiple other computing devices. In a mesh network, each computing device is able to send data to and receive data from each of the other nodes, either directly or through one or more of the other computing devices in the network. That is, a first computing device that connects through a direct link to a second computing device in the mesh network may only be able to connect to a third computing device through one or more other computing devices in the network. The setup and operation of such mesh networks of some embodiments are described in U.S. patent application Ser. No. 12/832,003, entitled "Apparatus and Method for Inviting Users to Online Sessions," with Attorney Docket number 4860P8547, filed concurrently with the present application. This U.S. patent application Ser. No. 12/832,003, entitled "Apparatus and Method for Inviting Users to Online Sessions," is incorporated herein by reference.

Figure 2:
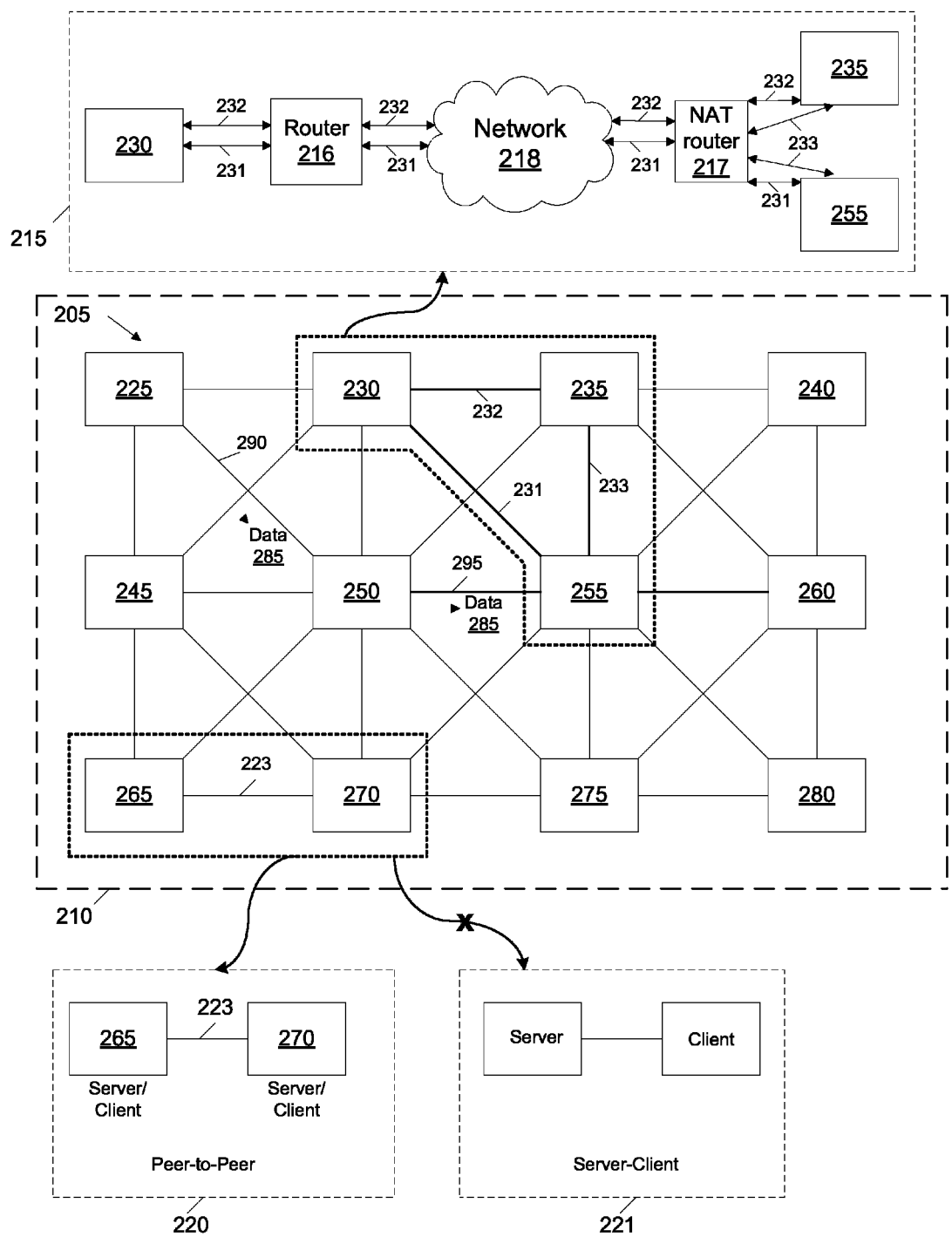
FIG. 2 illustrates a mesh network of some embodiments.

FIG. 2 illustrates such a mesh network 205 of some embodiments. FIG. 2 illustrates a mesh network in terms of three views: (1) a view 210 of the mesh network 205, (2) a first exploded view 215 of three computing devices 230, 235, and 255 and the network links between them, and (3) a second exploded view 220 of two computing devices 265 and 270 and the network link between them.

As shown in the view 210, the mesh network 205 has numerous links (depicted as straight lines) that route game data between twelve computing devices 225-280. As described above by reference to FIG. 1, each computing device in the mesh network can relay game data to another computing device in the mesh network whether or not the two computing devices are directly connected to each other.

For example, as shown in the view 210, the computing device 225 connects directly to devices 230, 245, and 250 in the mesh network. However, in order for the device 225 to send game data to the device 255, the data must take a path through at least one of the other devices. As shown in the view 210, one of these paths is along the link 290 from the device 225 to the device 250 and then along the link 295 from the device 250 to the device 255. The device 225 could also transmit game data to the device 255 through the device 230, or through a combination of devices (e.g., the device 245 and the device 270). Some embodiments will generally transmit data on a path that uses the least number of links, while some embodiments transmit data on a path with the least time delay. Other embodiments use other metrics, or take other approaches (e.g., more random approaches) to send game data through the mesh.

The computing devices connected by the links in a mesh network (e.g., the links 290 and 295) may be in different relationships and of different configurations in different embodiments. Exploded views 215 and 220 illustrate examples of such different relationships and configurations of computing devices connected by links in the mesh network 205, while exploded view 221 illustrates an example of a relationship that cannot exist in the mesh network 200 in some embodiments of the invention.

Specifically, the views 220 and 221 illustrate two possible types of relationships between two computing devices that have a direct network link. The exploded view 220 illustrates a peer-to-peer relationship between the two computing devices 265 and 270 connected by a link 223. As shown, each of the computing devices 265 and 270 acts as a server for the other computing device by making resources available to the other computing device. Conversely, each of the two computing devices is a client to the other, using the other's resources. This mutual server-client relationship is known as a peer-to-peer relationship. In some embodiments, the links in a mesh network are all such peer-to-peer links.

The exploded view 221 illustrates a server-client relationship that cannot exist between two computing devices that are connected by the mesh network in some embodiments. Under the server-client approach, a first computing device (i.e., the server) takes a request for a specific resource from a second computing device (i.e., the client) and provides the requested resource to the second computing device. The second computing device, however, could not handle requests from the first computing device nor could it make its resources available to the first computing device. As mentioned above, the mesh network 205 of some embodiments does not include server-client links as the computing devices may need to be on equal standing with each other. Accordingly, FIG. 2 pictorially illustrates that the link 223 cannot be established in terms of a server/client link shown in exploded view 221.

Although server/client links cannot be used in some embodiments, the peer-to-peer link between two computing devices might have a different configuration than the link configuration illustrated in exploded view 220. For instance, these link configurations may involve one or more intermediaries (e.g., different types of routers, etc.). Exploded view 215 illustrates two such peer-to-peer link configurations.

The exploded view 215 illustrates that three links 231-233 between three computing devices 230, 235, and 255 are formed by two routers 216 and 217 and a network 218. The network 218 is a network to which multiple routers are connected in order to pass data to each other. Network 218 can be a local area network, a wide area network, a network of networks (such as the Internet), or any combination of such networks.

The two routers 216 and 217 are different types of routers, and highlight the fact that different routers may be present between the computing devices of the mesh network 205. The router 217 is a Network Address Translation (NAT) router, which enables multiple computing devices to share a public IP address for sending and receiving data. One example of a NAT router is a wired or wireless router, such as that commonly used for home or office networks. One or more computing devices of a mesh network may be located behind a particular NAT router. For instance, devices 235 and 255 are located behind the NAT router 217. That is, these two devices connect to external networks and devices through the NAT router 217.

Different types of NAT routers may be used in different embodiments. For example, some NAT routers only route outgoing data that is sent from a computing device behind the router to an external computing device. Such NAT routers do not route incoming data that is sent from an external computing device to a computing device behind the router. A NAT router of some type routes incoming data only if outgoing data has previously been sent to the external computing device that is sending the incoming data. A NAT router of another type routes incoming data from any external computing device as long as a computing device behind the router has ever sent out outgoing data through the router. Some NAT routers also route data internally between computing devices (e.g., the computing devices 235 and 255) behind the router. As such, there is a wide variety of NAT router behaviors that account for so many different types of NAT routers.

In some cases, the computing devices may not be tied to a specific NAT router and can connect to external networks through any such local router that gives the device permission. The network router 216 is an example of such a local router. This network router 216 routes data from one computing device to another computing device (e.g., based on an IP address specified in the data) and thereby enables the computing devices to establish a link between each other. In general, network routers do not impose any restrictions on the computing devices whose data they route, and will transmit any data they receive.

The routers 216 and 217 are communicatively coupled to the network 218. The NAT router 217 provides a connection to the network 218 for the devices 235 and 255, while the network router 216 provides a connection to the network 218 for the computing device 230. Accordingly, the computing device 230 exchanges data with either the computing device 255 or the computing device 235 through the router 216, the network 218 and the NAT router 217.

When the NAT router 217 receives such data, it routes the data to the computing device 235 or 255. By doing so, the NAT router enables the establishment of a link between the devices 230 and 235/255. However, in some cases, the NAT router is unable to establish multiple connection links with the devices connected through the network 218. For example, the NAT router 217 may be a type of NAT router that prevents a computing device behind it from establishing an additional connection link after a certain number of connection links are established for that computing device. If computing device 235 had reached a limit imposed by the NAT router 217, no more links can be established between computing devices 230 and 255.

Having described a first type of network that connects multiple computing devices, another type of network that connects the multiple computing devices will now be described in subsection B below.

B. Focus Point Network

As described above, a focus point network is a specific type of star network. In some embodiments, a focus point network is utilized to transmit audio data. In a focus point network of these embodiments, a computing device serving as the focus point receives audio data from the other computing devices in the network, processes the received audio data and its own audio data generated by the computing device, and distributes the processed data to the other computing devices. That is, a first computing device designated as a focus point receives audio data from a second computing device and a third computing device, processes the received audio data and the first computing device's own audio data, and distributes the processed data to the second and third computing devices.

1. Focus Point Architecture

Figure 3:
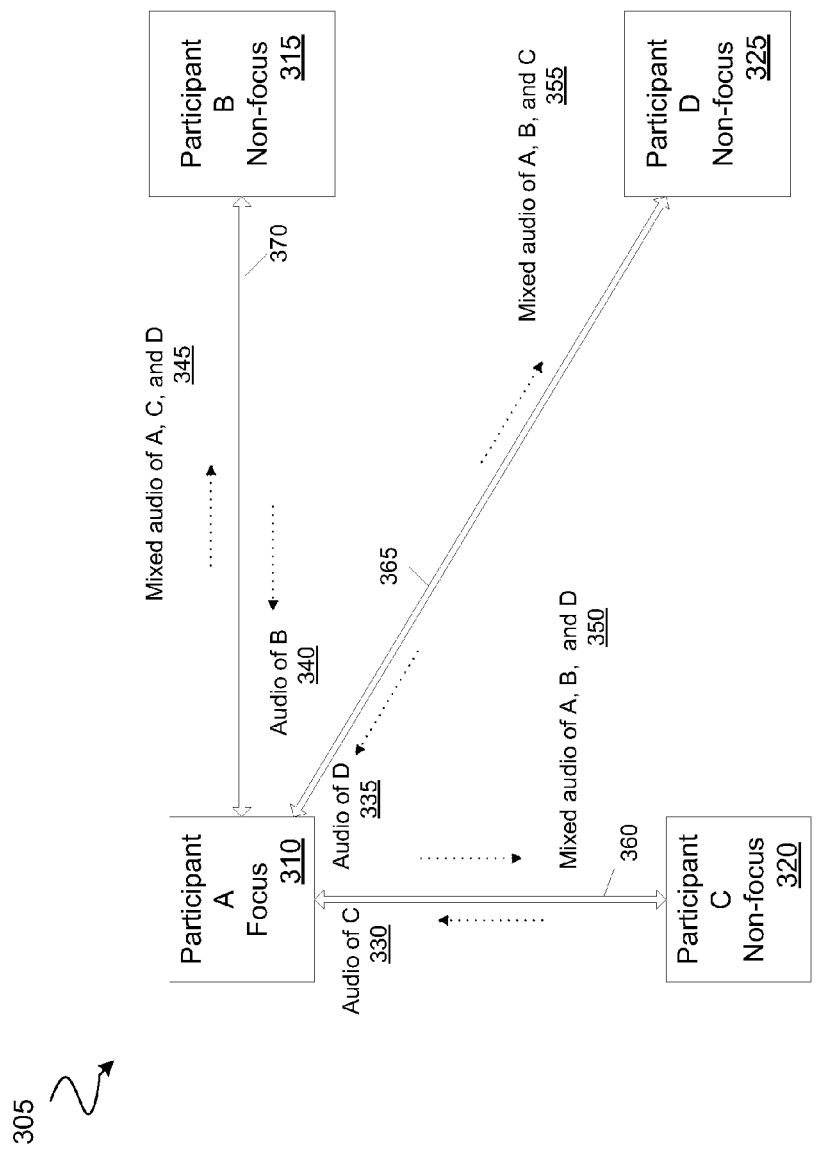
FIG. 3 illustrates a focus network of some embodiments.

FIG. 3 illustrates a focus point network 305 that is used in some embodiments to exchange audio data among four computing devices 310-325 (of four participants A, B, C, and D) that are being used to play a game. In this example, it is assumed that the game data is being relayed among the computing devices along a mesh network, such as the one described above by reference to FIG. 2.

As shown in FIG. 3, the focus point network 305 includes three communication links 360-370 for connecting the four computing devices 310-325, in order to supply audio signals 330-340 to a focus point computing device, and to transmit mixed audio signals 345-355 from the focus point computing device. In this example, the computing device 310 is the focus point computing device of the focus point network 305. The computing device 310 receives the audio signals 330-340 from the computing devices 315-325, mixes the signals, and distributes the mixed audio signals 345-355 to the computing devices 315-325.

The computing devices 315-325 are non-focus computing devices of the focus point network 325. These computing devices send their audio signals to the focus computing device 310 and receive the mixed audio signals from the focus computing device 310. In some embodiments, the audio signals 330-340 are audio signals converted from the voices of the participants using the computing devices. The mixed audio signals 345-355 are participants' audio signals mixed by the computing device 310. This mixing operation by a focus computing device will be described further below.

In order to start an audio conference, some embodiments require a focus point network to be set up between the computing devices of the participants. U.S. Patent Application Publication No. 2006/0245378 entitled, "Multi-Participant Conference Setup", filed Apr. 28, 2005, hereinafter "'378 Application" describes how some embodiments set up a multi-participant audio chat through a focus-point network, such as the one illustrated in FIG. 3. The '378 application is incorporated herein by reference.

The operation of the focus point network 305 will now be described. When the audio chat is set up during a game session, the non-focus point the computing devices 315-325 send their audio signals 330-340 to the focus point computing device 310. As the central distributor of audio signals, the focus computing device 310 then receives the audio signals. With the received audio signals 330-340 and the audio signal of the participant A generated by the focus point computer 310, the focus computing device 310 generates the mixed audio signals 345-355. The focus computing device 310 compresses and transmits the mixed audio signals 345-355 to each of the non-focus computing devices 315, 320, and 325, respectively.

As shown in FIG. 3, the focus point computing device 310 of some embodiments removes a particular non-focus participant's audio signal from the mixed audio signal that the focus point computing device 310 transmits to the particular non-focus participant. In such embodiments, the focus point computing device 310 removes each participant's own audio signal from its corresponding mixed audio signal in order to eliminate echo when the mixed audio is played on the participant computer's loudspeakers. Specifically, FIG. 3 shows that (1) for participant B, the mixed audio signal 345 does not have participant B's own audio signal 340, (2) for participant C, the mixed audio signal 350 does not have participant C's own audio signal 330, and (3) for participant D, the mixed audio signal 355 does not have participant D's own audio signal 335.

Having described a focus point network used to transmit audio signals between the computing devices in the network, how a focus point computing device of the network processes the audio signals will now be described.

2. Audio Processing

The audio processing in the computing devices in a focus point network is performed by audio processing applications that execute on each computing device. Each audio processing application in some embodiments includes two modules, a focus point module and a non-focus point module, that enable each application to allow its corresponding computing device to perform both focus and non-focus point operations. In some embodiments, the audio processing application is an application that runs on top of an operating system of its corresponding computing device.

During a multi-participant chat, the audio processing application uses the focus point module when the application serves as the focus point of the chat, and uses the non-focus point module when not serving as the focus point. The focus point module performs focus point audio-processing operations when the audio processing application is the focus point of a multi-participant audio chat. On the other hand, the non-focus point module performs non-focus point audio-processing operations when the application is not the focus point of the chat. In some embodiments, the focus and non-focus point modules share certain computing resources (e.g., decoders, encoders, etc.).

Figure 4:
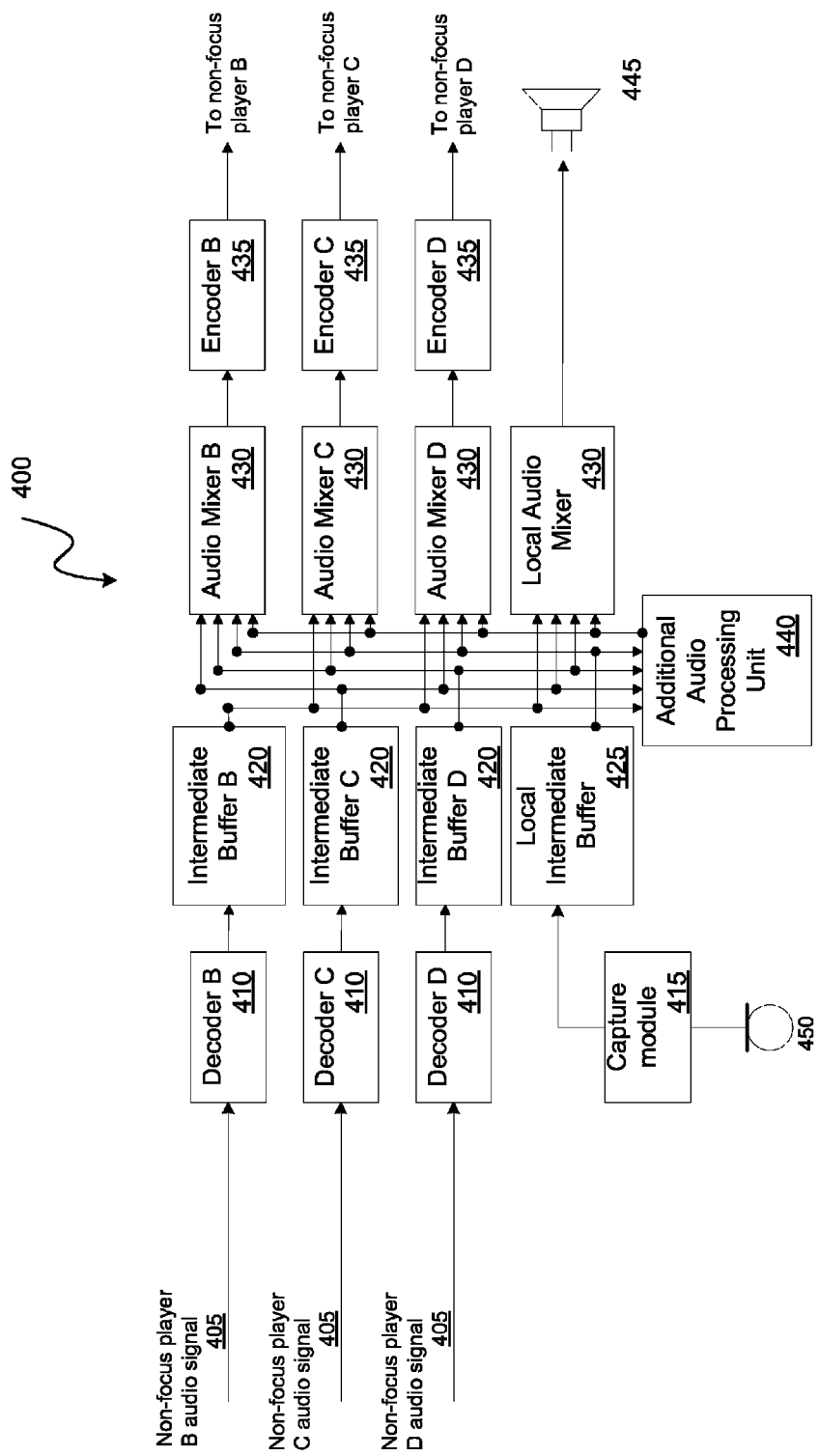
FIG. 4 illustrates a focus point module of some embodiments.

For some embodiments of the invention, FIG. 4 illustrates an audio codec 400 of the focus-point module of the audio processing application of some embodiments. This audio codec is used by the focus point computing device 310 to process the audio signals that it captures and receives. The focus audio codec 400 generates mixed audio signals for transmitting to the non-focus computing devices 315-320, and performs audio presentation for the participant A who is using the focus point computing device 310 during the audio chat.

FIG. 4 illustrates that the audio codec 400 includes decoders 410, intermediate buffers 420, audio mixers 430, encoders 435, audio processing unit 440, and a local capture module 415. Each decoder 410 receives an audio signal 405 from a computing device of a participant through a link of the focus point network 305, decodes the signal, and sends the decoded signal to one of the intermediate buffers 420. Each intermediate buffer 420 stores the decoded audio signal until it is ready to send the signal to the additional audio processing unit 440 and the corresponding audio mixers 430 for other participants.

The local capture module 415 captures audio received from the participant A through a microphone 450. Participant A uses the focus point computing device to participate in the chat session. The capture module 415 converts the audio received through the microphone into an audio signal. The local intermediate buffer 425 stores the converted audio signal until it is ready to send the signal to the additional audio processing unit 440 and the corresponding audio mixers 430 for other participants.

The additional audio processing unit 440 performs certain additional processing of the audio signal and sends the result to the corresponding audio mixers 430 in some embodiments. The '378 application describes some examples of such additional audio processing. One example is calculation of signal strength indicia corresponding to the strength of each received signal.

Each audio mixer 430 receives decoded signals and the additional audio processing results and generates mixed audio signals for one of the participants. In some embodiments, the mixed audio signal for each particular participant includes all participants' audio signals except the particular participant's audio signal. Eliminating a particular participant's audio signal from the mixed signal sent to the particular participant eliminates echo when the mixed audio is played on the participant computer's speaker or speakers.

Each audio mixer 430 mixes the audio signals by generating a weighted sum of these signals. In some embodiments, the weights are dynamically determined based on the calculated signal strength indicia to achieve certain objectives. An example of such objectives include the elimination of weaker signal, which are typically attributable to noise. Further details of the audio signal mixing process are described in the '378 application. The audio mixer 430 then sends the mixed signal to the corresponding encoder 435 or to the local speaker or speakers 445 to be played for the participant using the focus point computer.

Each encoder 435 receives a mixed signal from the corresponding audio mixer 430, encodes the signal, and sends the encoded signal to the corresponding computing device of the non-focus participant.

The operation of audio codec 400 during a multi-participant audio chat will now be described. During its audio mixing operation, two or more decoders 410 receive two or more audio signals 405 containing digital audio samples from two or more non-focus point modules of the non-focus computing devices of the participants in the chat. The decoders 410 decode and store the decoded audio signals in two or more intermediate buffers 420. In some embodiments, the decoder 420 that receives each non-focus computer's audio signal uses a decoding algorithm that is appropriate for the audio codec used by the non-focus computer. This decoder is specified during the process that sets up the audio chat in some embodiments.

The focus audio codec 400 also captures audio from the participant that is using the focus point computing device, through the microphone 450 and audio capture module 415. The focus audio codec stores the captured audio signal from the focus-point participant A in the local immediate buffer 425. Next, the additional audio processing unit 440 performs additional audio processing for each set of audio samples stored in the intermediate buffers and sends its output to audio mixers 430. As described above, this processing may include calculation of signal strength indicia corresponding to the strength of each received signal.

The audio codec 400 then utilizes the audio mixers 430 to mix the buffered audio signals based on the output of the additional audio processing unit in some embodiments. Each of the audio mixers 430 generates mixed audio signals for one of the participants. In some embodiments, the mixed audio signal for each particular participant includes all participants' audio signals except the particular participant's audio signal. The audio mixers 430 of some embodiments then mix the audio signals by generating a weighted sum of these signals as described above.

Next, the encoders 435 encode the mixed audio signals and send them to their corresponding non-focus computing devices. Each particular encoder is specified, corresponding to a particular non-focus computing device, when the particular non-focus computing device begins to send its audio signal to the focus computing device. The mixed audio signal for the focus point computer is sent unencoded to the local loud speaker 445 in some embodiments.

Having described a mesh network utilized to transmit game data, and a focus network utilized to transmit audio data between the computing devices of the network, the following Section II will now describe in detail how these two networks can be utilized to conduct a voice chat among multiple participants while they are playing a multiplayer game.

II. Dual Networks for Game and Chat Data

As described above, some embodiments use two (or more) networks to transmit multiple types of data between multiple game participants. Examples of such games can include a multiplayer car racing game such as Real Racing®, a multiplayer strategy game such as Robocalypse®, etc. Some embodiments provide a mesh network for transmitting game data between the devices and a separate focus network for transmitting audio data for audio chat among the players.

Figure 5:
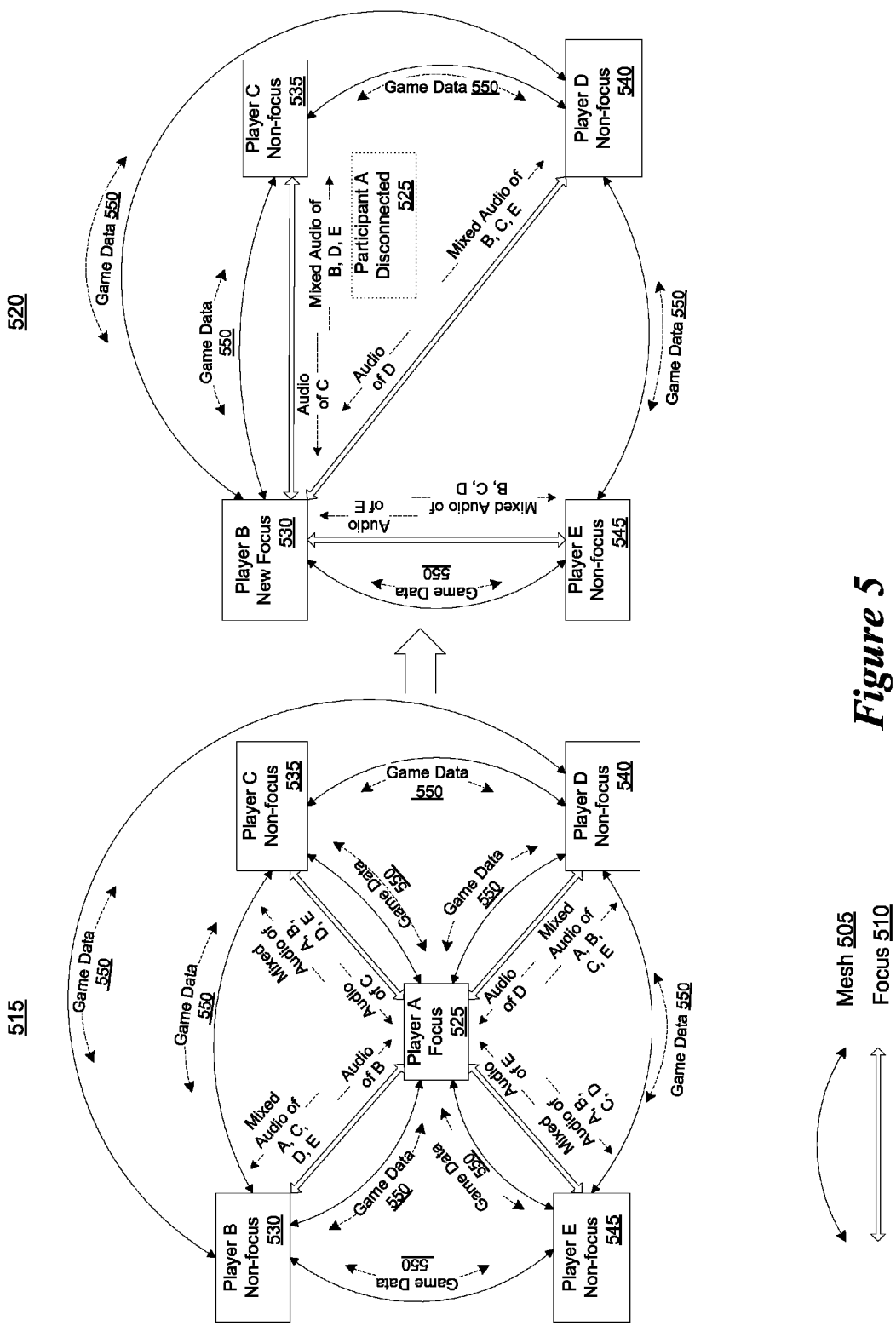
FIG. 5 illustrates some embodiments that use two networks to relay game data and audio data between multiple computing devices.

FIG. 5 illustrates one example of game session that is facilitated through such a dual network approach. In this example, a first network 505 is a mesh network for routing game data and a second network 510 is a focus network for routing audio data. In some embodiments, the mesh network is first set up, and then the focus network is set up once one of the participants initiates a chat. To set up the focus network, some embodiments designate a focus point device, and in case this device leaves the network (e.g., when its user shuts off the device or leaves the game), some of these embodiments dynamically designate a new focus point with minimal interruption to the chat among the players.

FIG. 5 illustrates the game session in two stages 515 and 520. The first stage 515 shows five players A, B, C, D and E (i) playing a game together through the mesh network 505 and their computing devices 525-545, and (ii) chatting through the focus point network 510 with the computing device 525 serving as the focus point computing device. The second stage 520 shows four players B, C, D, and E continuing their game after player A departs from the game. The second stage 520 further shows that after player A's departure, the computing device 530 (of player B) is dynamically identified and designated as the focus point device, in order to allow the audio chat among the players to continue through this device and the focus point network.

As shown in the first stage 515, the five players A-E are playing their game together using their computing devices (e.g. media player, smart phone, personal computer, etc.) through the mesh network 505 (i.e., the computing devices are exchanging game data through the mesh network 505). Each thin curved line depicts a link between two computing devices in the mesh network 505. Each hollow straight line depicts a link between two computing devices in the focus network 510. In some embodiments, these links are established in similar manner as the links described above in Section I.A. by reference to FIG. 2.

In order to play a game together, the game data 550 of each computing device must reach each of the other computing devices of the participants in the game. Without the game data for a first player, the first player's representation in the game (e.g., a car in an auto racing game) will not be properly rendered on a second player's computing device. Different games will transmit different data between the participants. For instance, an auto racing game will transmit the speed, track position, direction, fuel level, etc. of a player's car as game data. Other types of multiplayer games will transmit different game data about the players' representations in the game.

As described above, a mesh network provides a reliable way of exchanging data (e.g., the game data) among multiple computing devices in the network even though some computing devices are not directly connected by a link. As shown in the first stage 505, the computing devices 535 and 545 of players C and E which are not directly connected to each other in the mesh network 505 can exchange game data between them through the mesh network 505 (through any one of the computing devices 525, 530, or 540).

As shown in the first stage 515, the five players are also in a chat session through the focus point network 510 using their computing devices (i.e., the computing devices are exchanging audio data through the focus point network 510). Since computing device 525 of player A is initially designated as the focus point of the focus network 510, the computing device 525 is connected to each of the other computing devices 530-545 through the focus network 510. Each of the computing devices 530-545 is connected only to the focus computing device 525 (in the focus network). The audio data from non-focus computing devices 530-545 are received and processed by the focus point computing device 525, in a similar manner as described above in Section I.B. by reference to FIG. 3. The focus point computing device 525 distributes mixed audio signals to each of the non-focus computing devices 530-545 through the focus point network 510.

The second stage 520 of FIG. 5 illustrates how the game and the chat can continue when the focus point device disconnects from both the mesh network 505 and the focus network 510. As shown in the second stage 520, the computing device 525 is disconnected from both the mesh network 505 and the focus network 510. A computing device can be disconnected from a network in a number of different ways. For instance, a user may power off the computing device or a router that the computing device is located behind may fail for some reason and thereby break all the links that connected the focus computing device to other computing devices in the network.

In some embodiments, the computing device disconnects from the focus network 510 but remains connected through the mesh network 505. For example, the player using the focus point computing device might opt out of the chat session but continue to play the game via the mesh network 505. When the player that uses the focus point device decided to opt out of the audio chat during the game, some embodiments continue using the focus point computing device to perform the focus point operations, while other embodiments select another one of the computing devices as the focus point device. Hence, some embodiments dynamically identify a new focus point computing device during a game session, even when the previous focus point computing device has not dropped out of the game.

When the computing device 525 drops out of the game in the example illustrated in FIG. 5, each of the computing devices remaining in the mesh network 505 is directly connected to the other remaining computing devices in the mesh network 505, except for the computing devices 535 and 545. However, as shown in the second stage 520, all the remaining players can continue playing the game without player A because their computing devices 530-545 can still exchange their game data among themselves through the mesh network 505.

The second stage 520 also shows that after the focus point computing device 525 drops out, the computing device 530 of player B is designated as a new focus point of the focus point network 510. The processes for designating a computing device as the focus point at the start or in the middle of an audio chat will be further described below. Once the computing device 530 is designated as the new focus point, the voice data from non-focus computing devices 535-545 are received, mixed and distributed by the new focus point computing device 530, as shown in the second stage 520.

Having introduced a game session among multiple players facilitated through a mesh network and a focus point network, several more detailed examples of such game sessions will now be described in the following sub-sections of Section II. Subsection A describes how to set up a multi-player game and audio chat through a mesh network and a focus point network. Section B then describes more details of setting up the focus point network. Next, subsection D describes how a new focus point computing device is designated when the initial focus point computing device drops out of the network. Subsection E then follows with a description of a scenario where a player cannot participate in the audio chat through the focus point network. Next, subsection E describes several embodiments that allow a player who cannot participate in the audio chat through the focus point network to participate in the audio chat through the mesh network. Subsection F then describes several embodiments that optimize the audio processing that is performed at the focus point computing device. Subsection G then describes several embodiments that relay video data through the focus point network. Finally, subsection H describes software modules that execute on the computing devices and that perform the operations of the mesh and focus-point networks.

A. Setting Up a Game

Figure 6:
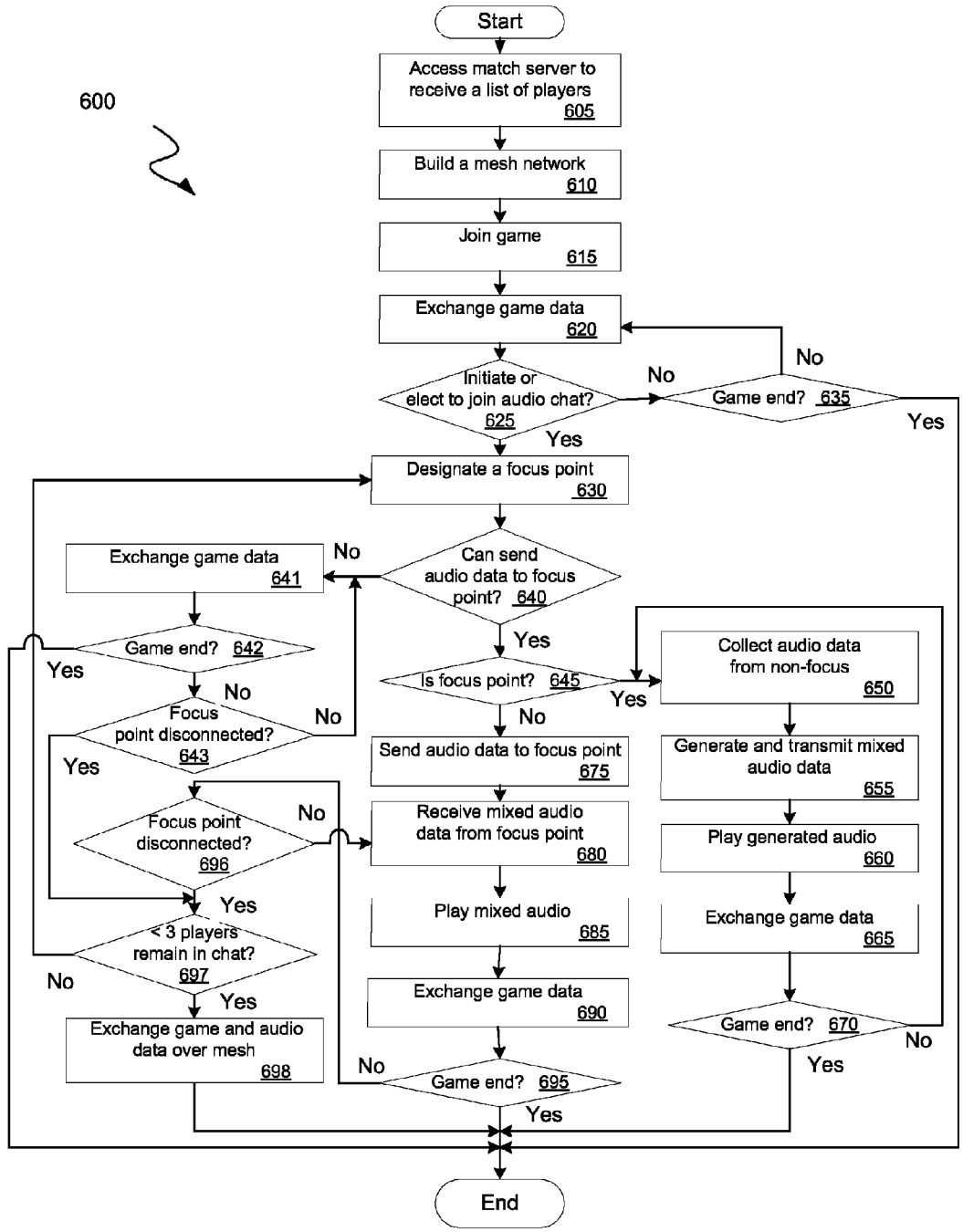
FIG. 6 conceptually illustrates an example of a process that some embodiments use to conduct a multiplayer game and an audio chat among multiple computing devices.

FIG. 6 conceptually illustrates a process 600 performed by a computing device of a first player to set up a game with an audio chat capability. This process is performed by one or more software applications that are executing on this computing device. The process 600 first sets up a mesh network to exchange game data and later sets up a focus network to exchange audio data with other computing devices of the other players during the game. In some embodiments, the process 600 is performed simultaneously (or nearly simultaneously) by each of the devices joining the multiplayer game.

In some embodiments, the process 600 starts when the player directs his computing device to start a multiplayer game with other players using their computing devices. The player can direct his computing device by entering inputs, such as clicking a mouse button or tapping a touchscreen to select a UI item, and/or pressing keys on a keyboard, etc.

In some cases, the player joins a game that is already in progress, or joins a game at the start of the game in response to an invitation of another. However, in the exemplary process 600 illustrated in FIG. 6, it is assumed that the player is the one who initiates the game. Accordingly, in this example, the process 600 initially accesses (at 605) a matchmaking server to receive a list of players for the multi-player game. In some embodiments, the list contains a number of players whose criteria for playing the game match with the criteria of the first player using the computing device. For example, the players in the list might be interested in the same game with other live participants (e.g., as opposed to playing against a computer-controlled character). In other embodiments, the list contains players that the first player specifically invited through the matchmaking server to play the game. In some embodiments, the list also contains information about each player's computing device that enables the first player's device to reach the other players' computing devices. Such information might include a network address (e.g., an IP address) of the other player's computing device.

Once the list is received, the process builds (at 610) a mesh network connecting the computing devices of the players in the list by attempting to establish a link with each of the other computing devices of the other players in the list. At the same time, similar processes running on the other devices also attempt to establish links between their respective devices and the other devices.

In some cases, the process succeeds to establish links with only some of the computing devices in the list. The process records, in a primary connection table, those computing devices with which the process successfully establishes links. To the entry of each computing device recorded in the primary table, the process also adds link information related to the link that is established with the computing device. Such link information may include the bandwidth, delay, and quality of the link. The process then sends this primary connection table back to the matchmaking server in some embodiments. In these embodiments, similar processes running on the other devices also sends their respective primary connection tables to the match making server. Once the server collects primary connection tables from all the computing devices in the players list, the process receives from the server primary connection tables of the other computing devices.

From the received primary connection tables, the process is then able to figure out how to communicate with (i.e., how to exchange data with) those computing devices with which the process failed to establish links. For example, the process has failed to establish a link with a second computing device, but the process now sees, from the primary connection table of a third computing device, that the third computing device has established a link with the second computing device. If the process has succeeded to establish a link with the third computing process, the process can exchange data with the second computing device via the third computing device. In other words, the process can send its data through the link it established with the third computing device and then the third computing device can relay this data through the link it established with the second computing device.

By going through the received primary connection tables, the process may find many such indirect paths to reach the second computing device. In some cases, a path may include just one computing device (e.g., the third computing device) to relay data sent by the process to the second computing device. In some other cases, a path may include more than one computing device to relay data sent by the process to the second computing device. It follows that there can be many such paths that the process can send its data over to the second computing device. The process records these paths in an entry for the second computing device in a secondary connection table. Also, the process ranks the paths based on metric scores of each path.

A metric score for each path is computed based on the link information included in the primary connection tables. For example, the metric score for the path that connects the computing device of the first player and the second computing device via the third computing device is computed based on the link information of the link connecting the computing device of the first player and the third computing device and the link information of the link connecting the third computing device and the second computing device. The former link information is included in the primary connection table of the computing device of the first player. The latter link information is included in the primary connection table of the third computing device. In some embodiments, the metric score may be sum of the delay associated with the two links. In some other embodiments, bandwidth and quality of the link may be factored in when the process calculates the metric score. The process may also limit the number of paths the process adds to an entry. For example, the process may add only the top three paths with the best three metric scores.

For each computing device to which the process failed to establish a link, the process places an entry in the secondary connection table and adds these indirect paths to the entry. In some embodiments, the secondary table for each computing device may be prepared by the matchmaking server and sent to each server. In these embodiments, the process receives the secondary table for the computing device of the first player from the matchmaking server after sending its primary connection table to the matchmaking server.

There might be some cases when a computing device fails to establish a link with any of the other computing devices. Also, there might be some cases when a few computing devices are able to establish links with each other but fail to establish links with any other computing devices. In such cases, those computing devices may not participate in the game because game data cannot be exchanged between these computing devices and the rest of the computing devices. For the purpose of the following discussion, it is assumed that all the computing devices in the list are either directly or indirectly connected to each other.

Once the mesh network connecting all computing devices of the players in the list is built, the process joins (at 615) the player to the game that the players have agreed to play. That is, the process starts generating game data for the first player's representation in the game. The process then sends (at 620) this game data to each of the other computing devices through the mesh network. At 620, the process also starts to receive game data from the other computing devices through the mesh network.

While the game is being played among the computing devices (i.e., while the game data is exchanged among the computing devices through the mesh network), the process determines (at 625) whether to elect to join an audio chat session with other computing devices of other players who are playing the game. In some embodiments, this determination is based on the input from the player of the computing device executing the process 600. Such inputs might include, for example, the player's selection of an option to initiate a chat session or to elect to join a chat session initiated by one or more of the other players in the game. This selection may involve clicking a mouse button or tapping a touchscreen to select a UI item, selecting an option through keyboard input, etc.

Some embodiments initiate a chat by exchanging beacons among the computing devices in the mesh network for the game. In some embodiments, each beacon is a piece of data that indicates to another device the sender's desire to establish a link with the receiver. The beacon of some embodiments provides at least identification information about the sender. The use of such beacons will be described in detail by reference to FIG. 8 below.

When the process 600 determines (at 625) that the player has not specified that the process should join or initiate an audio chat session with other computing devices, the process determines (at 635) whether the game has ended. In some cases, a game ends by mutual agreement of the players and corresponding input to the computing devices. In some other situations, a game ends for the computing device when the player turns off the computing device or when the links to other computing devices are broken due to a network failure (e.g., a failure of a router through which the computing device connects to the other devices in the network). When the process determines (at 635) that the game has not ended, the process loops through operations 620 and 625 in order to continue exchanging game data with other computing devices and to re-examine the audio-chat determination.

When the process elects to join or initiate an audio chat session at 625, the process proceeds to 630 to select an initial focus point computing device from among the various computing devices that have elected to participate in the chat session. This selection of an initial focus point computing device is described in further detail below by reference to FIG. 8.

Once the initial focus point computing device is selected, the process determines (at 640) whether the first player's computing device is able to send audio data to the focus point computing device (i.e., whether the computing device has a direct link through which to send audio data to the focus point computing device if the selected focus point is not the computing device of the player). If the computing device of the player is selected as the focus point computing device, the computing device of the player is deemed able to send audio data to itself.

When the process determines (at 640) that the computing device cannot send audio data to the focus point computing device, the process transitions to 641 to continue exchanging game data with the other computing devices through the mesh network, until either the game ends or the focus point computing devices drops out. The process determines (at 642) whether the game has ended (i.e., because the players mutually agreed to end the game, the player using the computing device performing the process chose to end participation in the game, or the computing device's connection to the other devices has failed). If the game session ends at 642, the process ends.

Otherwise, the process determines (at 643) whether the focus point computing device has dropped out of the audio chat session (i.e., because its user has quit the game, powered off the device, or otherwise disconnected from the focus network). In some embodiments, the initial focus point computing device drops out of the audio chat but remains connected through the mesh network. For example, the player using the focus point computing device might opt out of the chat session but continue to play the game via the established mesh network. When the process determines that the focus point has disconnected, the process transitions to 697, described below. Otherwise, the process returns to 641 to continue exchanging game data until either the game ends or the focus point disconnects.

When only two players remain in the game, the process transitions to 698, where it continues exchanging game data with the last remaining player until the end of the game. Between two computing devices, the focus network is no longer necessary to conduct an audio chat because there is no need for a central distributor of audio signals. The two players can continue the chat by sending audio signals to each other through the mesh network in some embodiments. However, when the process determines (at 697) that three or more players still remain in the game, it transitions to 630 to perform a new focus point determination.

When the process determines (at 640) that it can send audio data to the focus point, the process determines (at 645) whether the player's computing device is the focus point computing device. When the computing device is not the focus point computing device, the process proceeds to 675 which will be described below.

When the computing device is designated as the focus point computing device, the process collects (at 650) audio signals from the non-focus computing devices through the focus network. The process then (at 655) generates and transmits mixed audio data to each non-focus point computing device through the focus network. The operation of receiving, mixing and transmitting audio data is described above in detail by reference to FIGS. 3-4.

The process also plays (at 660) the mixed audio data that it generated with the local speaker or speakers of its computing device. The process continues to exchange (at 665) game data to the other computing devices through the mesh network. The process then determines (at 670) whether the game has ended. When the game has not ended, the process returns to 650 to continue to collect audio data from non-focus computing devices.

When the process determines (at 645) that its computing device is not the focus point computing device, the process sends (at 675) the computing device's audio data to the focus point computing device. The process then receives (at 680) mixed audio data from the focus point computing device. The process then plays (at 685) the mixed audio data at the first player's computing device with a local speaker or speakers. The process continues to send (at 690) game data to each of the other computing devices through the mesh network. The process then determines (at 695) whether the game has ended.

When it determines (at 695) that the game has not yet ended, the process determines (at 696) whether the focus point computing device has dropped out of the audio chat session (i.e., because its user has quit the game, powered off the device, or otherwise disconnected from the focus network). In some embodiments, the initial focus point computing device drops out of the audio chat but remains connected through the mesh network. For example, the player using the focus point computing device might opt out of the chat session but continue to play the game via the established mesh network.

When the process determines (at 696) that the focus point computing device has not dropped out of the audio chat, the process loops through 675-695 to continue in its current state. Otherwise, the process determines (at 697) whether there are less than three computing devices remaining in the chat. When there are three or more computing devices remaining in the chat, the process returns to 630, where, as mentioned above, it identifies a new focus point computing device with the other remaining computing devices. However, when there are less than three non-focus computing devices that remain in the chat, the process proceeds to 698 to continue the game and audio chat through the mesh network until the game ends.

Having described a process that some players of a game perform to simultaneously play the game and participate in an audio chat session with other players, more details regarding setting up and conducting an audio chat through a focus network will now be described in Section B below.

B. Setting Up Focus Point Network

1. Single Audio Chat

Figure 7:
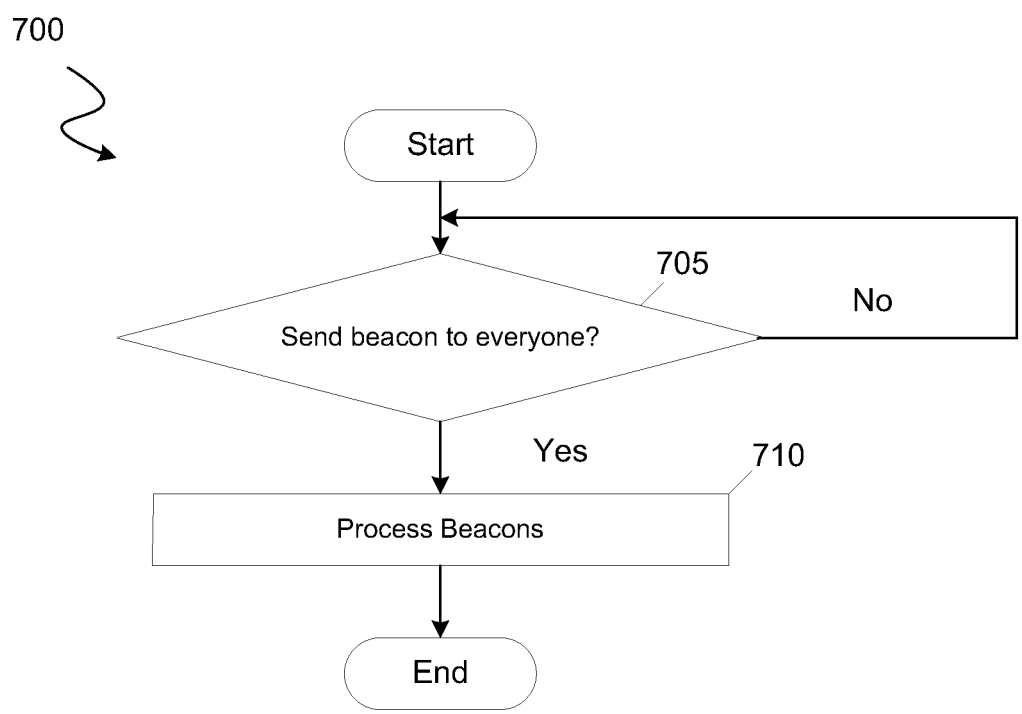
FIG. 7 conceptually illustrates an example of a process that some embodiments use to set up a focus point network.
Figure 8:
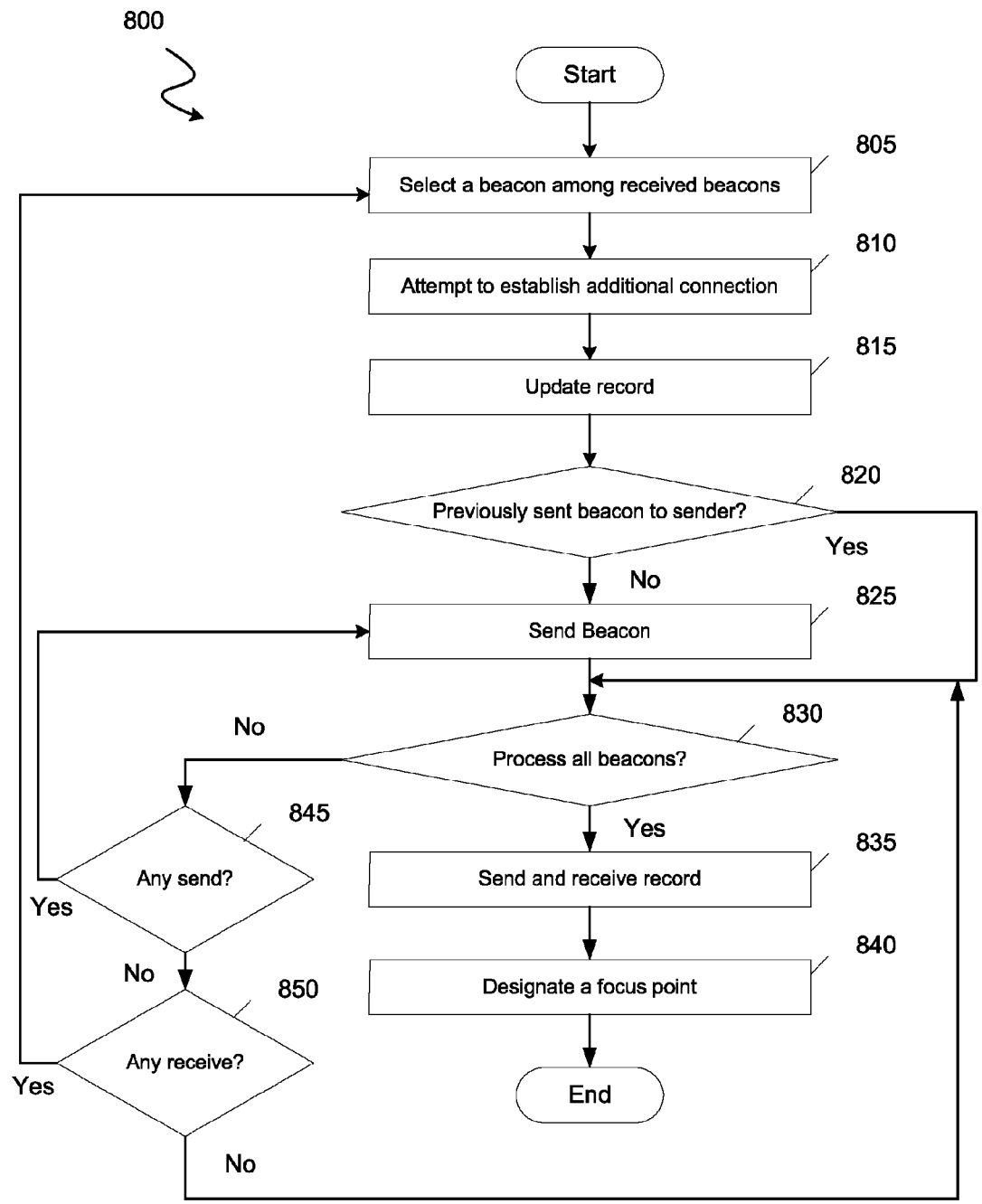
FIG. 8 conceptually illustrates an example of a process that some embodiments use to set up a focus point network.

FIGS. 7-8 conceptually illustrate a process of some embodiments that is used by several computing devices to identify one of the computing devices as a focus point device for exchanging participant audio data during a game session. In some embodiments, this process performs the focus-point determination operation 630 of FIG. 6. This process is performed as two processes, a first process 700 of FIG. 7 that is performed by a computing device of a first player that initiates the audio chat session, and a second process 800 of FIG. 8 that is performed by each computing device to process beacons that are sent by other computing devices during the focus-point determination operation.

Figure 9:
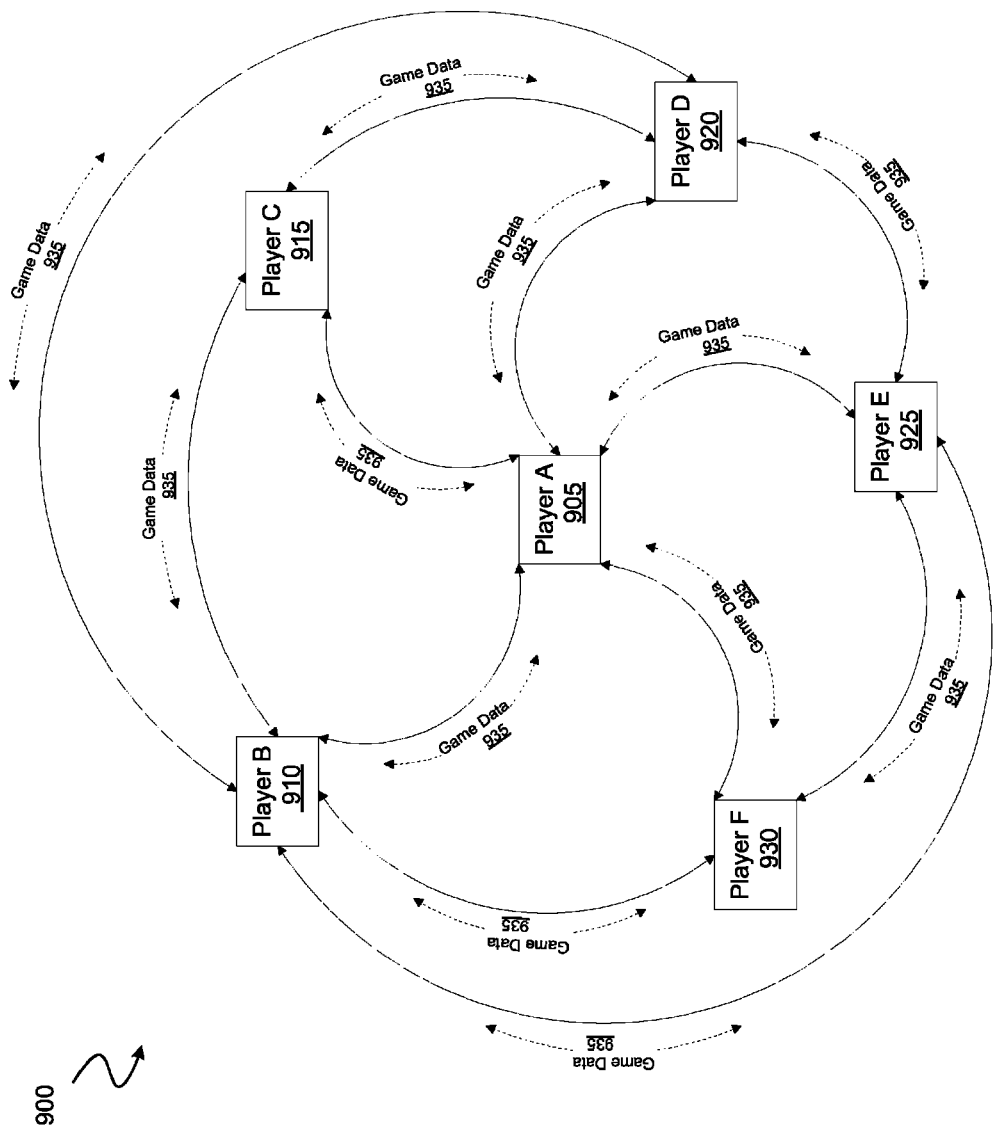
FIGS. 9-11 illustrate a mesh network that is used in some embodiments to set up a focus network to conduct an audio chat.

The two processes 700 and 800 will be described below by reference to FIGS. 9-12, which illustrate one example of identifying a focus-point computing device in a game session that is conducted over a mesh network 900. In the example illustrated in FIGS. 9-12, the mesh network 900 involves six players A-F that are playing a game together using their computing devices 910-930. As shown in FIG. 9, game data 935 is transmitted among the computing devices 910-930 across mesh-network links, which are depicted as thin curved lines connecting the computing devices. In this example, two of the computing devices 905 and 910 of two of the players A and B are directly connected to all of the other computing devices in the mesh network 900, while the rest of the other computing devices 915-930 of the players C-F are not directly connected to all other computing device in the mesh network 900. However, as described above, the computing devices 915-930 are still able to exchange game data with those computing devices to which they are not directly connected, through the mesh network 900.

As mentioned above, FIG. 7 conceptually illustrates the process 700 performed by a computing device of a first player to set up an audio chat session with computing devices of other players. In this example, the players have already started to play a multiplayer game through a mesh network using their computing devices. The process 700 provides more details of the operation 630 performed by the process 600 (which was described above by reference to FIG. 6) when the focus point determination is made. The process 700 is performed by one or more software applications that are executing on the computing device of the first player. In some embodiments, the process 700 starts when the first player directs his computing device to initiate an audio session with other computing devices participating in the game.

As shown in FIG. 7, the process 700 initially sends (at 705) a beacon to each computing device that the first player's computing device can directly reach through the mesh network. This beacon is an indication to the other computing devices that a player wishes to initiate an audio chat session. A beacon in some embodiments is the sender's invitation to the receiver to attempt to establish a link with the sender. A beacon in some embodiments includes data generated by the computing device that sends the beacon. In some embodiments, this data is stored in the storage of the computing device (e.g., volatile storage such as RAM or non-volatile storage such as a hard disk or a solid-state drive) before being sent to another computing device or when received from another computing device. In some embodiments, the data within a beacon includes data relating to the focus point capabilities of the device that is sending the beacon. Examples of such focus point capability data that are provided in some embodiments are described further below.

Figure 10:
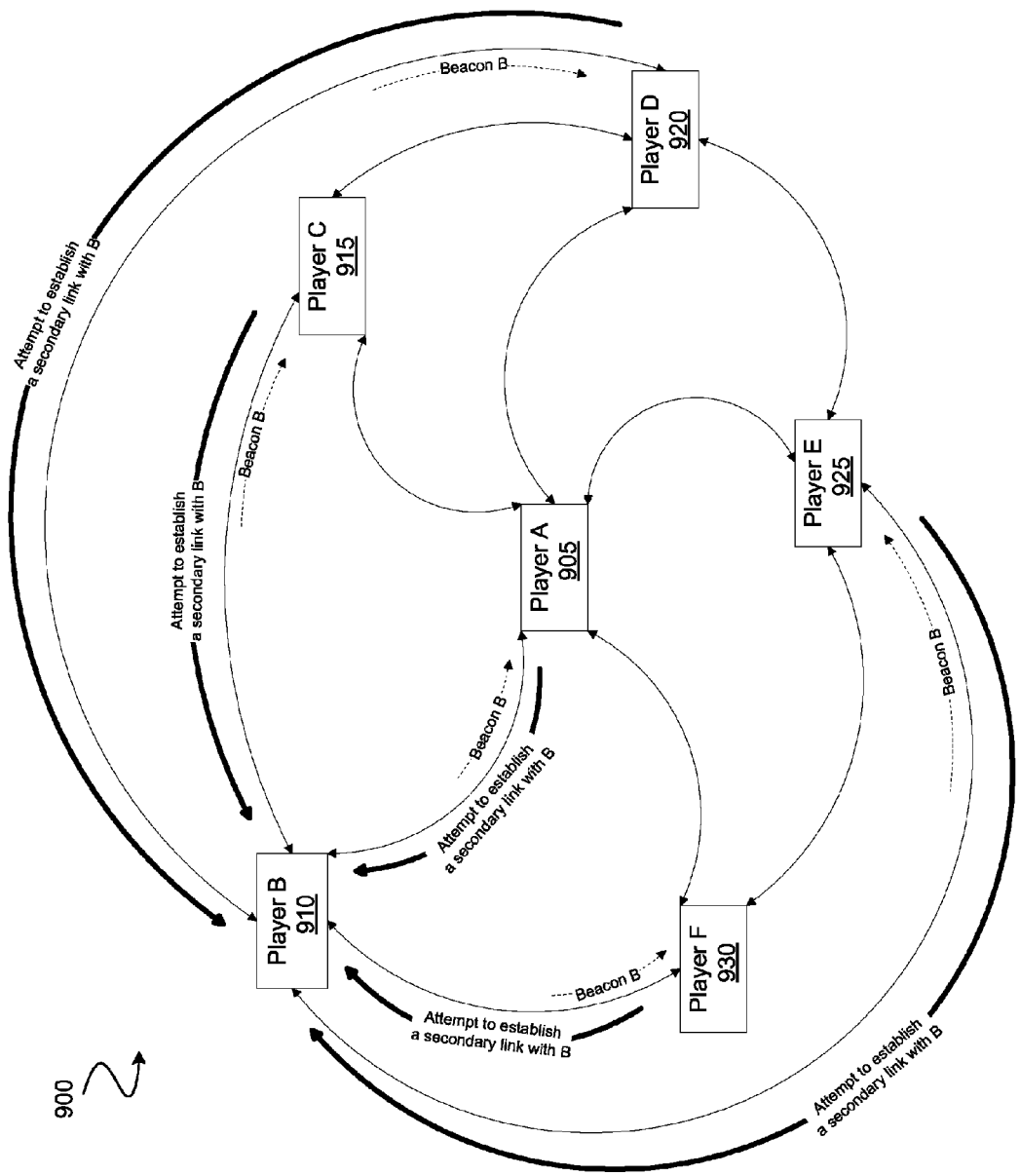

For the mesh example illustrated in FIGS. 9-12, FIG. 10 illustrates the stage where one player initiates the focus point determination by sending a beacon to each of the other computing devices in the game. In this example, the computing device 910 of player B sends out its beacon to each of the other computing devices in the mesh network 900, as the device 910 has a direct connection link to each other device in the mesh network. As shown in FIG. 10, the beacon is sent out through the same mesh network links (depicted as thin curved lines) that are used to exchange game data between the computing devices. FIG. 10 also depicts thick curves lines, which represents secondary link connection attempts that the beacon-receiving computing devices make in some embodiments. Such secondary link connection attempts will be further described below by reference to FIG. 8.

Once the process 700 sends (at 605) a beacon to all computing devices that have a direct mesh-network link to the first player's computing device (e.g., to the device 910), the process processes (at 710) the beacons received from the other computing devices in the mesh network in response to the beacons sent at 705. The processing of these beacons allows the computing device of the first player to identify, with the other computing devices, one of the computing devices as the focus point computing device for the chat session.

In some embodiments, the first player's device processes received beacons in the same manner as every other device processes such beacons. Accordingly, the first player's processing of the received beacons will be described by reference to FIG. 8, which describes a process 800 performed by any computing device in order to process beacons that are received to set up an audio chat during a game.

The process 800 starts in some embodiments when one of the computing devices receives a beacon related to the set up of an audio chat during a game. As shown in FIG. 8, the process 800 initially selects (at 805) a beacon from another computing device received through the mesh network. In some cases, this beacon is received from a computing device that initiated the audio chat. In other cases, the beacon is received from another computing device that received a beacon from the initiating computing device or from another computing device. That is, the beacon received by a computing device is not necessarily a chat-initiating beacon. Also, when a computing device selects (at 805) a beacon, the computing device might still be receiving additional beacons from other computing devices. In other words, a computing device starts its process 800 in some embodiments before it has received all beacons from all computing devices.

Once the process 800 selects a beacon that it has previously received, the process attempts (at 810) to establish a link with the sender of the beacon. In some embodiments, this link is distinct and separate from the links that make up the mesh network. FIG. 10 illustrates examples of such secondary link attempts in the focus-point determination example presented in FIGS. 9-12. As mentioned above, FIG. 10 pictorially illustrates the sending out an initial round of beacons by a first player's computing device 910 to five other computing devices 905 and 915-930.

When each of the computing devices 905 and 915-930 receives the beacon from the computing device 910, it attempts to establish a secondary link with the computing device 910. In FIG. 10, each thick line depicts an attempt by each of the computing devices 905 and 915-930 to establish a secondary link with the computing device 910, in addition to any link already connecting the two computing devices. The secondary link is to transmit audio data once a focus point network is established. If one of the two computing devices connected by this secondary link becomes a focus point computing device of the focus point network, the link will become a part of the focus network. In some embodiments, these links are established in a similar manner as the links in the mesh network 205 described above by reference to FIG. 2.

Even though FIG. 10 illustrates an example of attempted secondary-link connection in response to beacons that are sent out by the computing device 910 that initiates the audio chat session, such attempted connections can also be in response to beacons that are sent by the processes 800 of the other computing devices once the focus-point determination operation 630 has been initiated.

Also, in the embodiments described above and below, the process 800 attempts (at 810) to establish a secondary link with the sender of the selected beacon. The attempt to establish a secondary link at 810 will either be successful or not successful. Accordingly, after its attempt at 810, the process 800 updates a record that it maintains to indicate whether its attempt (at 810) was successful or not. In some embodiments, this record includes a connectivity score that relates to the number of computing devices with which the device that executes process 800 can have a secondary link. In some cases, the connectivity score is the number of secondary links (separate and distinct from the links that make up the mesh network) that the computing device can establish with the other computing devices. In such embodiments, the process updates the score by incrementing by one if the attempt to establish the secondary link was successful. Other embodiments aggregate the connectivity score differently (e.g., by multiplying the number of secondary connections with another value, etc.).

The manner of generating the connectivity score is not as important as the fact that each particular computing device's process 810 aggregates (e.g., sums) the results of its successful attempts to establish secondary links with computing devices that send it beacons during the focus-point determination operation. Such an aggregate score specifies the measure of the particular device's computing device as the focus point computer. This is because each computing device in a mesh network sends its beacon to each of the other computing devices during the focus-point determination, and because each computing device attempts to establish a secondary link with each computing device that sends it a beacon.

The record that is updated at 815 also contains capability information relating to the focus point capabilities of the computer device. The capability information in some other embodiments includes the device type of the computing device, the NAT type of the router the computing device is behind, and the quality of the links. These all relate to how well the computing device can handle the data it would receive as a focus point computing device from non-computing devices.

A device type indicates the kind of computing device (e.g. media player, smart phone, personal computer, etc). The device type may also include information such as the speed of the computing device's CPU, how much memory the computing device has, etc. Thus, the device type relates to the processing capacity of the computing device.

The NAT type indicates the type of NAT router the computing device is behind. As described above in Section I, a number of connections a computing device can make may depend on the type of the NAT router that the computing device is behind.

The quality of the links in some embodiments indicates how good each link is that the computing device establishes with another computer (e.g., the bandwidth that each link the computing devices establishes has, bit error rate of each link, etc). A bit error rate in some cases is calculated by dividing the number of received binary bits that had been altered due to noise and interference inherent to a link by the total number of bits transmitted through the link during a time interval. Such capability information is stored in a storage of the computing device in some embodiments (e.g., volatile storage such as RAM or non-volatile storage such as a hard disk or a solid-state drive).

In some embodiments, the connectivity score that the process 800 updates at 815 is a metric score that is computed based on (1) the number of successful secondary link connections, and (2) one or more scores related to one or more pieces of data that quantify the connectivity capability information of the device.

After updating its connectivity records at 815, the process determines (at 820) whether the computing device has previously sent its beacon to the sender. This operation is performed to prevent the computing device from sending another invitation to the sender if the sender has already attempted to establish a secondary link with the computing device. In order to find out whether a beacon was sent to the sender, the process keeps a list of computing devices and flags that indicate whether the computing device of the first player has sent a beacon to each of the computing devices. The list may be stored in the storage of the computing device.

When the process determines (at 820) that the computing device has not previously sent its beacon to the sender, the process sends (at 825) its beacon to the sender to invite the sender to attempt to establish a secondary link between the sender and the computing device of the first player. From 825, the process transitions to 830. The process also transitions from 820 to 830 when it determines (at 820) that it has previously sent a beacon to the sender of the beacon it previously selected at 805.

At 830, the process determines whether the process has processed all beacons that it needs to send to other computing devices and all beacons it has received from the other computing devices in the mesh network. This operation is performed by the process because it is necessary to send all beacons and to process each received beacon in order to correctly assess the computing device's capability as a focus point computing device. For example, in those embodiments where the process keeps and updates the connectivity score of the computing device, the highest possible connectivity score of the computing device can be obtained only after it processes all beacons that it has received. In some embodiments, the process determines that it no longer has to wait to receive a beacon from another device when it receives the connectivity score of the other device, as further described below.

When the process determines (at 830) that it has processed all beacons and knows the capability information of the computing devices of the first player, the process then proceeds to 835 which will be described below. Otherwise, the process determines (at 845) whether there is a computing device to which the process has not sent a beacon. When the process determines (at 845) that there is such a computing device in the mesh network, the process returns to 825 to send a beacon to that computing device.

Otherwise, the process determines (at 845) whether there are any additional received beacons that it has not yet processed. If so, the process returns to 805 to select another unprocessed beacon for processing and to repeat operations 810-830. When the process determines (at 845) that it does not have any unprocessed received beacons at this time, it returns to 830, to determine whether it has processed all beacons.

When the process determines (at 830) that it has processed the sending of all beacons and processed all received beacons, process 800 then sends (at 835) the record containing the connectivity score and the connectivity capability information of the computing device on which the process executes to all other computing devices in the mesh network. The process also receives (at 835) records from the other computing devices. At this point, the process is able to determine which computing device in the mesh network is most capable as a focus point computing device by analyzing and comparing the capability information of all the computing devices in the network. As such, the process proceeds to 840 to designate one of the computing devices in the mesh network as a focus point computing device. In some embodiments, the process 800 is performed simultaneously (or nearly simultaneously) by each of the devices in the mesh network. In these embodiments, each device in the mesh network would designate the same computing device as a focus point computing device since each device has the capability information of the other computing devices.

In some embodiments, a computing device with the highest connectivity score is designated as a focus point computing device. However, the connectivity score of a computing device in some embodiments is adjusted based on other capability information. For example, the connectivity score will be reduced by a certain number if the computing device's CPU cannot handle all of the links effectively without affecting the performance of the game application running for the computing device.

In some cases, there may be multiple computing devices with the same highest connectivity score. In such cases, each computing device in some embodiments has a tie-breaking solution to designate a focus point computing device among these computing devises. An example of such a tie-breaking solution is to select a computing device of a player who is placed ahead of the other players in the list of compatible players received from the matchmaking server in the operation 605 of the process 600 described by reference to FIG. 6.

Figure 11:
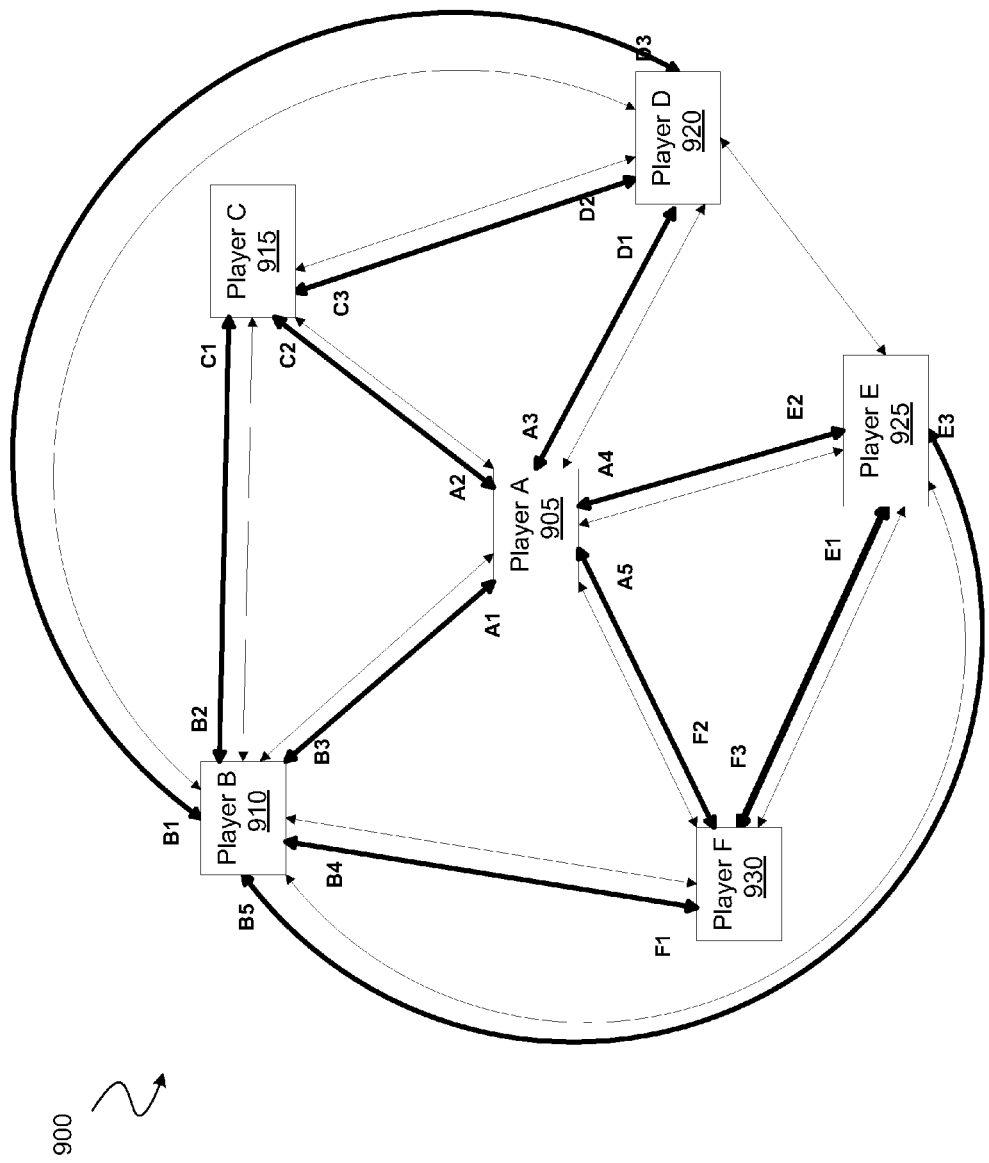
Figure 12:
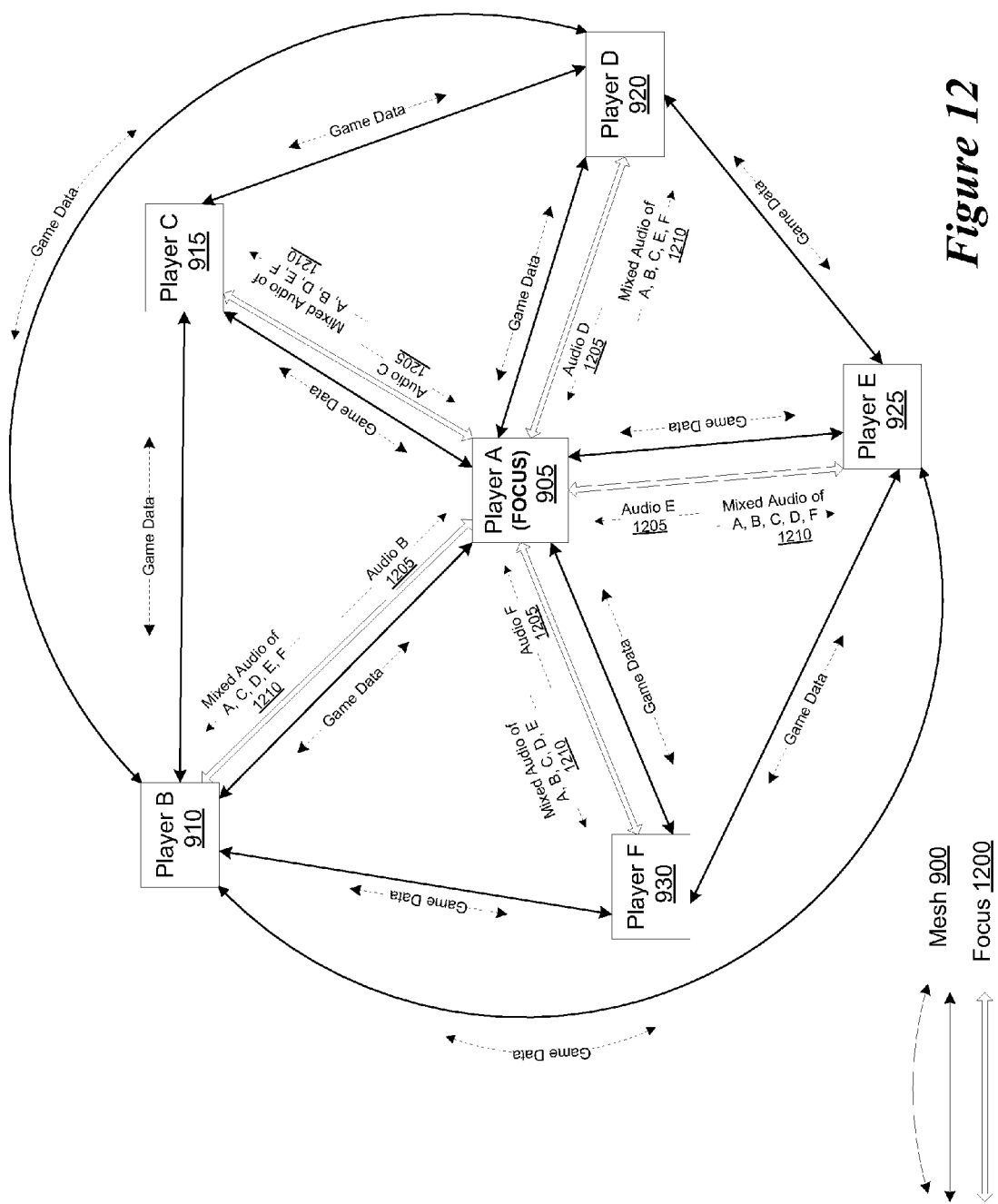
FIG. 12 illustrates some embodiments that use two networks to relay game data and audio data between multiple computing devices.

FIGS. 11-12 illustrate an example of the connection scores and the focus-point designation that results from such scores for the focus-point determination example presented in FIGS. 9-12. FIG. 11 illustrates the computing devices 905-930 after each of these computing devices has attempted to establish a secondary link with each of the other computing devices with which the device has direct links. FIG. 11 also shows thick straight lines and numbers placed by the thick lines. Each of the thick lines depicts a secondary link that each computing device in the mesh network 900 can establish with another computing device in the network. Again, these secondary links are separate and distinct from the links that make up the mesh network 900 depicted as thin lines in FIG. 11.

The numbers placed at each end of a thick line are index numbers. Theses index numbers indicate how many such secondary links a computing device illustrated near the numbers has been able to establish (i.e., a connectivity score of the computing device in some embodiments). For instance, the numbers A1-A5 shown near the computing device 905 of player A indicate that the computing device 905 was able to establish links with each of the other five computing devices 910-930. Thus, the connectivity score of the computing device 905 is a five. Likewise, the connectivity score of the computing device 910 of player B is also a five. The computing devices 915-930 of players C-F each have a connectivity score of three. No secondary link can be established between the computing devices 920 and 925 because at least one of the two computing devices was unable to establish a secondary link to the other computing device due to, for instance, the limitations imposed by a NAT router through which the computing device establishes links with the other devices.

Once each computing device in the mesh network 900 has determined its highest possible connectivity score, it sends its record containing the connectivity score to each of the other computing devices in the mesh network 900. Each computing device is then able to designate a computing device that has the highest connectivity score among the computing devices in the mesh network 900 as a focus point computing device. As shown in FIG. 11, the computing devices 905 and 910 each have the highest number. Because there are two computing devices with the highest connectivity score, a tie-breaking solution of some embodiments is applied as mentioned above, and the computing device 905 is designated as a focus point computing device. The other computing devices 910-9430 become non-focus computing devices. Once the focus point computing device is designated, the audio chat session can start.

FIG. 12 illustrates a focus point network 1200 that is established to conduct the audio chat session among the computing devices 905-930, which are exchanging game data along the mesh network 900. FIG. 12 also illustrates hollow lines and audio signals 1205 and 1210. Each of the hollow lines depicts a link that each non-focus point computing device establishes with the focus point computing device 905. These links and the computing devices connected by these links make up the focus point network 1200. The operation of the focus point network 1200 is similar to the operation of the focus point network 305 described above by reference to FIG. 3. As shown in FIG. 12, both game data and audio data are simultaneously distributed between the computing devices 905-930 through the two networks 900 and 1200.

2. Multiple Audio Chats

While the processes 600, 700, and 800 described so far are performed to set up a single chat session among all of the computing devices in the mesh network, the processes can also be performed to set up multiple chat sessions among subsets of the computing devices or to set up a single session among a subset of the computing devices in some embodiments. Several of such embodiments are now described below.

Such embodiments can be implemented by including more information in the record of a computing device. In some embodiments, the record sent (at 835) by the process 800 to each of the other computing devices in the mesh network contains interests information related to the player's interests in joining the chat. In these embodiments, before designating a focus point computing device based on records containing capability information, the process 800 also checks whether each of the computing devices is interested in joining the initiated chat session. Only those computing devices that are interested in joining the chat session will be considered as a possible focus point computing device. If the computing device of the first player is not interested in joining the chat session, the process would not perform the designation operation.

Similarly, beacons exchanged by the computing devices may include the interests information in some embodiments. The process 800 in these embodiments then would be able to determine which of the computing devices are interested in the chat session and designate a focus point device among the interested computing devices.

Once a focus point computing device is designated, if the first computing device is a non-focus point computing device, the process 600 would send the first computing device's audio data to the focus point computing device only if the first computing device is interested in joining the chat. If the first computing device is a focus point computing device, the process would not send the mixed audio signal to those computing devices that are not interested in joining the chat. As such, only the computing devices interested in the chat session will exchange audio signals between them. Therefore, only a subset of the computing devices in the mesh network can participate in the audio chat session.

In other embodiments, records and beacons sent to or received from the other computing devices also have session identification information for a particular chat session so that a chat session can be identified by the information. These interests information and session identification information enable the computing devices to have multiple chat sessions established and conducted at the same time. The computing devices can initiate multiple chat sessions by sending out beacons with different identification information (e.g., "Red Team" and "Blue Team"). Only those computing devices which indicate interests in a particular chat session (e.g. "Red Team") would be able to join the chat session. Multiple chat sessions can be useful for such a game where players can team up against one another and want their chat or conversation to be kept within the respective teams.

A chat session in some embodiments can be kept private within certain subset of the computing devices in the mesh network by sending beacons only to those computing devices in the subset. In such embodiments, the other computing devices would not get the beacons for that audio chat session. As such, the chat session can be conducted only through the computing devices in the subset without notifying the other computing devices that such chat is being set up and to be conducted. Also, in these embodiments, a public audio chat, which every player in the mesh network can participate in, can be created by sending beacons for the public audio chat to each computing device in the mesh network.

While multiple chat sessions can be conducted among computing devices in a mesh network, examples or embodiments in the rest of this application will be described under the assumption that a single chat session is set up and conducted.

Having described how the initial focus point computing device 905 can be designated and how an audio chat can be facilitated through the focus network 900, subsection C will now describe the designation of a new focus point and continuation of the audio chat when the focus point computing device 905 drops out of the focus point network.

C. Dynamic Focus Point Designation

As described above, some embodiments can continue an audio chat session conducted by multiple computing devices of multiple participants through a focus point network even after a computing device that has been acting as the focus point computing device drops out of the focus network. In these embodiments, one of the other computing devices is designated as a new focus point computing device and the chat can continue through the focus point network among the computing devices that have not dropped out. An example of designating a new focus point and continuing the chat session will now be described below by reference to FIGS. 13-14.

Figure 13:
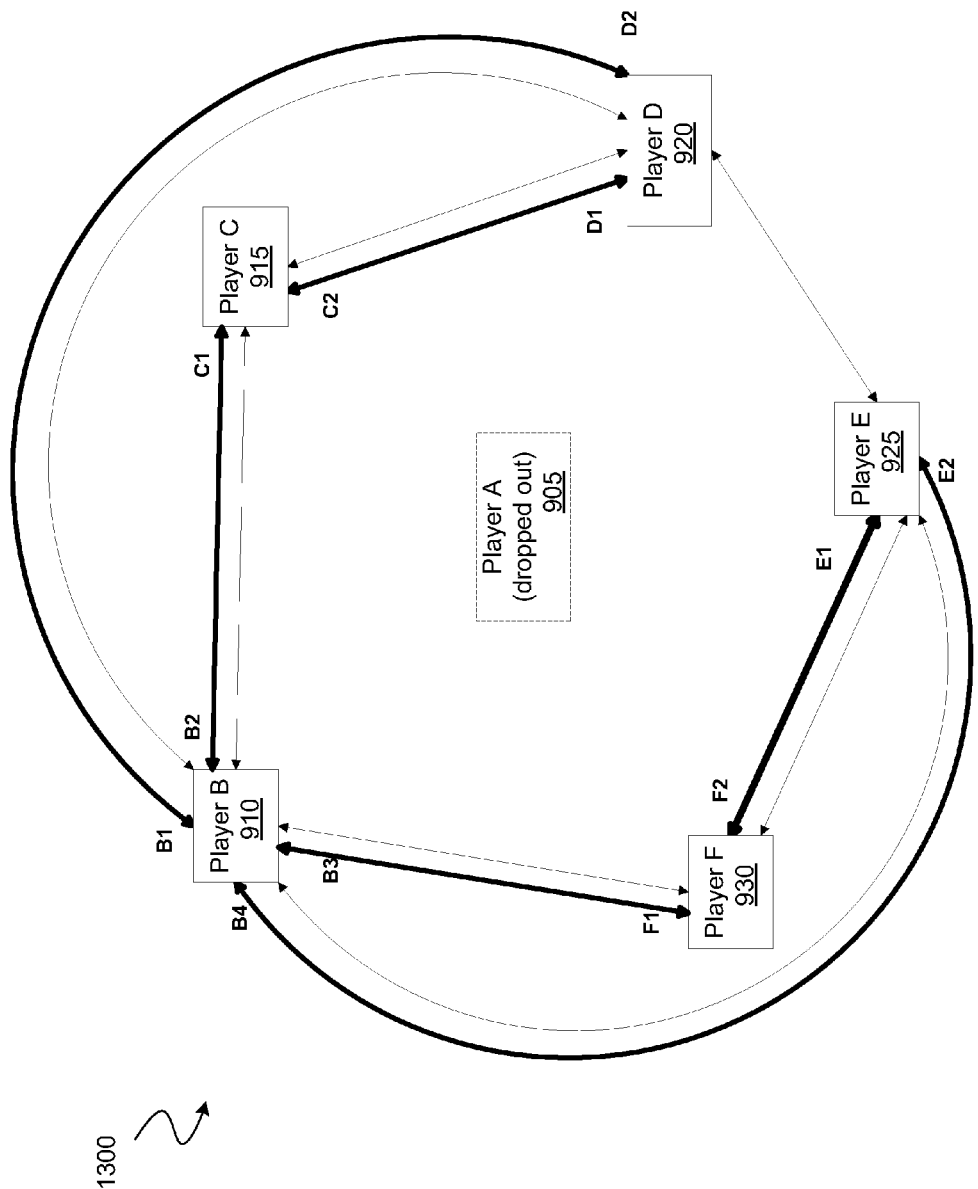
FIG. 13 illustrates a mesh network that is used in some embodiments to continue an audio chat after a computing device drops out of the chat.

FIG. 13 illustrates a mesh network 1300 after the computing device 905, which previously was acting as the focus point computing device of the focus point network 1200, disconnects from both the mesh network 900 and the focus point network 1200. The mesh network 1300 is the mesh network 900 without the computing device 905 and the links that connected the computing device 905 to the other computing devices in the network 900. FIG. 13 also illustrates the same computing devices 905-930 of players A-F described above by reference to FIG. 12. The computing device 905 is depicted as a dotted box to signify that it has dropped out of the networks. The links between the computing device 905 and the other computing devices 910-930 have disappeared as the computing device 905 dropped out of the networks and thus these links are not shown in FIG. 13.

In some cases, as shown, the focus point computing device drops out of both networks. A computing device may drop out of both networks if its user (i.e., player A) has powered off the device or chosen to leave the game, or if the NAT router which the device is behind has failed for some reason, thereby breaking all of the links that connect the computing device to other computing devices. In other cases, a focus point computing device may disconnect only from the focus point network while remaining in the mesh network because, for example, the player at the focus point computing device opts out of the chat session while continuing to participate in the game. In either situation, the remaining computing devices 910-930 are connected by the links of the mesh network 1300, depicted as thin lines, and continue to exchange the game data (not shown for simplicity).

FIG. 13 also illustrates index numbers placed near each computing device. The index numbers indicate the connectivity score of a computing device according to some embodiments. The shown connectivity scores, as described above by reference to FIG. 11, indicate the number of connections each remaining device is able to establish with the other remaining devices. The connectivity score for device 910 of player B is four, as device 910 is able to connect with each of the other remaining devices. Each of the other four computing devices 915-930 of the other four players C-F has a connectivity score of two.

When the computing device 905 disconnects from the mesh and focus point networks 900 and 1200, the computing devices 910-930 detect the disconnection in a number of different ways. In some embodiments, the computing devices 910-930 detect this loss of the focus point device by recognizing that the links through which audio signals are exchanged between themselves and the focus point computing device 905 have disappeared. Similarly, the computing devices 910-930 can detect the disconnection in some embodiments by recognizing the disappearance of the direct links though which the game data were exchanged between themselves and the computing device 905.

With the focus point network 900 gone, the audio chat is temporarily disabled. However, the computing devices 910-930 quickly determine which of the remaining computing devices is most capable as a new focus point computing device by analyzing and comparing the capability information of all the computing devices in the network. In some embodiments, the capability information is contained in the records the computing devices had exchanged in order to set up the original focus point network. In other embodiments, each computing device updates its record after the focus point computing device 905 disconnects, by exchanging beacons through the mesh network 1300 and attempting to establish secondary links. Each computing device in such embodiments then exchanges its record with each of the other computing devices remaining in the mesh network 1300. The detection of the disconnection of the initial focus point computing device 905 and designation of the new focus point computing device 910 takes a short period of time (in some embodiments, usually less than a half second). In some embodiments, the new focus point network is set up quickly enough that the users do not even notice an effect on the audio chat.

In some embodiments, a computing device with the highest connectivity score is designated as a focus point computing device. As shown, the computing device 910 of player B has the highest connectivity score and would be designated as a new focus pointing computing device in these embodiments. Once the new focus computing device is designated, the audio chat can resume among the computing devices 910-930.

Figure 14:
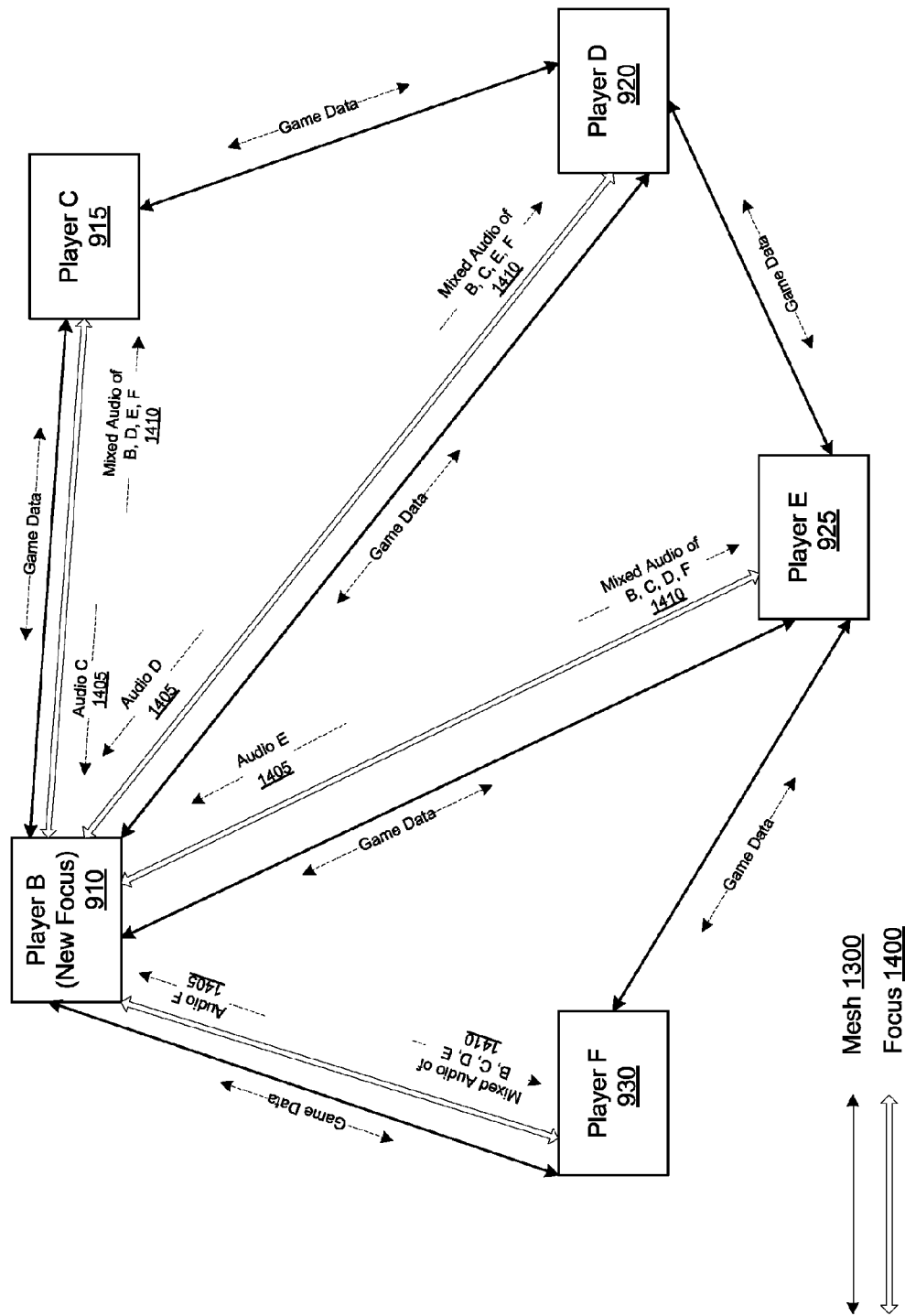
FIG. 14 illustrates some embodiments that use two networks to continue to relay game data and audio data between multiple computing devices after a computing device drops out of the networks.

FIG. 14 illustrates the operation of the new focus point computing device 910 in a focus point network 1400. FIG. 14 illustrates the same mesh network 1300 and the same computing devices 910-930 of players B-F described above by reference to FIG. 13. FIG. 14 also shows additional links depicted as hollow lines. Each of these links connects one of the non-focus point computing devices 915-930 to the focus point computing device 910, making up the new focus point network 1400. Both game data and audio data are simultaneously exchanged between the computing devices 910-930 through the two networks 1300 and 1400. The operation of the focus point network 1400 is similar to the operation of the focus point network 305 as described above by reference to FIG. 3.

As described above, some embodiments exchange beacons and update records among computing devices in a mesh network when a focus point computing device needs to be designated in order to create a focus point network, whether an initial focus point network at the initiation of a chat session or a new focus point network when a focus point has dropped out of the network. However, some embodiments may exchange beacons and updated records among the computing devices throughout the chat session. For example, exchange of beacons and updated records may take place periodically at regular intervals. In some such embodiments, each computing device assesses its focus point capabilities periodically and informs other computing devices of its latest capability information at the regular intervals.

In other embodiments, a computing device may update its record whenever its focus point capabilities change. Such changes may include a drop in the quality of the links established with other computing devices. In such a situation, the computing device with modified capabilities might send its record or a beacon containing the updated capability information to the other computing devices so that the other computing devices will have the most up to date focus point capabilities for the computing device. In some embodiments, this triggers a round of beacon exchange in order that all of the devices update their focus point capabilities. In some embodiments, when a computing device receives many beacons or records from other computing devices in a short period of time, the computing device may wait for a period of time before it sends out its beacon or record in response. By waiting, the computing device may reduce the number of beacons or records that are sent out by other computing devices in response to receiving its beacon or record.

Having described how the exchange of game data and related audio chat data can continue through new mesh and focus point networks after a previous focus point computing device drops out of one or both networks, subsection D will now describe a situation in which one of the computing devices is unable to join an audio chat because it fails to establish a link to transmit audio data to a designated focus point computing device.

D. Unable to Send Audio Data Through Focus Network

As described above, some embodiments of the invention utilize mesh and focus point networks to simultaneously transmit game data and audio data among multiple computing devices participating in both a game and an audio chat session. In certain cases, a computing device is unable to establish a link with the focus point device to transmit audio data and receive processed audio data. In some embodiments, the computing device in such cases will be unable to join the focus point network and therefore unable to participate in the chat session. The computing device will still be able to participate in the game (through the mesh network) and, in case the focus point drops out, the designation of a new focus point. An example of a network in which a computing device is unable to participate in an audio chat will now be described below by reference to FIGS. 15-17.

Figure 15:
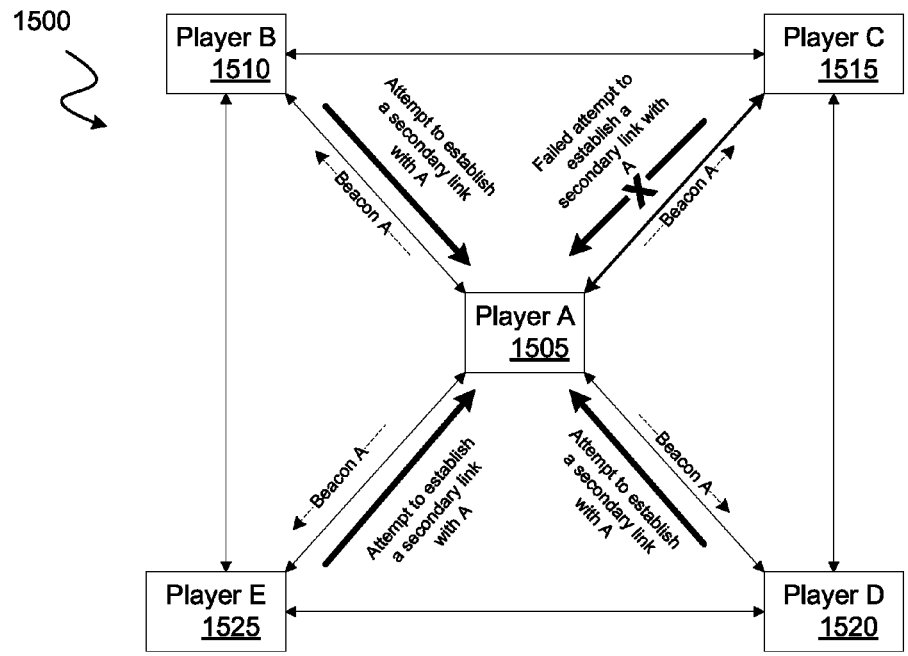
FIG. 15 illustrates a computing device of some embodiments that is unable to establish a link with a focus point computing device.

FIG. 15 illustrates a first stage in the setting up of a focus point network through which to conduct an audio chat among computing devices 1505-1525 of five players A-E. This stage in setting up a focus point network is similar to the stage described above by reference to FIG. 10. Computing devices 1505-1525 of players A-E are exchanging game data (not shown for simplicity) through the mesh network 1500, and the computing device 1505 has sent its beacon (beacon A) to each of the other computing devices through the mesh network 1500.

FIG. 15 illustrates the mesh network links as thin lines connecting the computing devices and attempts to establish secondary links depicted as thick lines pointing to computing device 1505. As shown in FIG. 15, each of the computing devices 1510-1525 receives beacon A from the computing device 1505 and attempts to establish a secondary link with the computing device 1505. Each computing device then updates its record to indicate with which other computing devices it successfully established secondary links, as well as any modifications to its other capability information (e.g., device type, connection quality, etc.). In addition to being used to designate a focus point, in some embodiments a particular device will use its record when designated as the focus point to determine which of the other devices will be sending audio to the particular device and will be expecting to receive audio from the particular device.

As shown in FIG. 15, the computing device 1515 of player C has failed to establish a secondary link with the computing device 1505. This could be due to a number of different reasons. For instance, a NAT router that the device 1515 is located behind may impose limitations (e.g., a maximum number of links) that prevent the computing device 1515 from establishing a link with computing device 1505. In some embodiments, computing device 1515 updates its record to indicate that a link could not be established with computing device 1505. As described above with respect to FIGS. 7 and 8, each computing device sends its beacon to each of the other computing devices with which the device has direct links and attempts to establish a secondary link with each of the other computing devices from which it receives a beacon.

Figure 16:
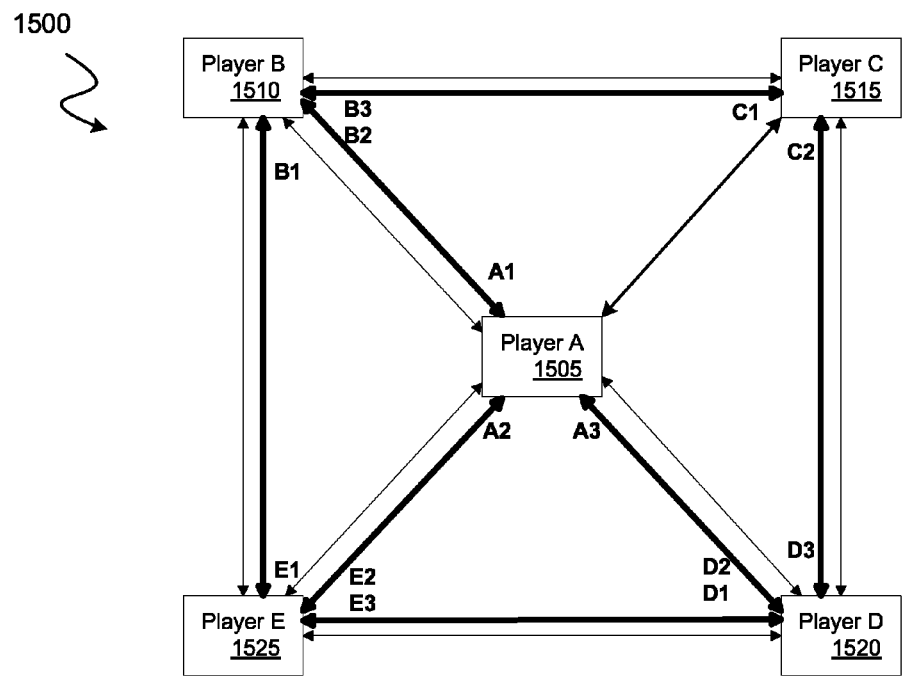
FIG. 16 illustrates a mesh network that is used in some embodiments to set up a focus network to conduct an audio chat.

FIG. 16 illustrates the computing devices 1505-1525 after each of these computing devices has attempted to establish a secondary link with each of the other computing devices with which the device has direct links FIG. 16 also shows thick straight lines and numbers placed by the thick lines. Each of the thick lines depicts a secondary link that each computing device in the mesh network can establish with another computing device in the network. As noted above, these secondary links are separate and distinct from the links that make up the mesh network 1500.

The numbers placed at each end of a thick line are index numbers that illustrate how many secondary links each computing device is able to establish, as described above by reference to FIG. 11. The four computing devices 1505, 1510, 1520, and 1525 each have a connectivity score of three, while the device 1515 has a connectivity score of only two. As described above by reference to FIG. 6, different embodiments will use different tie-breaking solutions to designate one of the four devices 1505, 1510, 1520, and 1520 as the focus point computing device for the audio chat session. In this case, computing device 1505 is designated as the focus point computing device, and the devices 1510, 1520, and 1520 are non-focus computing devices. The computing device 1515 will not be able to join the focus point network as it is unable to establish a link with the focus point. Once the focus point computing device is designated, the audio chat session can start, using the links that form the focus point network.

Figure 17:
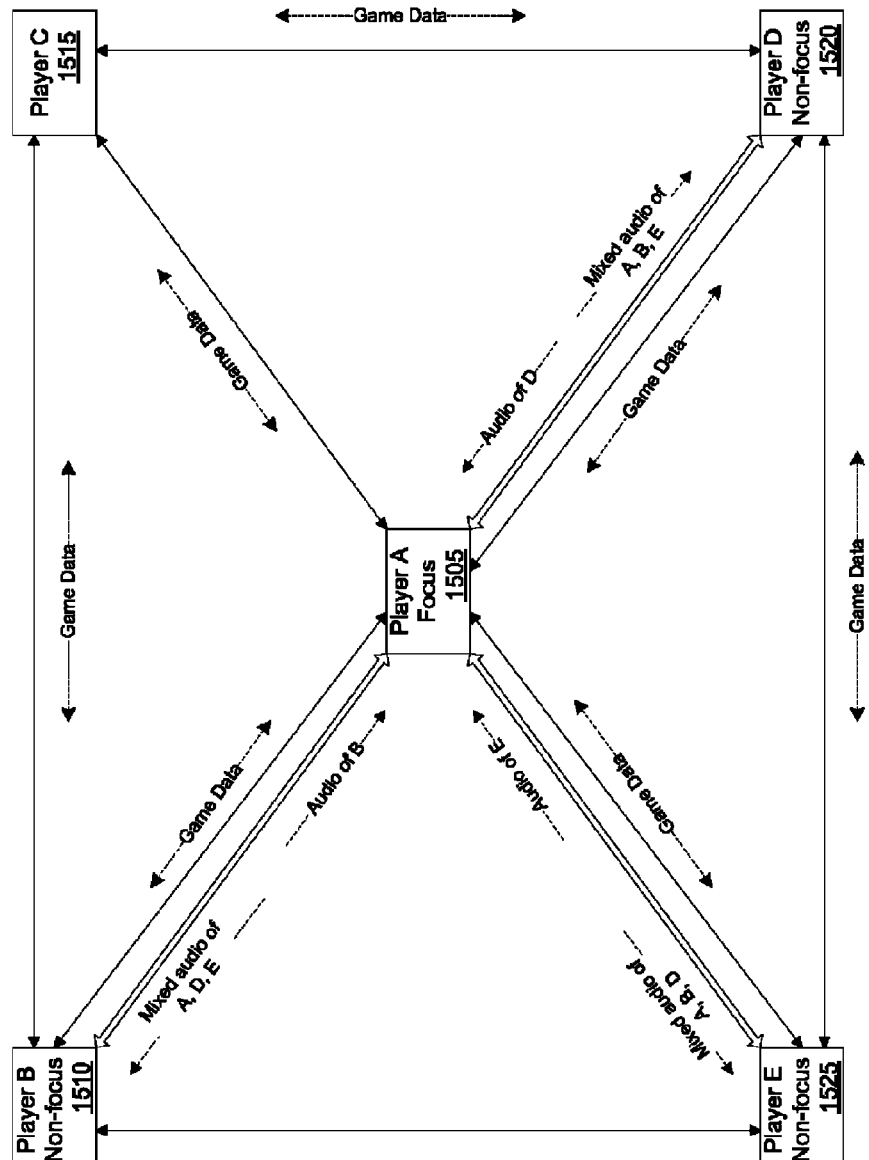
FIG. 17 illustrates a computing device of some embodiments that is unable to participate in an audio chat.

FIG. 17 illustrates a focus point network 1700 that connects computing devices 1505, 1510, 1520, and 1525 (but not 1515) after the audio chat session starts. FIG. 17 also illustrates the same mesh network 1500 that connects computing devices 1505-1520. FIG. 17 illustrates links of the focus point network 1700 depicted as hollow straight lines and shows audio data exchanged through these links. The operation of the focus point network 1700 is similar to the operation of the focus point network 305 described above by reference to FIG. 3.

As shown in FIG. 17, the computing device 1515 of player B is not participating in the audio chat through the focus network 1700 because of its inability to establish a secondary link with the focus computing device 1505. Because its record (and/or the record received from computing device 1515) will indicate that there is no secondary link established between computing devices 1505 and 1515, the focus point will not expect to receive audio data from the computing device 1515.

Having described an example of a computing device which cannot participate in an audio chat through a focus network, subsection E will now describe an example in which the excluded computing device can participate in the audio chat by exchanging audio data with the focus point computing device through the mesh network that connects the two computing devices.

E. Relaying Audio Data Through Mesh Network

As described above, some embodiments of the invention utilize a combination of mesh and focus point networks to simultaneously transmit game data and audio data among multiple computing devices participating in a game and an audio chat session. In some embodiments, a computing device that is unable to join a focus point network for an audio chat can nevertheless participate in the audio chat through the mesh network that connects the computing device to the focus point computing device. An example of such audio chat participation through the mesh network will now be described by reference to FIG. 18.

Figure 18:
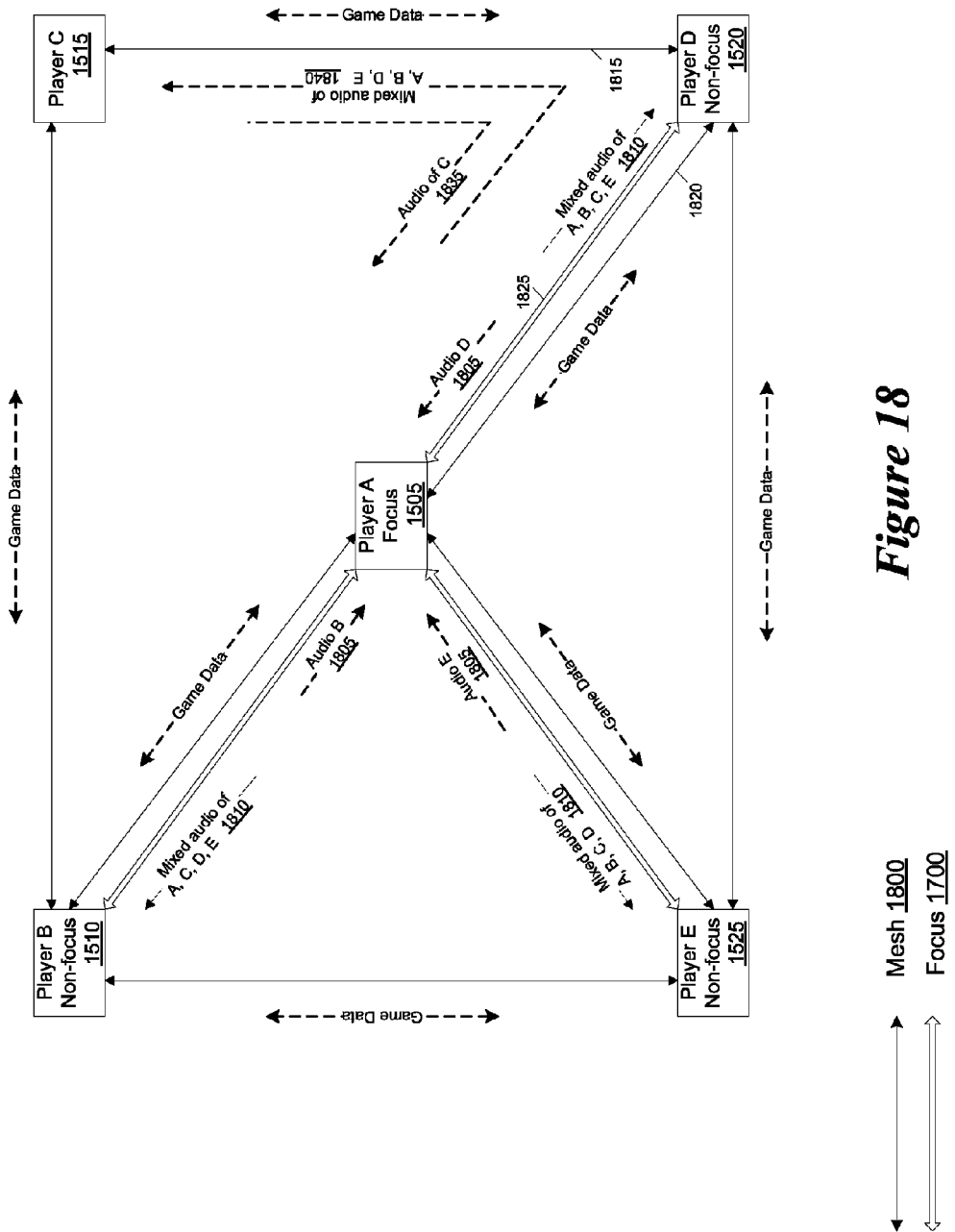
FIG. 18 illustrates a computing device of some embodiments that is unable to participate in an audio chat through one network participating in the audio chat through another network.

FIG. 18 illustrates the computing devices 1505-1525 connected in mesh network 1800 (which is the same as mesh network 1500 without a direct link between devices 1505 and 1515), and focus point network 1700 (excepting device 1515, which is not part of focus point network 1700) as described above by reference to FIG. 17. In addition, FIG. 18 illustrates the flow of audio data. As shown, unprocessed audio data 1805 and 1835 is transmitted to the focus point computing device 1505 and mixed audio data 1810 and 1840 is transmitted from the focus point computing device. The audio data 1815 and the mixed audio data 1810 are exchanged between the focus computing device 1505 and the non-focus computing devices 1510, 1520, and 1525. The audio data 1835 and the mixed audio data 1840 are exchanged between the computing device 1515 and the focus computing device 1505.

After the computing device 1505 is designated as a focus point computing device of the focus network 1700, the non-focus computing devices 1510, 1520, and 1525 exchange audio data with the focus point computing device 1505 over the focus point network 1700. However, the computing device 1515 is unable to send its audio signal to the focus point computing device 1505 through the focus point network 1700 because a secondary link for audio data exchange between the two computing devices could not be established.

As shown in FIG. 18, in some embodiments the computing device 1515 instead uses the mesh network 1800 to participate in the audio chat session. The computing device 1515 sends its audio signal 1835 to the focus point computing device through one of the non-focus computing devices, in this case through device 1520. The computing device 1515 sends audio data 1835 to device 1520 via the link 1815, which is a link in the mesh network that these two devices also use to exchange game data. The computing device 1520 then relays the audio signal 1835 to the focus point computing device over the mesh network 1800 through link 1820. The opposite path is used to send mixed audio data 1840 from device 1505 to device 1515 through device 1520.

One of ordinary skill will recognize that different paths through the mesh network could be used to send audio data to the focus point computing device 1505 from the computing device 1515 that is not part of the focus point network. For instance, the audio data could be routed through computing device 1510 rather than computing device 1520. In the mesh network 1500 illustrated in FIG. 17, some embodiments will use the direct link in the mesh network between the focus point computing device 1505 and the computing device 1515.

Likewise, the mixed audio signal customized for computing device 1515 can take any path along the mesh network 1500 from the focus point computing device 1505 to the computing device 1515. In some embodiments, the audio 1835 and the mixed audio 1840 will always be sent along the same path, while other embodiments allow the two paths to be different (e.g., routing the audio 1835 through device 1520 and the mixed audio through device 1510).

Having described in the several subsections above the setup of a focus network for exchanging audio data between computing devices, subsection F will now describe optimization of audio processing operations at the focus point in order to save the resources of the computing device.

F. Audio Processing Optimization

As described above in subsection I.B.2, the audio processing operations in a focus point network of some embodiments are performed by focus and non-focus modules that execute on each of the computing devices in the network. During a multi-participant chat, a computing device uses its focus point module when the device serves as the focus point of the chat session. In this situation, the focus point module performs focus point audio-processing operations.

As described above by reference to FIGS. 3-4, an audio codec of a focus point module of some embodiments receives audio signals from computing devices of participants in an audio chat session. The audio codec generates a mixed signal for each participant using the received signals. To generate each of these signals, the audio codec performs a number of operations including decoding, buffering, additional processing, mixing, encoding, etc., as described above. Some of these operations are especially costly, in that their performance consumes substantial computational resources (e.g., CPU cycles, memory, etc.) of the focus point computing device.

In some embodiments, audio processing performed by the focus point module can be optimized in a manner that reduces the amount of computational resources needed to process the received audio signals. Some embodiments optimize the audio processing by accounting for silent participants. In some embodiments, a silent participant is either (i) a participant that is not presently speaking or otherwise making noise or (ii) a participant whose audio is muted with respect to another participant.

In some embodiments, an audio codec of a focus point module improves the performance of the focus point module by selectively bypassing some or all of the operations that would have been performed to generate mixed audio signals. In some situations, the codec sends an audio signal from a first participant to a second participant without processing or mixing the audio signal. In other situations, the codec sends a single mixed audio signal to multiple participants.

When generating a mixed signal customized for a particular participant, an audio codec of a focus point computing device considers three factors in some embodiments: (1) whether to include the particular participant's own audio in the mixed signal, (2) whether the particular participant has muted any of the other participants' audio, and (3) whether a participant whose audio signal is to be included in the mixed signal is speaking or not. Some embodiments do not include a particular participant's own audio signal in the mixed audio signal for the particular participant. When a first participant has muted a second participant's audio, the second participant's audio is not included by some embodiments in the mixed audio signal for the first participant. When a particular participant's audio signal is silent, some embodiments do not include the particular participant's audio signal in any of the mixed audio signals.

Figure 19:
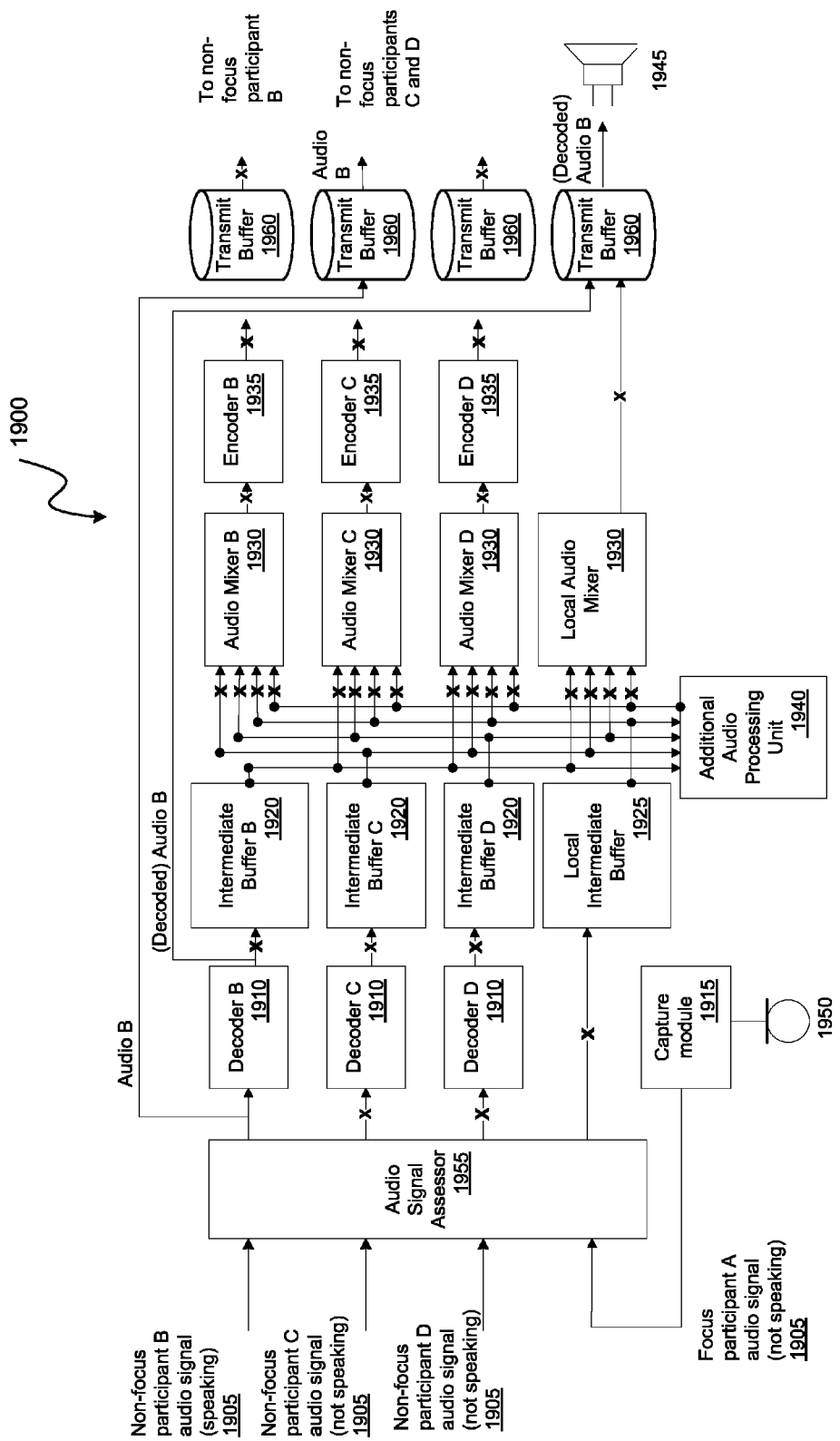
FIGS. 19-21 illustrate a focus point module of some embodiments.
Figure 20:
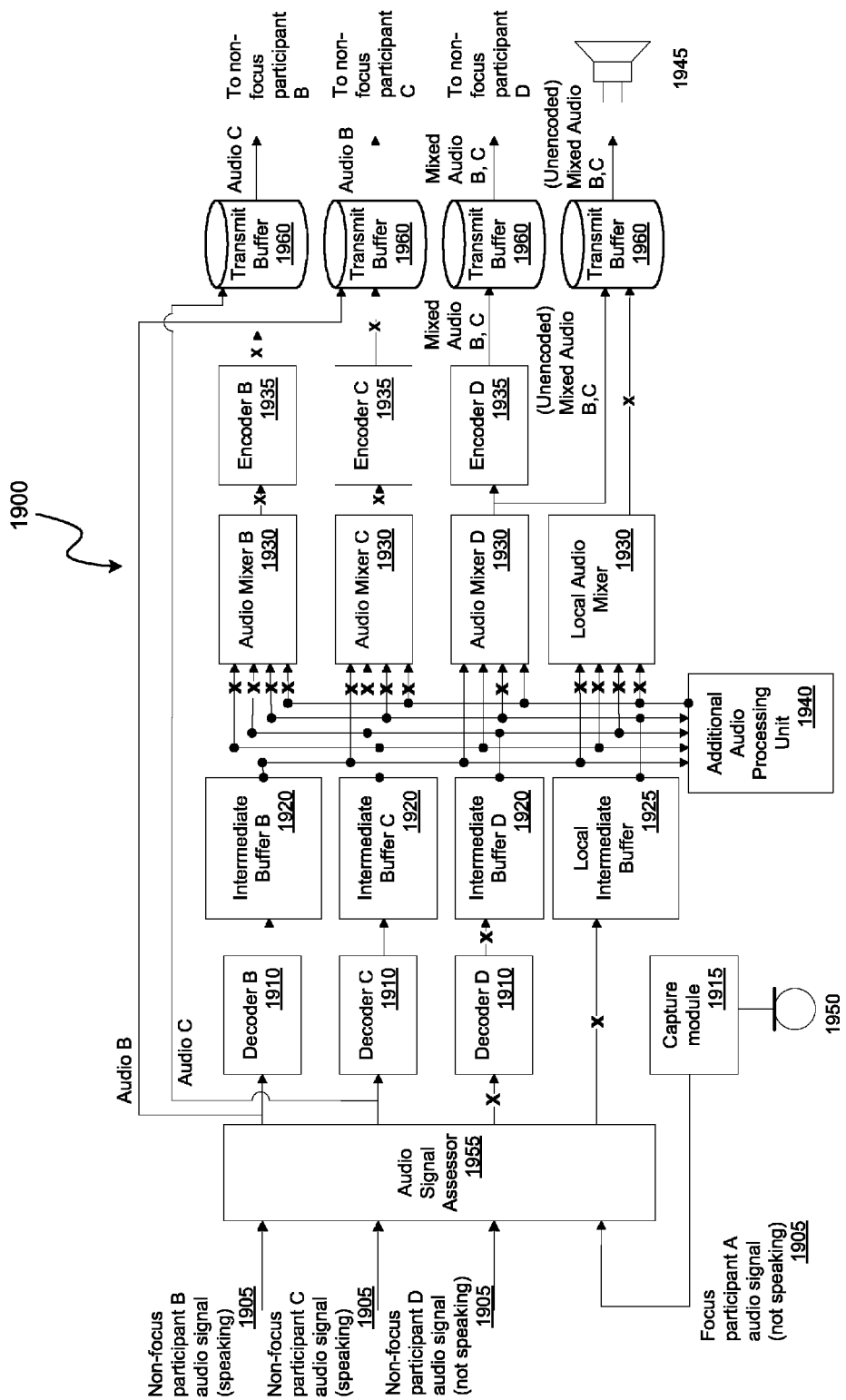
Figure 21:
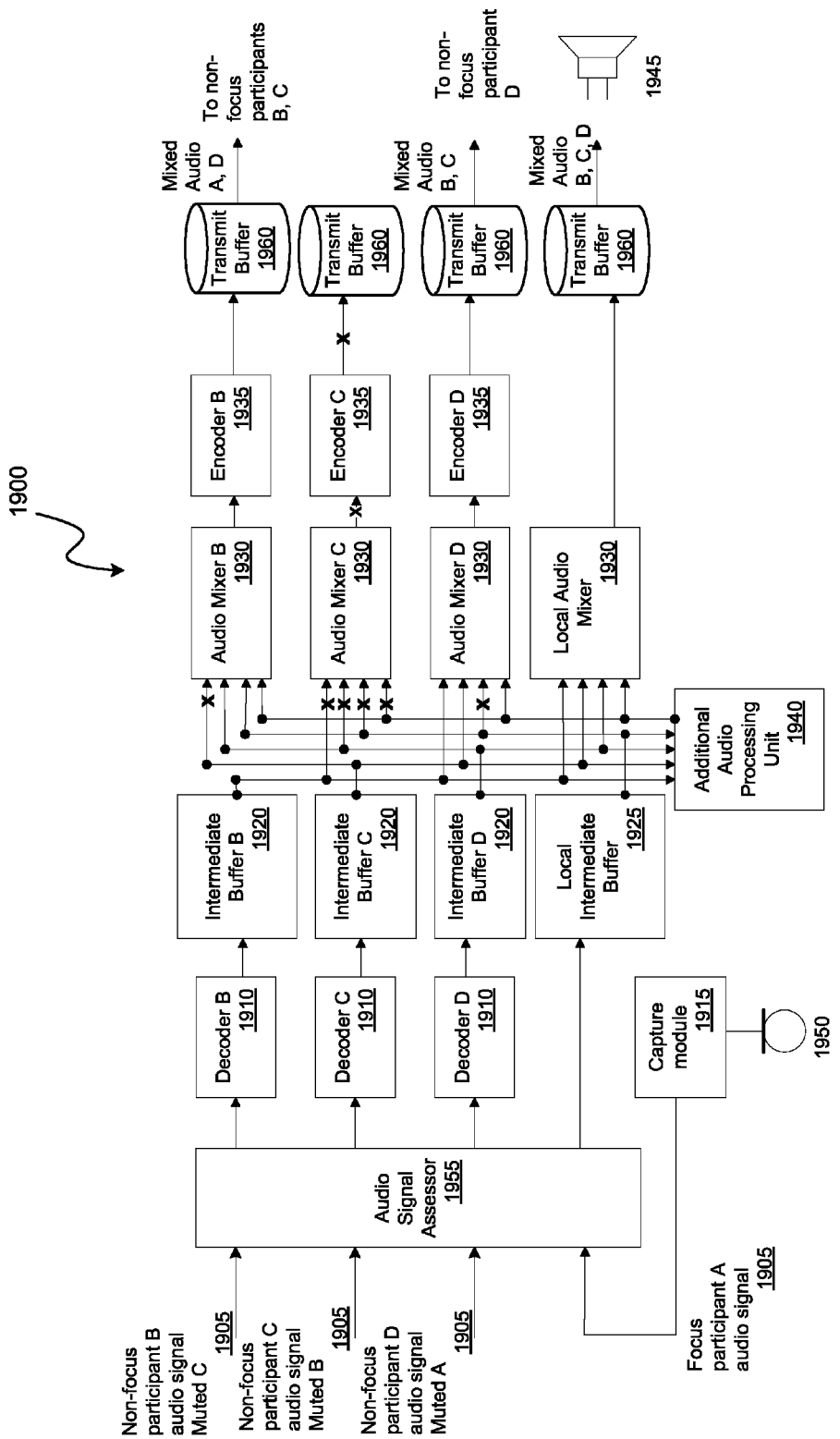

FIGS. 19-21 illustrate an example of an audio codec of a focus point module that selectively bypasses some of the customized audio generation operations by taking into account the above three factors when generating customized mixed signals for participants in an audio chat session. As shown in FIGS. 19-21, the audio codec 1900 includes decoders 1910, intermediate buffers 1920, audio mixers 1930, encoders 1935, an audio processing unit 1940, and a local capture module 1915, that operate in the same manner as the corresponding features of the audio codec described above in subsection B by reference to FIG. 4. In addition, FIGS. 19-21 illustrate audio signal assessor 1955, transmit buffers 1960 and incoming audio signals 1905 from the participants A, B, C, and D. Participant A is using the focus point device on which the focus point module executes, and participants B, C, and D are at non-focus point devices. As compared to FIG. 4, FIGS. 19-21 illustrate some of the data lines that depict audio data flow as crossed out to indicate that no data or samples are passed along those paths in the particular situations illustrated in these figures.

The audio signal assessor 1955 of some embodiments receives three or more audio signals 1905 containing digital audio samples from the audio capture module 1915 and two or more non-focus point modules of the non-focus computing devices. The audio signal assessor 1955 then assesses each received audio signal to determine whether the participant using the non-focus computing device from which the audio signal is received is speaking or not.

The audio signal assessor 1955 in some embodiments can employ one or more solutions to determine whether the particular participant was speaking at the moment when the incoming audio signal was captured. For example, the audio signal assessor 1955 may examine the size of the audio data packets received from a participant's computing device. When the participant is not speaking, the computing device of the participant will send a stream of small audio data packets to the focus point module. On the other hand, the computing device of a speaking participant will send a stream of larger audio data packets to the focus point module.

In some embodiments, the audio signal assessor 1955 also receives metadata that carries information from the participants' computing devices. One example of such metadata is muting instructions. When a first participant does not wish to receive audio of a second participant, the first participant may specify (e.g., via user interface interaction with his computing device) to have the second participant's audio muted. In some embodiments, the first participant's computing device sends metadata along with the audio data packets that identifies that the first participant wishes to mute the second participant's audio. The audio signal assessor uses this information to determine which incoming audio signals to exclude from particular mixed audio signals. In the example described in this paragraph, the second participant's incoming audio will be excluded from the mixed audio sent to the first participant.

After assessing the received audio signals and any metadata (i.e., muting instructions) that were received with the signals, the audio signal assessor 1955 of some embodiments determines, for each participant, which audio signals should be in the mixed audio signal that will be sent to the participant based on the three factors described above. As noted above, in some cases a participant will be sent an incoming audio signal that is not mixed with any other signals. Some participants may receive a unique mixed audio signal, while in some cases two or more participants will receive the same mixed audio signal. In the latter case, the audio signal assessor 1955 specifies that separate mixed audio signals should not be generated for the multiple devices that are receiving the same mixed audio.

The audio signal assessor 1955 then sends the received signals to decoders 1910 and/or to transmit buffers 1910 directly based on its determinations as to what audio should be sent to each of the non-focus computing devices. The audio signal assessor 1955 sends a received signal to its corresponding decoder 1910 if it is necessary to decode the signal and/or perform the rest of signal generating operations on the signal. On the other hand, the audio signal assessor 1955 sends a received signal directly to the corresponding transmit buffer 1960 if the signal does not have to be mixed with signals received from other participants. The transmit buffers 1960 store encoded customized signals received from their corresponding encoders 1935, from the audio signal assessor 1955, or from the local audio mixer 1930 until the signals are ready to be sent to the participants.

The operation of the audio codec 1900 during specific situations in a multi-participant audio chat will now be described. FIG. 19 illustrates how the audio codec 1900 in some embodiments operates when only one participant is speaking among the multiple participants of a chat. As shown in FIG. 19, out of the four participants A, B, C, and D in the audio chat, non-focus participant B is the only participant speaking when the incoming audio is captured. The audio signals 1905 from non-focus participants C and D, and focus point participant A are received at the audio signal assessor 1955 as small data packets because these three participants are not speaking. On the other hand, the audio signal 1905 from participant B is received as larger data packets. In some embodiments, the signal assessor 1955 determines that only participant B is speaking by examining the sizes of the audio data packets received from the participants.

Because participant B is the lone speaker in the chat session, the audio signal 1905 received from participant B's computing device is the only signal that needs to be transmitted to the participants in some embodiments. Therefore, the audio signal from participant B is not mixed with any of the other signals to generate customized mixed signals. Accordingly, the audio signal assessor 1955 sends participant B's audio signal directly to a transmit buffer 1960 that stores the audio signal to send out to non-focus participants C and D. No audio signal need be sent to participant B, because participant B does not need to receive his own audio.

For the participant A using the focus point computing device, the audio signal assessor 1955 sends participant B's audio signal to decoder B so that the signal can be decoded. The decoded signal is then sent directly to a transmit buffer 1960 that stores the signal to be sent to the local speaker or speakers 1945. The local speaker or speakers 1945 then produce audio for participant A. Though the signal had to be decoded for the participant A, the audio codec 1900 was still able to bypass some of the signal generating operations (i.e., buffering, additional processing, and mixing) for participant A.

While the audio signal from participant B is shown as being sent directly to the transmit buffer for transmission to participants C and D without being decoded or encoded, in some embodiments these operations must be performed even for an unmixed signal. In some cases, the encoding used by participant B's device cannot be decoded by participant C and/or D, which rely on the audio codec 1900 of the focus point module to decode and re-encode the audio. In such a situation, some embodiments will send the audio signal 1905 to a corresponding decoder 1910 and then directly to one or more encoders 1935 for encoding specific to the recipient device.

When participants other than B are also speaking, the audio codec 1900 may not be able to bypass all of the signal generating operations. FIG. 20 illustrates the operation of the audio codec 1900 when more than one, but not all of the participants in the audio chat are speaking. As shown in FIG. 20, the non-focus participants B and C are speaking while the focus point participant A and the non-focus participant D are not speaking. The audio signals 1905 from participants A and D are received at the audio signal assessor 1955 as small data packets because these participants are not speaking. On the other hand, the audio signals 1905 from participants B and C are received as larger data packets. In some embodiments, the signal assessor 1955 determines that only participants B and C are speaking by examining the sizes of the audio data packets received from the participants.

In some embodiments, the audio codec 1900 does not perform the customized audio signal generating operations (i.e., decoding, mixing, encoding, etc.) on the audio signals from the non-speaking participants A and D. Thus, the audio signal assessor 1955 does not send the audio signals from participants A and D to their corresponding decoders.

The speaking participant B only needs to receive the audio of participant C, while participant C only needs to receive the audio of participant B. Accordingly, participant B's audio signal is sent directly from the signal assessor 1955 to the transmit buffer for participant C, while participant C's audio signal is sent directly from the signal assessor 1955 to the transmit buffer for participant B. Thus, in preparing the mixed audio signals for participants B and C, the audio codec is able to bypass all of the signal generation operations.

Each of the non-speaking participants A and D needs to receive the audio of participants B and C. Because neither A nor D is speaking, neither needs to receive any additional audio signals (i.e., A does not need D's signal and D does not need A's signal). As such, the audio signal assessor 1955 determines that the same mixed audio signal can be sent to participants A and D. Thus, these signals are only sent into audio mixer 1930 that corresponds to encoder D 1935 and not both this mixer and the local audio mixer. The output of this audio mixer is both (i) sent unencoded to the transmit buffer for the local speaker or speakers 1945 and also (ii) sent to the mixer's corresponding encoder 1935, where the mixed signal is encoded and sent to the transmit buffer 1960 for eventual transmission to participant D.

As noted above, when a participant specifies that they wish to not receive one or more of the other participants' audio signals, the participant's device sends metadata to the focus point along with their audio signal indicating these muting instructions. FIG. 21 illustrates the operation of the audio codec 1900 when some participants of the chat mute other participants' audio. As shown in FIG. 21, all four of the participants are speaking, but participants B and C have muted each other while participant D has muted participant A. These muting instructions are received at the audio signal assessor 1955 along with the audio packets from the four devices. The audio signal assessor 1955 processes these mute instructions to determine which received audio signals should be included in the various different mixed signals.

Based on the mute instructions, the audio signal assessor 1955 determines that participant A needs to receive the audio of participants B, C, and D, participant B needs to receive the audio of participants A and D, participant C needs to receive the audio of participants A and D, and participant D needs to receive the audio of participants B and C. Thus, the audio codec 1900 generates a mixed audio signal with the audio of participants A and D (in FIG. 21 using the audio mixer and encoder corresponding to participant B) and stores this mixed audio signal in a transmit buffer to send to both participants B and C. The audio codec 1900 also generates a mixed audio signal with the audio of participants B and C and stores this in a transmit buffer to send to participant D. Lastly, as participant A (at the focus point device) has not muted any of the other participants, the audio codec 1900 generates a mixed audio signal with the audio of participants B, C, and D that is stored in a transmit buffer to be played by the local speaker or speakers 1945. Processing resources are saved in this situation by not generating a separate mixed signal for participant C and by eliminating the muted signals from the mixes.

By selectively bypassing some or all of signal generating operations that are performed in generating a customized signal for a particular participant, the audio codec 1900 of some embodiments described above saves the focus computing device's computing resources. Because the amount of computing resources (e.g. CPU cycles or local memory) that the focus point computing device spends to produce the mixed signals is proportional to the amount of audio data it has to process and generate, the selective bypassing can save significant computing resources in some situations. These saved resources may be used for other performance-sensitive applications, such as the multiplayer game application that is running on the focus point computing device.

Figure 22:
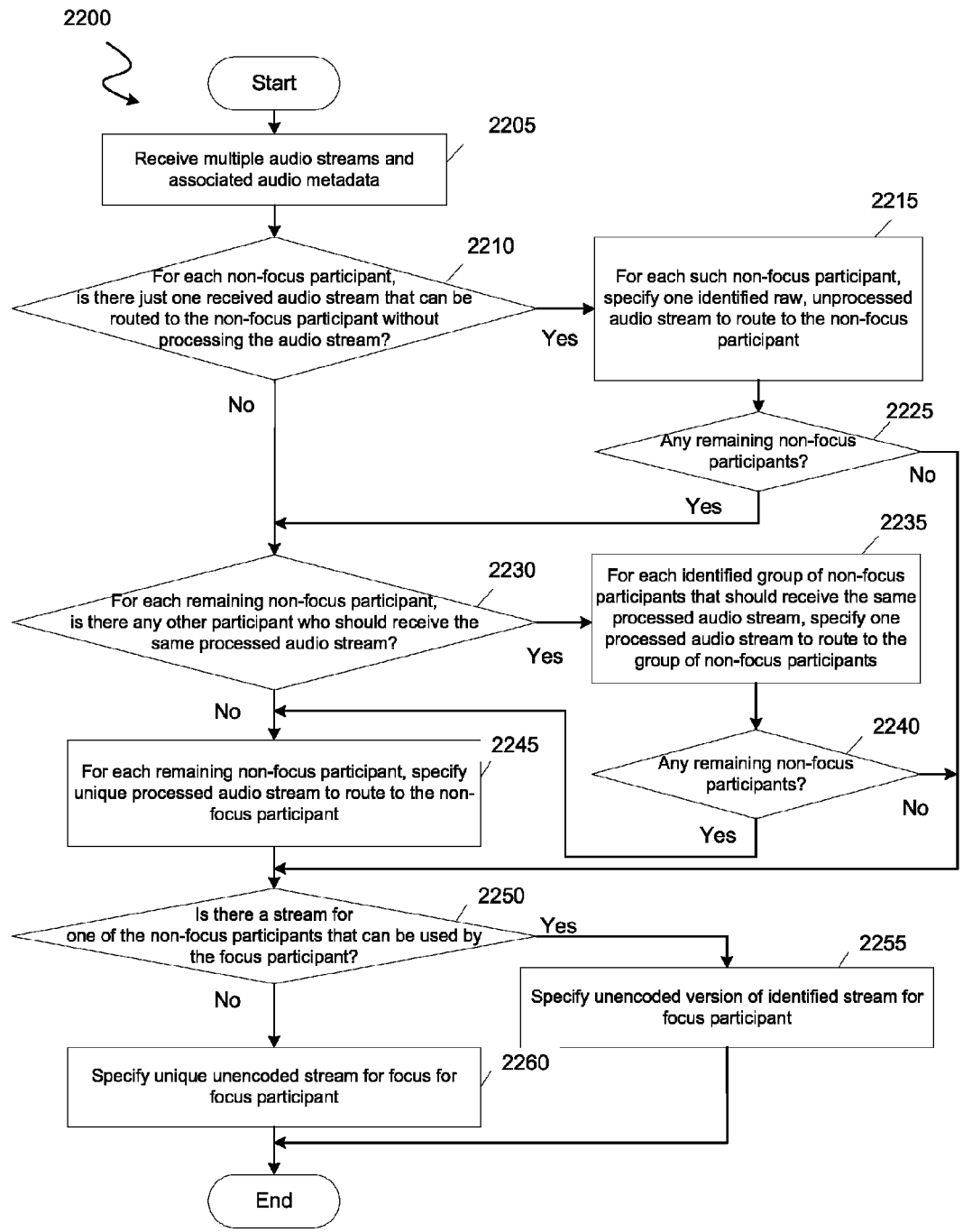
FIG. 22 conceptually illustrates an example of a process that some embodiments use to process audio signals.

FIG. 22 conceptually illustrates a process 2200 of some embodiments performed by a focus point computing device to optimize the audio processing of a focus point module. The focus point network in these embodiments is used to conduct an audio chat among at least three computing devices of the participants of the chat. In some embodiments, the process 2200 is performed by an audio signal assessor of an audio codec (e.g., audio codec 1955 in FIG. 19) of the focus point module. In some embodiments, the process 2200 starts after the focus point network is formed through the computing devices of the participants of the chat. In some embodiments, process 2200 runs at regular intervals (e.g., 25 times per second, 10 times per second, etc.) in order to continuously optimize the audio processing.

As shown in FIG. 22, the process begins by receiving (at 2205) audio streams from the participants' computing devices. In some embodiments, the audio streams from non-focus participants are sent from the non-focus modules of the non-focus computing devices. The process receives the focus participant's audio stream directly from the focus computing device. As described above, each audio stream is a stream of audio data packets in some embodiments.

The process also receives (at 2205) audio metadata from the participant's computing devices. As described above, audio metadata may include muting instructions in some embodiments. This metadata is generated by a first participant's computing device upon receiving the first participant's inputs. Such inputs might include, for example, the first participant's selection of participant(s) whose audio should be muted. This selection may involve clicking a mouse button or tapping a touchscreen to select a UI item, selecting an option through keyboard input, etc. With the muting indication from the first participant, the audio signal assessor will specify that the identified participant(s)' audio stream is not to be included in the audio stream sent to the first participant.

The process 2200 then determines (at 2210), for each non-focus participant, whether a single incoming audio stream can be routed to the participant without any processing. As described above, this will be the case when a particular participant only needs to receive audio from one other participant. This may occur when the particular participant has muted one or more other participants and/or one or more of the other participants are not speaking. For instance, participant C in FIG. 19 receives only the unprocessed audio stream of participant B because participant B is the only speaking participant at that time and participant C has not muted participant B.

When the process determines (at 2210) that there are one or more non-focus participants that should receive an unprocessed audio stream, the process specifies (at 2215) the one identified raw stream to route to each such non-focus participant. The process then determines (at 2225) whether there are any remaining non-focus participants whose audio streams have not yet been specified. When audio streams have been specified for all of the non-focus participants, the process proceeds to operation 2250, described below.

When there are remaining non-focus participants, the process determines (at 2230), for each remaining non-focus participant, whether there are any other participant(s) who should receive the same processed audio stream. As described above, this will be the case when two or more of the participants should receive the same set of audio signals. For instance, when two participants have muted each other, these participants will receive the same mixed audio signal (e.g., participants B and C in FIG. 21). Similarly, if two participants are not speaking while everyone else in the chat speaks, then those two participants will receive the same mixed audio signal. Various other combinations of muting instructions and silent participants can lead to multiple participants receiving the same audio stream.

When the process determines (at 2230) that at least two non-focus participants should receive the same processed audio stream, the process specifies (at 2235), for each group of participants sharing a mixed audio signal, one processed audio stream to route to the group of non-focus participants. Based on this specification, the audio codec will not separately generate a mixed audio stream for each of the participant in the group. The process then determines (at 2240) whether there are any remaining non-focus participants whose audio streams have not yet been specified. When audio streams have been specified for all of the non-focus participants, the process proceeds to operation 2250, described below.

When the process determines (at 2240) that there is at least one remaining non-focus participant whose audio stream has not been specified, the process then specifies (at 2245) a unique processed audio stream to route to each of the remaining non-focus participants. At this point, all of the streams for non-focus participants will have been specified.

The process 2200 then determines (at 2250) whether any of the streams for the non-focus participants can be used for the focus participant. That is, the process determines whether any of the mixed audio signals specified for the non-focus participants are the same combinations of audio as will be used for the focus participant. For instance, in FIG. 20, the focus participant A and the non-focus participant D both receive a mixed audio signal of participants B and C.

When a stream is specified for a non-focus participant that can be used for the focus participant, the process specifies (at 2255) that the focus participant should receive an unencoded version of the identified audio stream. Because the mixed audio signal will be played on the focus computing device rather than transmitted over a network, it should not be encoded. However, the mixing operations need not be duplicated, so as shown in FIG. 20, stream is sent from the audio mixer to both the transmit buffer for the focus device and an encoder for the non-focus device.

When there is no stream already specified that can be used for the focus participant, a unique unencoded stream is specified (at 2260) for the focus participant. In some cases, this may be the same unmixed single audio stream as one of the non-focus participants, except that it must be decoded first because it is played directly on the focus device. For instance, in FIG. 19, participants A, C, and D all receive only participant B's audio signal, but the stream for focus participant A must be decoded before being sent to the transmit buffer. The focus participant may also receive a unique mixed signal that is not encoded.

Having described in detail above a focus point network that is used to transmit audio data, subsection G will now describe a focus point network of some embodiments that is used to transmit video data in addition to audio data.

G. Video Data Through Dynamic Focus Point Network

As described above, some embodiments of invention use a focus point network to route audio data while a mesh network is routing game data between multiple computing devices so that the players using the computing devices can participate in an audio chat session while playing a multiplayer game. When a focus point computer device leaves the network (e.g., when its user shuts off the device or leaves the game), these embodiments dynamically designate a new focus point with minimal interruption to the audio chat.

In some embodiments, the focus network transmits video data while the mesh network is transmitting game data between the computing devices. In some embodiments, this is in addition to the audio data, such that the players can participate in an audio/video (A/V) conference while playing the multiplayer game using their computing devices. An example of such an A/V conference will now be described below by reference to FIG. 23.

Figure 23:
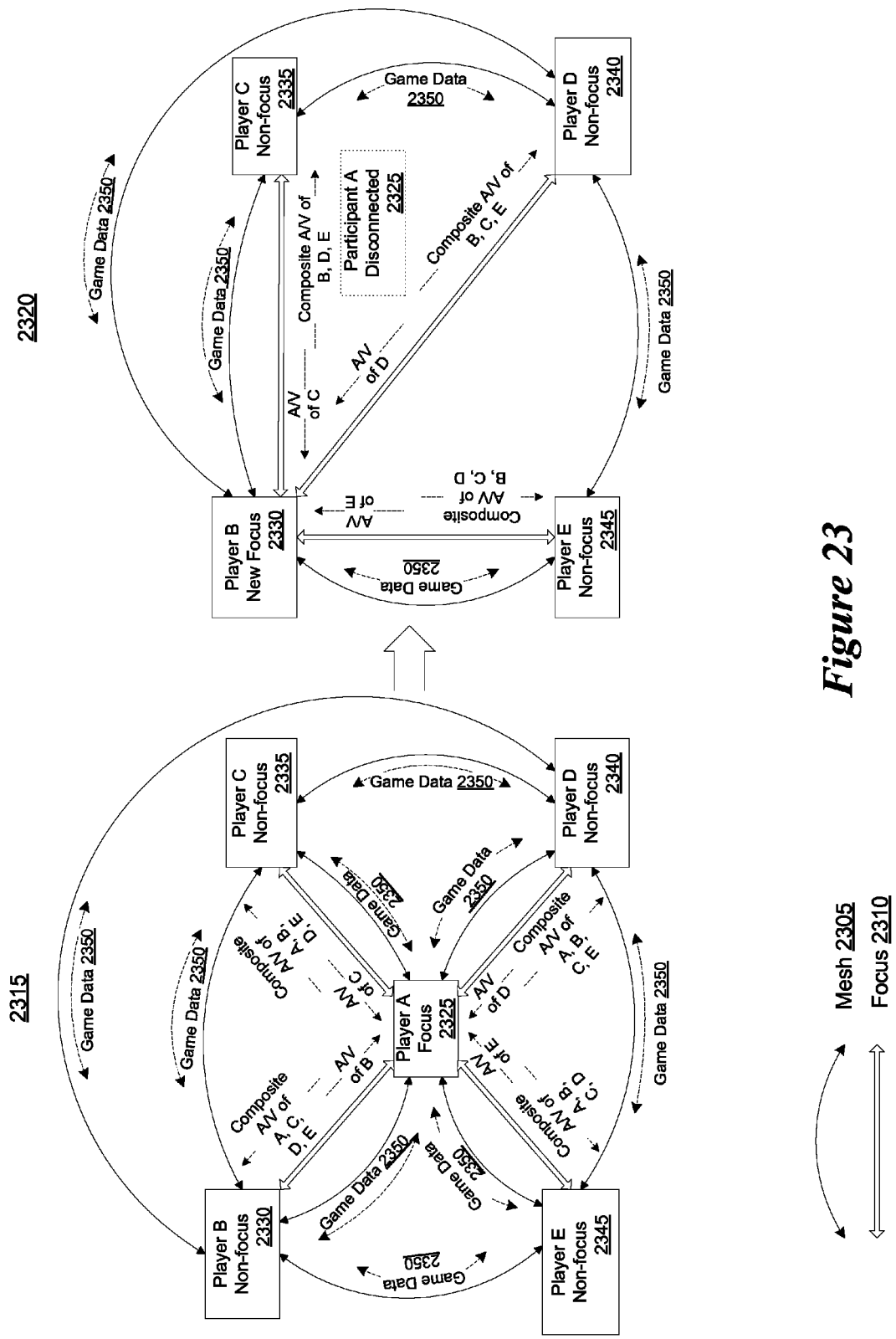
FIG. 23 illustrates some embodiments that use two networks to relay game data and audio/video data between multiple computing devices.

FIG. 23 illustrates an example of a game session that is facilitated through two networks, a mesh network 2305 for routing game data and a focus network 2310 for routing A/V data. FIG. 23 illustrates the game session in two stages: a first stage 2315 with a computing device 2325 serving as the focus point device and a second stage 2315 after computing device 2325 has dropped out of the game and a new focus point device is designated.

The first stage 2315 illustrates five players A-E at computing devices 2325-2345 playing a game together through the mesh network 2305 and having an A/V conference with each other through the focus network 2310. In some embodiments, the mesh network 2305 is first set up, and the focus network 2310 is set up when one of the participants initiates the A/V conference. As shown, at stage 2315, game data is being sent over links (illustrated as curved lines) of the mesh network.

A/V data (data that includes both audio and video signals) is sent over the links (illustrated by hollow straight lines) of the focus point network from the non-focus computing devices to the focus point computing device, which sends back (over the same links) composite A/V data. In some embodiments, the A/V data is audio and video data which are voices and images of the players captured and converted into data by the computing devices. Some examples of how the focus point computing device generates the composite A/V data are described in detail in the '378 application.

Having described using a focus network to transmit A/V data for an A/V conference among multiple computing devices, subsection H will now describe the software architecture of a computing device of some embodiments.

H. Examples of Software Applications

As described above, a computing device in some embodiments connects to both a focus point network and a mesh network to allow its user to participate simultaneously in a multiplayer game and an audio chat during the multiplayer game. In some cases, the computing device acts as the focus point computing device, receiving audio data from non-focus point computing devices, processing the audio data, and distributing the processed audio data to non-focus computing devices. In other cases, the computing device is a non-focus computing device, sending its audio data and receiving processed audio data from a focus point computing device. In either of these cases, the computing device also belongs to the mesh network through which it exchanges game data with the other computing devices.

Figure 24:
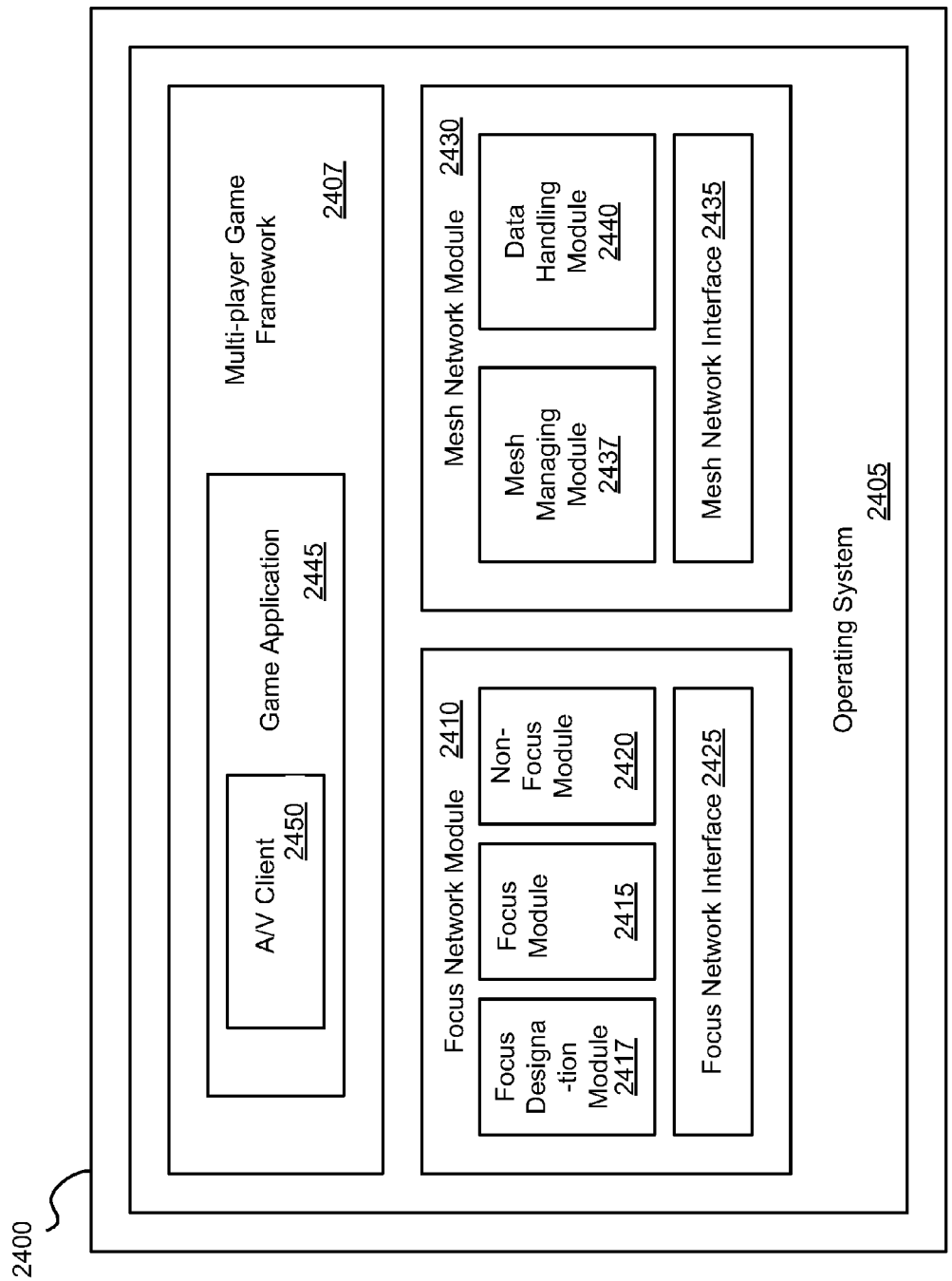
FIG. 24 illustrates an example of the architecture of the software applications of some embodiments.

The computing device of some embodiments includes several modules to enable to perform its mesh and focus/non-focus operations. FIG. 24 illustrates an example of some such modules for some embodiments of the invention. Specifically, this figure illustrates the software architecture 2400 of a computing device of some embodiments. The modules in this architecture allow the computing device to join a mesh network to exchange game data in a multi-participant game and to join a focus network to exchange audio data of the participants during the game. This architecture also supports the exchange of video data of the participants during the game.

As shown in FIG. 24, the architecture 2400 includes an operating system 2405, a focus point network module 2410, a mesh network module 2430, a multi-player game framework 2407, a game application 2445 running on top of the framework 2407, and an A/V client 2450 that is part of the game application. This figure also illustrates to show that the focus point network module 2410 includes four sub-modules: (1) focus point module 2415 (2) non-focus point module 2420, (3) focus designation module 2417, and (4) focus network interface module 2425, and the mesh point network module 2430 includes three sub-modules: (1) mesh network interface module 2435, (2) mesh managing module 2437, and (3) data handling module 2440. The functions of each module or application will be described first and then several possible configurations in which these applications and modules can operate will be described further below.

In some embodiments, the game framework 2407 provides a development tool kit to develop game applications for single or multiplayer games. This framework also provides in some embodiments several APIs and/or other instruction sets for game applications (like game application 2445) to use to set up and conduct their games.

The game application 2445 is an application that the computing device uses to participate in a game session for a single player or multiplayer game. This application sets up a multiplayer game by inviting other computing devices in some embodiments. In another embodiments, the application can join a multiplayer game session that has already been going on among similar applications running on other computing devices. The game application 2445 in some embodiments accesses a matchmaking server to receive a list of players to play the multiplayer game. An example of accessing a matchmaking server and receiving a list from the server is described above by reference to FIG. 6.

During a multiplayer game session, the game application 2445 generates game data and sends the data to the game applications running on the computing devices of the other players, through a mesh network that is created and managed by the mesh network modules 2430, as further described below. Through the mesh network, the game application 2445 also receives game data of the other players. The game application 2445 then processes the generated and received game data and renders representation of players (e.g., a racing car in a car racing game) in the game on the computing device based on the processed data.

The game application 2445 in some embodiments can use its A/V client 2450 to start or join a A/V conference (e.g., an audio chat session) during the multiplayer game session. In other words, the A/V client 2450 allows the computing device to participate, during a game session, in A/V conference with other game participants. To participate in an A/V conference during a game session, the computing device can initiate a multi-participant conference or can join a multi-participant conference that has been already set up by another computing devices.

During a multi-participant chat session, the A/V client can use the focus point network module 2410 when the application 2450 is serving as the focus point of the A/V client session, or the non-focus module 2420 when it is not serving as the focus point. The focus point module performs focus point audio/video processing operations when the A/V client application is the focus point for a multi-participant A/V conference. For example, the focus point module 2415 (1) receives A/V data from non-focus modules of non-focus computing devices in the focus network and (2) generates composite A/V data and distributes composite data to non-focus computing devices. Several examples of such audio/video processing operations are described above in previous sub-sections by reference to FIGS. 4, 19 and 22, and in the '378 application.

On the other hand, the non-focus point module 2420 performs non-focus point audio/video processing operations when the application is not the focus point of the A/V conference. For instance, the non-focus point module 2420 sends A/V data to the focus module of the focus point network through the focus network interface module 2425. Several examples of such audio/video processing operations by a non-focus computing device are described in the '378 application.

The focus designation module 2417 is used in some embodiments to perform some of focus point designation operations. For example, this module 2417 performs the focus-designation process (such as the process 800 of FIG. 8) that handles the beacon exchange (i.e., receives and sends beacons) when the focus point is being designated. In some embodiments, this module 2417 also directs records used in focus point designation operations to be sent by the computing device to another computing device. As described above by reference to FIG. 8, a record contains capability information relating to a computing device's capabilities as a focus point computing device. In some embodiments, these records are exchanged between the computing devices along the secondary links established during the focus designation process. In these or other embodiments, such records are or can be exchanged between the computing devices along the communication links of the mesh network.

The focus network interface module 2425 performs several operations. First, the focus network interface module 2425 in some embodiments monitors and manages the links that connect the computing device with other computing devices in the focus point network. The focus network interface module 2425 receives data (e.g., A/V content, records, etc.) from the focus network modules 2410 of the other computing devices, and routes the received data to the focus network module 2410 of the computing device. This interface module 2425 also receives data (i.e., A/V content, records, etc.) from the focus module 2415 (when the device is a focus device) of the computing device and routes this data to other destination computing devices through focus network links. Also, when any of focus network links is terminated for some reason (e.g., a router failure), the focus network interface module 2425 detects the termination and notifies the focus network module 2410 in some embodiments.

As shown in FIG. 24, the focus point network module 2410 in some embodiments is separate from the game applications so that it can be used by other non-game applications. In other embodiments, this module 2410 may be a module within A/V client application, or is a module within the game framework 2407 or the game application 2445.

In some embodiments, the mesh network module 2430 is part of the multi-participant game framework 2407, while in other embodiments this module 2430 is separate from the game framework 2407 as it is used by non-game applications. For the game application 2445 running on the computing device 2400, the mesh network module 2430 and its sub-modules 2435 and 2440 perform several operations. The mesh manager 2437 handles the processes for setting up the mesh networks. The data handling module 2440 handles the relaying of game data between the game application 2445 that executes on the computing device and the game applications executing on the other computing devices. Specifically, this module 2440 receives game data from game application 2445 and directs the data to the game applications running on the computing devices of the other players playing the game. The data handling module 2440 in some embodiments also receives game data from another computing device in the mesh network and determines whether, and if so how, the data should be directed to another computing device.

For the focus point designation operations, the data handling module 2440 in some embodiments receives beacons, records and/or other data from the other computing devices through the mesh network and passes them to the focus network module 2410. For the A/V conference, the data handling module 2440 in some embodiments passes A/V data received from another computing device through the mesh network to the A/V client application 2450. In some cases, the A/V data is composite A/V data coming from the focus point computing device. In other cases, the A/V data is from a non-focus point computing devices. In such cases, the data handling module 2440 also receives composite A/V data from the A/V client application 2450 and passes the data to the non-focus point computing device through the mesh network.

The data handling module 2440 sends and receives data to and from the computing devices in the mesh network via the mesh network interface module 2435 in some embodiments. To make the exchange of data possible, the mesh network interface module 2435 monitors and manages mesh-network links between the computing device and other computing devices in the mesh network. The module 2435 also detects when any of these links are terminated for some reasons (e.g., a router failure, powering off another computing device which the computing device of the player had a link established to) and notifies the data handling module 2440 in some embodiments.

In some embodiments, all sub-modules 2415, 2420, 2425, 2440, and 2435 of the focus network module 2410 and the mesh network module 2430 may be combined under one module and become a part of the A/V client 2450 or the game application 2445. In such embodiments, each application would be able to perform dynamic designation of a focus point computing devices using one or both of a mesh network and focus point network. In some embodiments, the applications and modules may be implemented using one or more Application Programming Interfaces (APIs) so that the applications and modules can be accessed through these APIs. APIs are described in detail further below in Section V.

Having described the dual network approach for conducting games and exchange participant A/V data during games, and the dynamic designation of focus computing device in such a network, the use of dynamic designation of the focus point in a non-game setting will now be described in Section III.

III. Dynamic Focus Point Network

A focus point network is used in some embodiments to conduct an A/V conference among multiple computing devices. To set up the focus point network, some embodiments designate a focus point device, and in case this device leaves the network (e.g., when its user shuts off the device), some of these embodiments dynamically designate a new focus point with minimal interruption to the A/V chat among the players. In some embodiments, a focus point network is formed when a computing device, as an initiator of a multi-participant A/V conference, invites the other computing devices to the A/V conference and these computing devices designate one of them as an initial focus point computing device.

Figure 25:
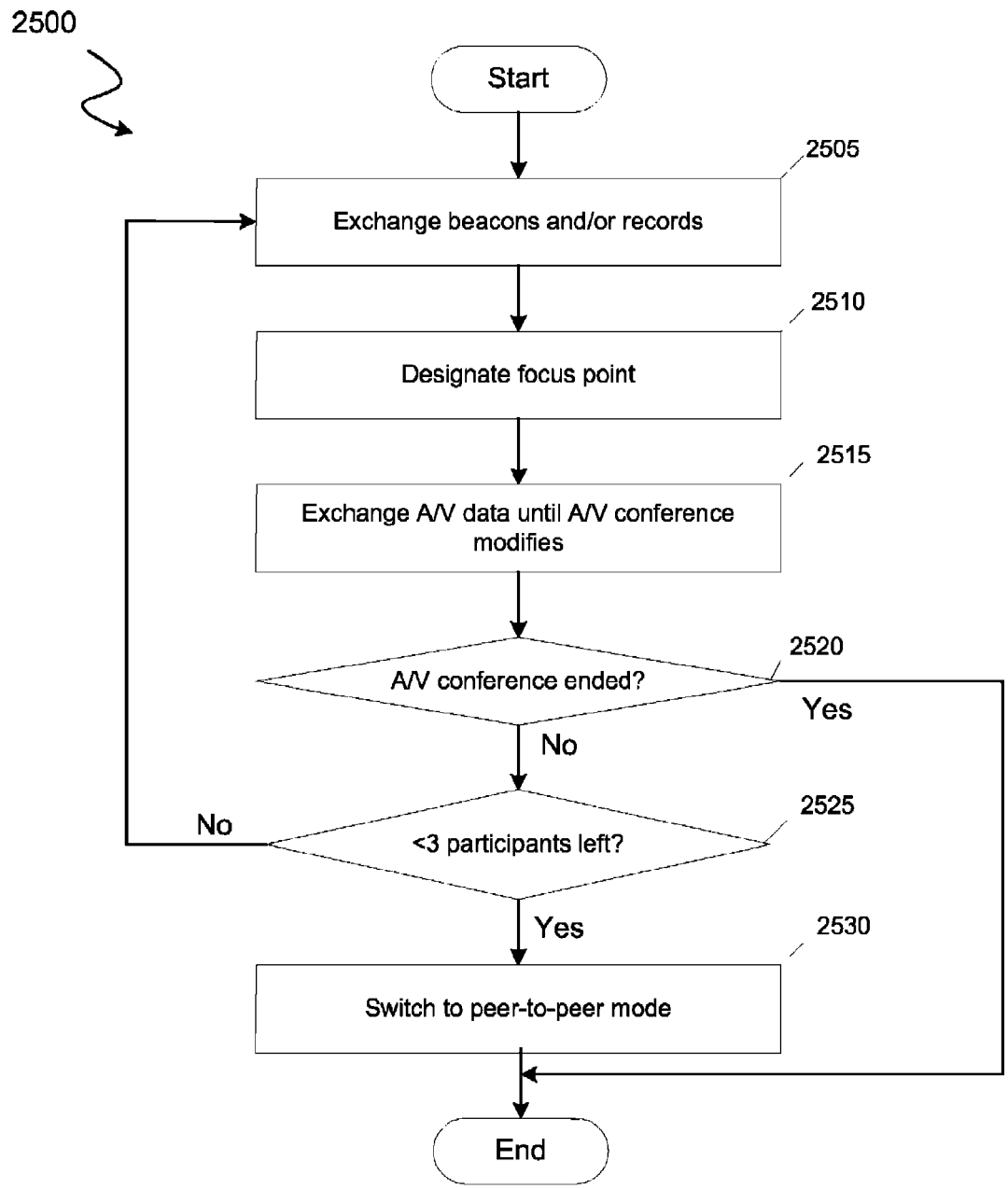
FIG. 25 conceptually illustrates an example of a process that some embodiments use to conduct an audio/video chat.

FIG. 25 conceptually illustrates a process that is used by several computing devices to conduct a multi-participant A/V conference. This process is performed by a computing device of an initiating participant that initiates the multi-participant A/V conference. This process is also performed by each of the computing devices of the participants who the initiating participant invites to the chat session.

In some embodiments, the process 2500 starts when the initiating computing device sends invitations to the computing devices of the participants being invited and receives acceptances from the invited computing devices. The process 2500 starts for an invited participant when his computing device receives an invitation from the initiating computing device and sends an acceptance to the initiating computing device.

The process 2500 initially exchanges (at 2505) beacons and/or records with other computing devices participating in the chat session. As described above by reference to FIG. 6, a beacon is data that indicates to another device the sender's desire to establish a link with receiver. A record is data containing capability information relating to a computing devices capabilities as a focus point computing device, as described above by reference to FIG. 8.

In some embodiments, the process exchanges (at 2505) records with other participating computing devices through the initiating computing device. The initiating computing device in some embodiments collects records from the invited computing devices and sends the records to each of the invited computing devices so that every computing device has everyone else's records. With everyone's record (i.e., with everyone's focus point capabilities), the process can select a computing device with the best focus point capabilities, at 2510, as further mentioned below.

In other embodiments, the process gets a list of other participating computing devices from the initiating computing device and then exchanges records with each of the other computing devices directly without going through the initiating computing device. Similar processes running on other participating computing devices will also perform exchanging records with other computing devices in this way. Therefore, in these cases, the process has a record from each of other participating computing devices and can select a computing device with best focus point capabilities.

In still other embodiments, the process gets a list of other participating computing devices from the initiating computing device and then attempts to set up and evaluate peer-to-peer links with each of the other participating computing devices through a beacon exchange process similar to the one described above by reference to FIG. 8. In this exchange process, the process 2500 in some embodiments exchanges records with other participating computing devices regarding the computing device's capabilities and associated network capabilities. In yet other embodiments, the process performs the beacon exchange, but all the beacons are routed through the inviting computing device.

Once the process has completed data exchange (at 2505) with other computing devices, the process designates (at 2510) a computing device with the best focus point capabilities as an initial focus point computing device. The process determines which computing device among the participating computing devices is most capable as a focus point computing device by analyzing and comparing the capability information contained in the data exchanged (at 2505) regarding all participating computing devices. In some embodiments, however, the initiating computing device may be designated as an initial focus point computing device regardless of its capabilities as a focus point computing device.

The process then exchanges (at 2515) A/V data with the other computing devices until there is a modification in the A/V conference. When the process is performed by a non-focus computing device, the process (at 2515) sends A/V data to the focus point computing device and receives composite A/V data from the focus point computing device. On the other hand, when the process is performed by a focus computing device, the process (at 2515) receives A/V data from the non-focus point computing devices, composites this data, and transmits composited A/V data to the computing devices.

In some embodiments, different A/V conference modifications might cause the process 2500 to transition out of 2515. Examples of such modifications might include one of the participating computing devices (including the device performing the process 2500) dropping from the A/V conference, or a new participant computing device joining the A/V conference. In some embodiments, a new computing device can join an ongoing A/V conference when it is invited by a participating computing device. The pending joining of the new device is then notified to other participating computing devices by the computing device inviting the new device. The inviting computing device may notify the other computing devices directly or by sending notification through the focus point computing device.

A participating computing device in some embodiments may leave the A/V conference for certain reasons. In some cases, the device leaves because the participant using the device may opt out of the A/V conference. In such cases, the device may directly notify the other participating computing devices of its leave or by sending notifications through the focus point computing device. In other cases, the device leaves the A/V conference because communication links that connected the device to other computing devices break. The links may break when the participant using the computing device powers off the device or a router that the computing device is behind fails. In those cases, the remaining computing devices can detect the disconnection of the computing device by recognizing the disappearance of the communication links with the disconnected computing device. Or, the focus point computing device may detect and notify the disconnection to other participating devices.

When the process 2500 transitions out of 2515, the process determines (at 2520) whether the A/V conference has ended for its device. In some cases, a A/V conference ends by mutual agreement of the participants and corresponding input to the computing devices. In other situations, a A/V conference ends for the computing device performing the process 2500 when the participant using the computing device turns off of the computing device or the computing device looses connection to the other computing devices.

When the process 2500 determines (at 2520) that the A/V conference has not ended for its computing device, it determines (at 2525) whether there are less than three computing devices remaining in the A/V conference. When the process determines (at 2525) that there are less than three computing device remaining in the A/V conference, the process switches (at 2530) to a peer-to-peer A/V conference mode with the other remaining computing device, and then ends. The process will exchange A/V data with that computing device until this two-participant A/V conference ends (i.e., until the A/V conference ends, or a new participant is added).

When the process 2500 determines (at 2525) that there are three or more computing devices remaining in the A/V conference, the process returns to 2505 to exchange beacons and/or records with the participating computing devices, then designates a new focus point device (at 2510), and then uses this device to exchange data until the next change in the A/V conference.

The process returns to 2505 because either a new computing device is joining the A/V conference or a participating computing device exited the A/V conference (and three or more participants remain in the A/V conference). In those cases when a new computing device is joining the A/V conference, the exchange of beacons and/or records as described above will take place among the participating computing devices including the new device, in order to determine who will be the best focus point at this stage of the A/V conference. If the new beacon exchange identifies a better focus computer than the one currently used, the process 2500 then selects (at 2510) a new focus point computing device and uses this device for the next round of content exchange.

When a participating computing device exited the A/V conference, the exchange of beacons and/or records takes place among the remaining computing devices. In some embodiments, the process may exchange records with other computing devices through the focus point computing device, instead of the initiating computing device. When the exited device was not the focus point device, and the new beacon exchange identifies a better focus computer than the one currently used, the process 2500 then selects (at 2510) a new focus point computing device and uses this device for the next round of content exchange.

On the other hand, the computing device leaving the A/V conference might be the focus point computing device. As described above, a computing device leaving an A/V conference may notify the remaining computing devices of its leaving or the device leaves the session because the links connecting the device to the other computing devices fails for some reasons described above.

When the focus point computing device notifies the remaining computing devices, the process in some embodiments continues to use the focus point computing device for a short period of time until they have designated a new focus point device after the new round of beacon and/or record exchange at 2505. Once the exchange is done, the focus point computing device exits A/V conference and may be disconnected from the remaining computing devices.

In some cases, the focus point computing drops out of the A/V conference because the links connecting to the other participating computing devices fail. In this situation, the A/V conference in some embodiments stalls for a period of time and no A/V data is being exchanged for that period of time. Thus, no video or sound will be played on each remaining computing device for that period of time until the remaining devices exchange beacons and/or records to designate a new focus point computing device. Some embodiments also stall the A/V conference in cases where the focus point device actively disconnects from the A/V conference.

To address the drop out scenario, or to address the focus point device actively terminating its participation in the A/V conference, some embodiments do not implement either of the two approaches mentioned above (i.e., do not continue using the focus point device while a new focus point is designated and do not have a period during which they stall the A/V conference and determine a new focus point device). Instead, these embodiments start using a remaining computing device that was next on a sorted list of potential focus point device. After switching to this new focus device, some embodiments perform the beacon and/or record exchange to identify which device is best focus point to use, and in some embodiments, then switch to this new focus point device.

In some embodiments, the process transitions from 2525 to 2510 and not 2505, because it does not exchange beacons and/or records at this stage and instead use the previously exchanged records to pick a new focus point computing device among the remaining computing devices.

Figure 26:
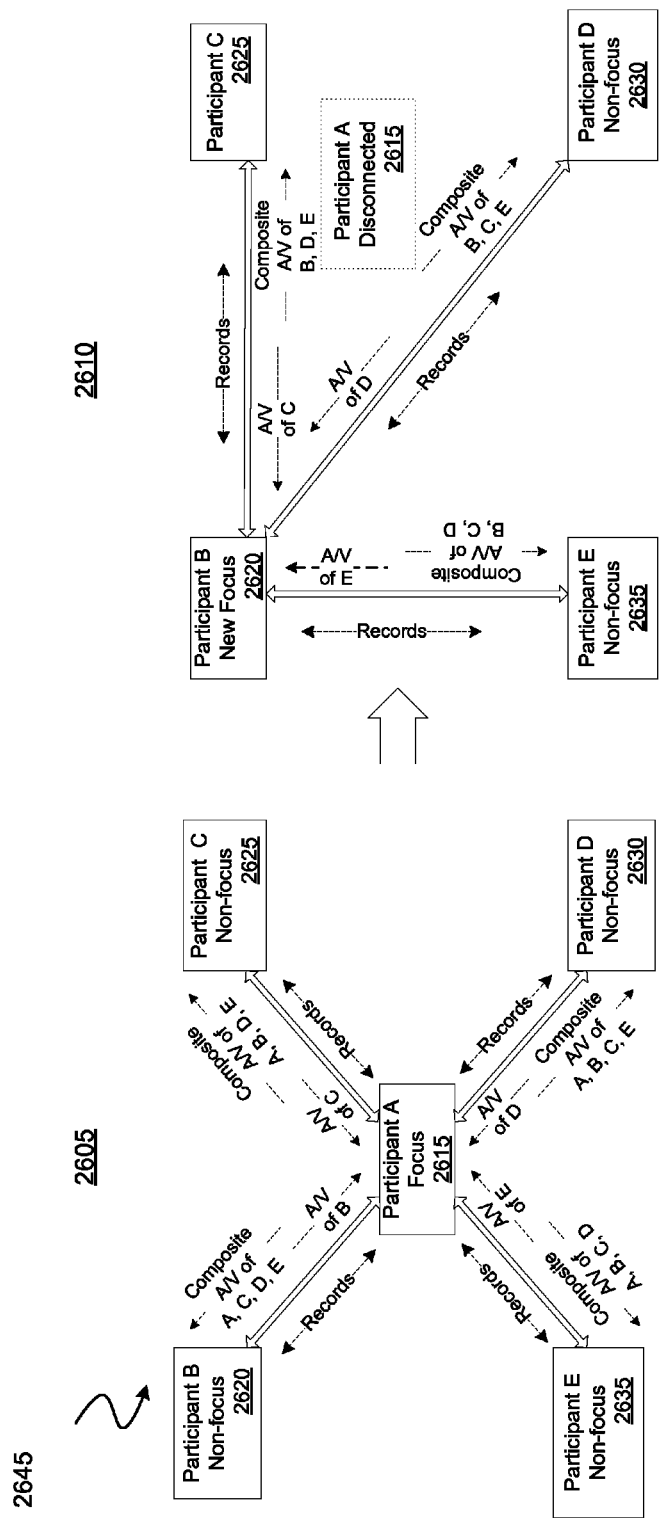
FIG. 26 illustrates a focus network of some embodiments conducting an audio chat.

FIG. 26 illustrates the operation of an exemplary focus point network 2645 through which multiple computing devices are exchanging A/V data. This figure illustrates the A/V conference in two stages 2605 and 2610. The first stage 2605 shows five participants A, B, C, D and E chatting through the focus network 2645 and the computing device 2615 (of player A) serving as the focus point computing device. The second stage 2610 shows four participants B, C, D, and E continuing their chat after participant A departs from the A/V conference. The second stage 2610 further shows that after participant A's departure, the computing device 2620 (of player B) is dynamically identified and designated as the focus point device, in order to allow the A/V chat among the participants to continue through this device and the focus point network.

FIG. 26 shows computing devices 2615-2635 of the participants A-E, A/V data, records, links depicted as hollow lines, dotted lines depicting directions of data flow. The computing devices 2615-2635 are computing devices that participants A-E, respectively, are using to participate in the A/V conference. The computing devices 2615 is the focus point computing device of the focus point network 2600 and the other computing devices 2615-2635 are non-focus computing devices. The A/V data in some embodiments is the voice and video images of the participants captured and converted into A/V data by the computing devices. The A/V data are exchanged among the computing devices through the links depicted as hollow lines. As described above by reference to FIG. 8, a record contains capability information relating to the focus point capabilities of each computing device. The records are exchanged among the computing devices through the links depicted as hollow lines in some embodiments. These links and the computing devices connected by the links make up the focus point network 2645.

Before the first stage 2605, the computing device 2615 of participant A had initiated the A/V conference and invited other computing devices 2620-2635 of participants B-E. As the computing devices 2620-2635 of participants B-E were joining the focus network 2645, these computing devices exchanged records with each other through the initiating computing device 2615 through the links between the joining devices and the initiating computing device as shown. As described above, the computing device 2615 becomes the focus point computing device in some embodiments because it initiated the chat. In some other embodiments, the computing device 2615 is designated as the focus point device based on the analysis of the records by each participating computing device. The operation of the focus network 2645 is similar to the operation of focus networks in some embodiments described above in Section II.

The second stage 2610 shows non-focus point computing devices 2620-2635 continuing a A/V conference through a focus point network after an initial focus point computing device disconnects from the focus network. Specifically, the second stage 2610 shows that after the focus point computing device 2615's departure, the computing device 2620 (of participant B) is dynamically identified and designated as the focus point device, in order to allow the A/V chat among the participants to continue through this device and the focus point network.

As shown in the second stage 2610, the computing device 2615, depicted as a dotted box, is disconnected from the focus network 2645. All the links that connected the computing device 2615 with the other computing devices through the focus network 2645 are terminated and not depicted in the third stage 2650. The remaining computing devices 2620-2635 of participants B-E are connected through the focus network 2645.

The exchange of the A/V data is stalled right after the initial focus point computing device 2615 disconnects from the focus point network 2645 and becomes unavailable to collect and distribute the A/V data in some embodiments. However, in other embodiments, one of the remaining computing devices 2620-2635 is designated as a permanent or temporary new focus computing device based on the previous record exchange of the computing devices in order to minimize this stalling. Each of the computing devices 2620-2635 in some embodiments already has the record of each of the other computing devices as each computing device has received the record from the focus point computing device 2615 through the focus point network 2645 at the first stage 2605. In other embodiments, the computing device 2615 makes itself available for the remaining computing devices 2620-2635 to exchange records through until a new focus point is designated. As shown in the stage 2650, once the computing device 2620 of participant is designated as the new focus point computing device, the exchange of A/V data resumes and the A/V conference continues among the computing device 2620-2635.

Figure 27:
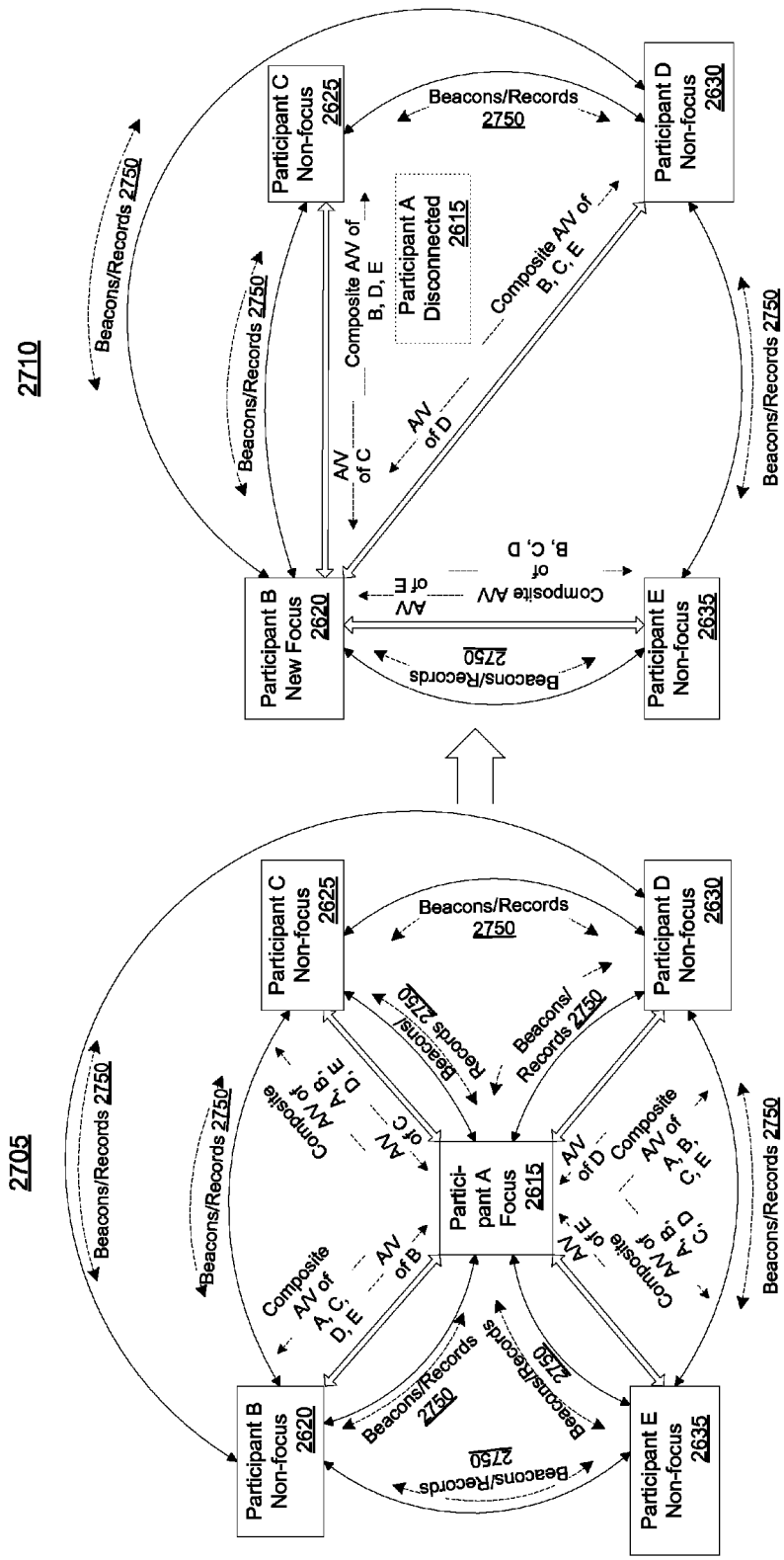
FIG. 27 illustrates the operation of an exemplary focus point network through which multiple computing devices exchange A/V data.

FIG. 27 illustrates the operation of another exemplary focus point network 2645 through which multiple computing devices are exchanging A/V data. FIG. 27 illustrates the A/V conference in two stages 2705 and 2710. FIG. 27 shows the same computing devices 2615-2635 of the participants A-E as in FIG. 26. These devices exchange A/V data and records along links depicted as hollow lines, with dotted lines depicting directions of data flow. In addition, FIG. 27 shows beacons and records exchanged by the computing devices.

As shown, the computing devices 2615-2635 exchange beacons and records directly with each other without going through the initiating or focus point computing device 2625 as described above by reference FIG. 26. The operation of designating an initial focus point and a new focus point after the initial device drops out of the A/V conference is similar to such operation described above by reference to FIG. 8.

Having described several exemplary embodiments of dual network approach, Section IV will now describe APIs that some of these embodiments can be implemented in.

IV. Application Programming Interfaces

As described above, software applications (e.g., an audio processing application or A/V conference application) and modules (e.g. focus point module, mesh network module) may be implemented using one or more Application Programming Interfaces (APIs) so that the applications and modules can be accessed through these APIs.

Some of the functions described in the sections above are implemented through APIs such as are described in the following section. In some embodiments, some of these APIs are exposed to game developers who build games that make calls to the APIs in order to access various functions. Functions accessed through APIs may include, for example, mesh network and focus network setup, audio/video conferencing during a game, the definition and transfer of game data, etc.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 28:
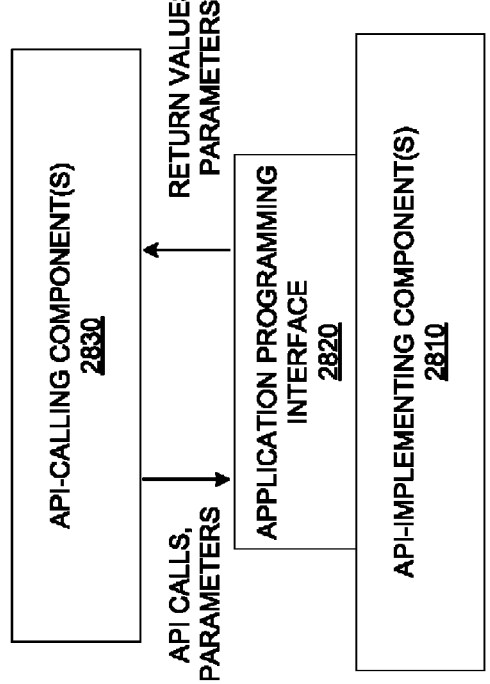
FIG. 28 illustrates an API architecture used in some embodiments.

FIG. 28 is a block diagram illustrating an API architecture, which may be used in some embodiments of the invention. As shown in FIG. 28, the API architecture 2800 includes the API-implementing component 2810 (e.g., an operating system, a library, a device driver, an API, an application program, software or other module) that implements the API 2820. The API 2820 specifies one or more functions, methods, classes, objects, protocols, data structures, formats and/or other features of the API-implementing component that may be used by the API-calling component 2830. The API 2820 can specify at least one calling convention that specifies how a function in the API-implementing component receives parameters from the API-calling component and how the function returns a result to the API-calling component. The API-calling component 2830 (e.g., an operating system, a library, a device driver, an API, an application program, software or other module), makes API calls through the API 2820 to access and use the features of the API-implementing component 2810 that are specified by the API 2820. The API-implementing component 2810 may return a value through the API 2820 to the API-calling component 2830 in response to an API call.

It will be appreciated that the API-implementing component 2810 may include additional functions, methods, classes, data structures, and/or other features that are not specified through the API 2820 and are not available to the API-calling component 2830. It should be understood that the API-calling component 2830 may be on the same system as the API-implementing component 2810 or may be located remotely and accesses the API-implementing component 2810 using the API 2820 over a network. While FIG. 28 illustrates a single API-calling component 2830 interacting with the API 2820, it should be understood that other API-calling components, which may be written in different languages (or the same language) than the API-calling component 2830, may use the API 2820.

The API-implementing component 2810, the API 2820, and the API-calling component 2830 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 29:
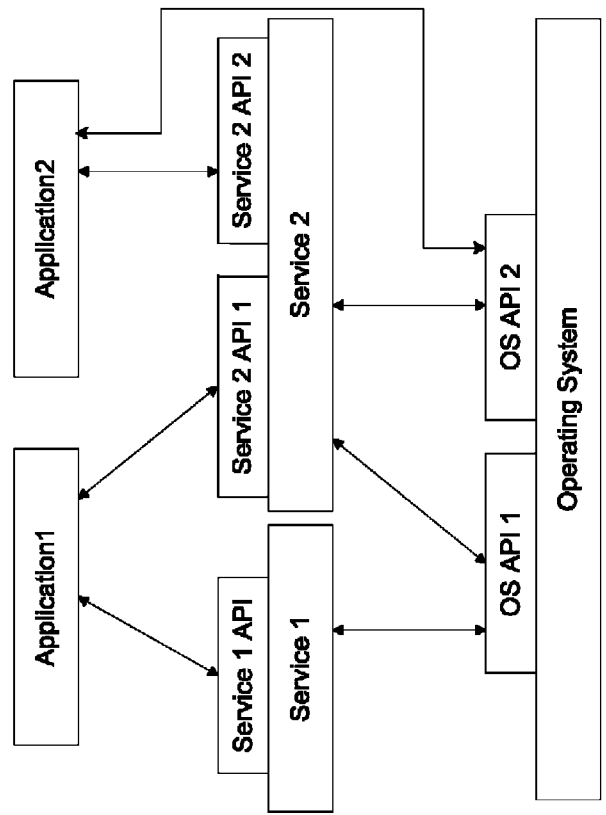
FIG. 29 illustrates an example of how APIs may be used according to some embodiments.

In FIG. 29, an example of how APIs may be used, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

V. Computing Device

Many of the above-described processes and modules are implemented as software processes that are specified as a set of instructions recorded on a non-transitory computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor. Examples of non-transitory computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computing devices define one or more specific machine implementations that execute and perform the operations of the software programs.

Figure 30:
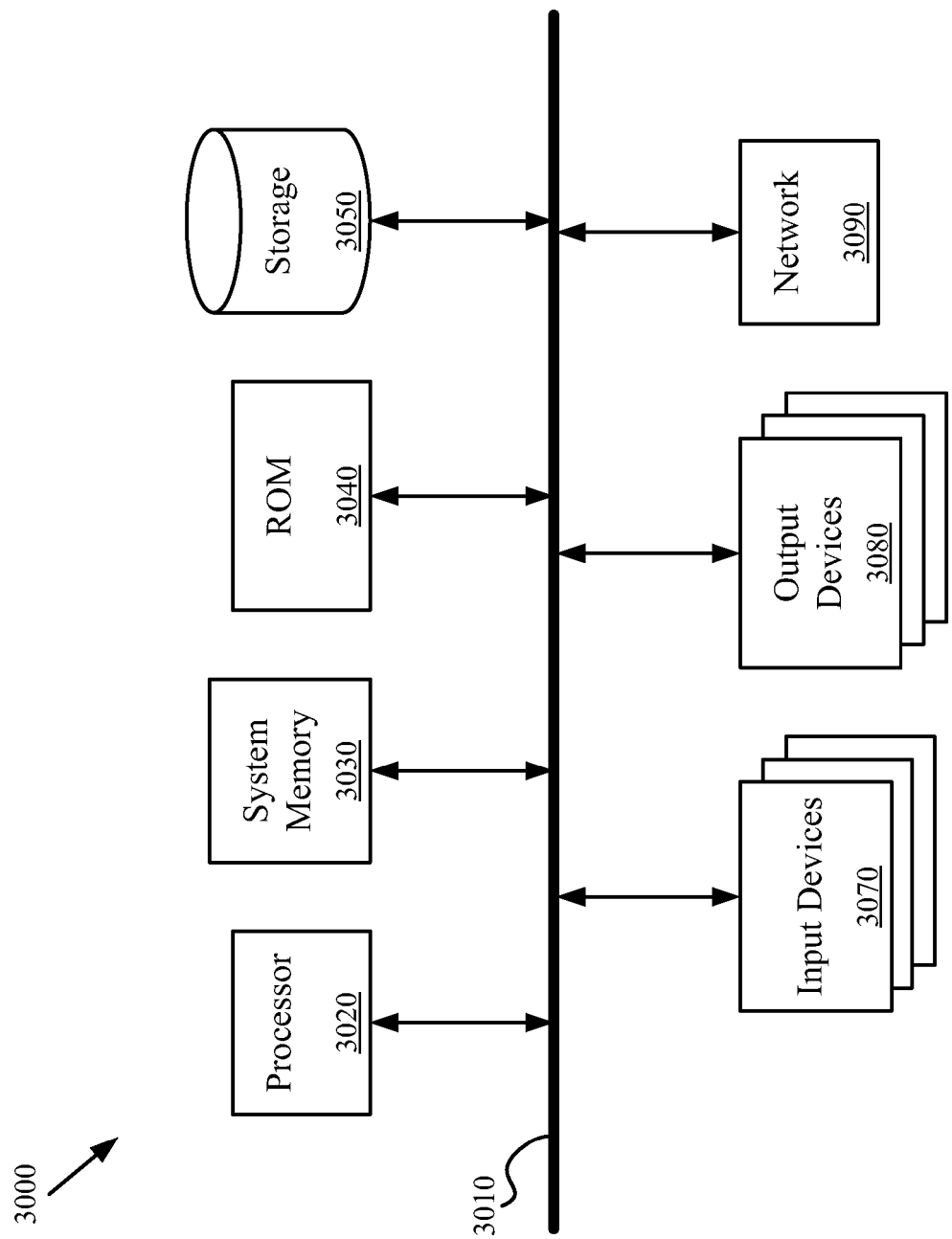
FIG. 30 illustrates a computing device with which some embodiments of the invention are implemented.

FIG. 30 conceptually illustrates a computing device 3000 with which some embodiments of the invention are implemented. For example, the computing device described above by reference to FIGS. 1-27 may be at least partially implemented using sets of instructions that are run on the computing device 3000. As another example, the processes described by reference to FIGS. 6-8, and 22 may be at least partially implemented using sets of instructions that are run on the computing device 3000.

Such a computing device includes various types of non-transitory computer readable mediums and interfaces for various other types of non-transitory computer readable mediums. Computing device 3000 includes a bus 3010, at least one processing unit (e.g., a processor) 3020, a system memory 3030, a read-only memory (ROM) 3040, a permanent storage device 3050, input devices 3070, output devices 3080, and a network connection 3090. The components of the computing device 3000 are electronic devices that automatically perform operations based on digital and/or analog input signals. The various examples of user inputs described by reference to FIGS. 6-7 may be at least partially implemented using sets of instructions that are run on the computing device 3000 and displayed using the output devices 3080.

One of ordinary skill in the art will recognize that the computing device 3000 may be embodied in other specific forms without deviating from the spirit of the invention. For instance, the computing device may be implemented using various specific devices either alone or in combination. For example, a local PC may include the input devices 3070 and output devices 3080, while a remote PC may include the other devices 3010-3050, with the local PC connected to the remote PC through a network that the local PC accesses through its network connection 3090 (where the remote PC is also connected to the network through a network connection).

The bus 3010 collectively represents all system, peripheral, and chipset buses that communicatively connect the numerous internal devices of the computing device 3000. In some cases, the bus 3010 may include wireless and/or optical communication pathways in addition to or in place of wired connections. For example, the input devices 3070 and/or output devices 3080 may be coupled to the system 3000 using a wireless local area network (W-LAN) connection, Bluetooth®, or some other wireless connection protocol or system.

The bus 3010 communicatively connects, for example, the processor 3020 with the system memory 3030, the ROM 3040, and the permanent storage device 3050. From these various memory units, the processor 3020 retrieves instructions to execute and data to process in order to execute the processes of some embodiments. In some embodiments the processor includes an FPGA, an ASIC, or various other electronic components for execution instructions.

The ROM 3040 stores static data and instructions that are needed by the processor 3020 and other modules of the computing device. The permanent storage device 3050, on the other hand, is a read-and-write memory device. This device is a non-volatile memory unit that stores instructions and data even when the computing device 3000 is off. Some embodiments of the invention use a mass-storage device (such as a magnetic or optical disk and its corresponding disk drive) as the permanent storage device 3050.

Other embodiments use a removable storage device (such as a floppy disk, flash drive, or CD-ROM) as the permanent storage device. Like the permanent storage device 3050, the system memory 3030 is a read-and-write memory device. However, unlike storage device 3050, the system memory 3030 is a volatile read-and-write memory, such as a random access memory (RAM). The system memory stores some of the instructions and data that the processor needs at runtime. In some embodiments, the sets of instructions and/or data used to implement the invention's processes are stored in the system memory 3030, the permanent storage device 3050, and/or the read-only memory 3040. For example, the various memory units include instructions for processing multimedia items in accordance with some embodiments.

The bus 3010 also connects to the input devices 3070 and output devices 3080. The input devices 3070 enable the user to communicate information and select commands to the computing device. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 3080 include printers, electronic display devices that display still or moving images, and electronic audio devices that play audio generated by the computing device. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computing device.

Finally, as shown in FIG. 30, bus 3010 also couples computer 3000 to a network 3090 through a network adapter (not shown). In this manner, the computer can be a part of a network of computers (such as a local area network ("LAN"), a wide area network ("WAN"), an Intranet, or a network of networks, such as the Internet. For example, the computer 3000 may be coupled to a web server (network 3090) so that a web browser executing on the computer 3000 can interact with the web server as a user interacts with a GUI that operates in the web browser.

Figure 31:
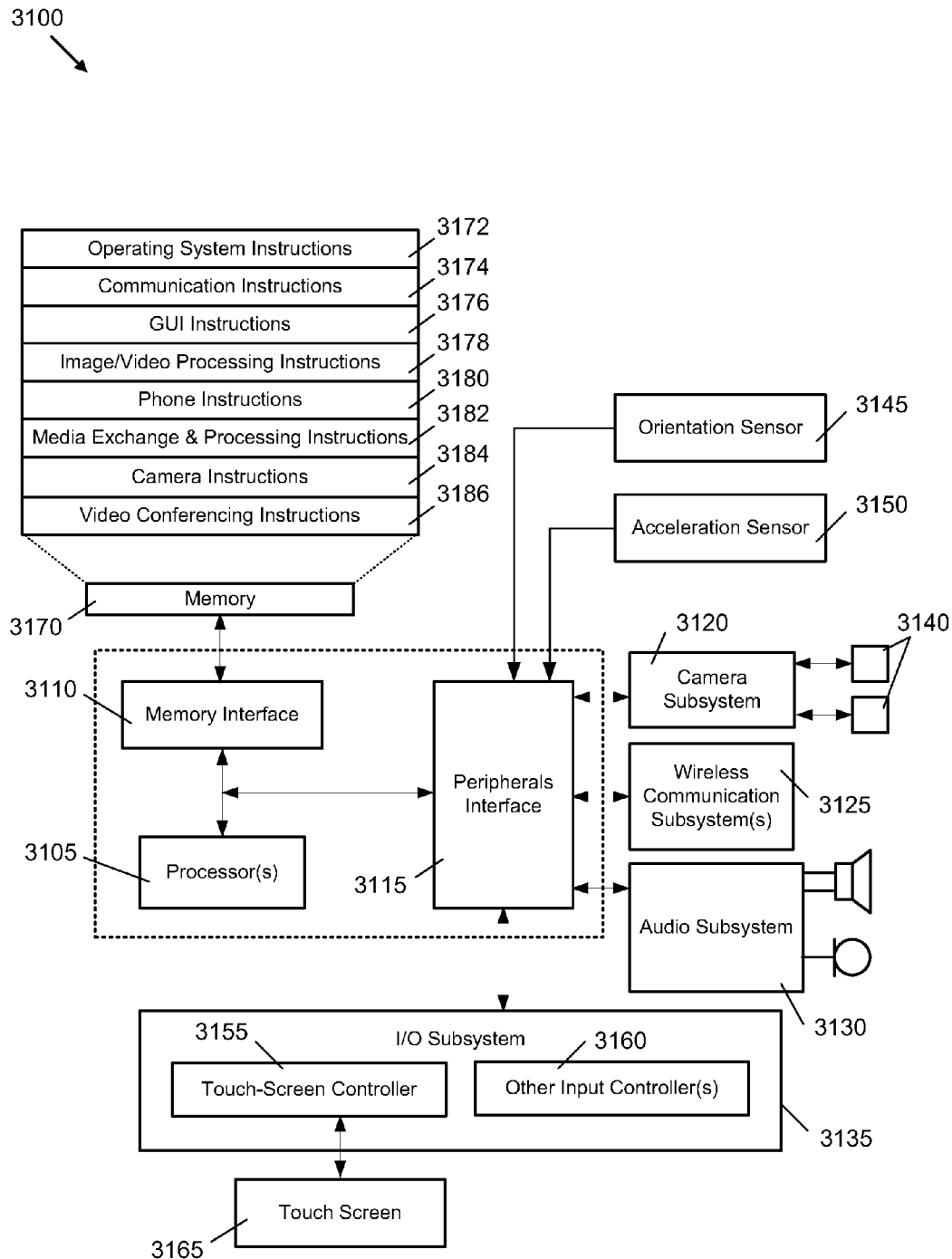
FIG. 31 conceptually illustrates a computing device with which some embodiments of the invention are implemented.

FIG. 31 conceptually illustrates a computing device 3100 with which some embodiments of the invention are implemented. Specifically, FIG. 31 is an example of a mobile computing device. The implementation of a mobile computing device can include one or more processing units 3105, memory interface 3110 and a peripherals interface 3115. Each of these components that make up the computing device can be separate components or integrated in one or more integrated circuits. These various components can also be coupled together by one or more communication buses or signal lines.

The peripherals interface 3115 can be coupled to various sensors and subsystems, including a camera subsystem 3120, a wireless communication subsystem(s) 3125, audio subsystem 3130, I/O subsystem 3135, etc. The peripherals interface 3115 enables communication between processors and peripherals. Peripherals such as an orientation sensor 3145 or an acceleration sensor 3150 can be coupled to the peripherals interface 3115 to facilitate the orientation and acceleration functions.

The camera subsystem 3120 can be coupled to one or more optical sensors 3140, e.g., a charged coupled device (CCD) optical sensor, a complementary metal-oxide-semiconductor (CMOS) optical sensor. The camera subsystem 3120 coupled with the sensors may facilitate camera functions, such as image and/or video data capturing. The camera subsystem 3120 can be used to generate video data for an A/V conference illustrated by reference to FIG. 23.

Wireless communication subsystems 3125 may serve to facilitate communication functions. Wireless communication subsystems 3125 may include one or more transceivers (with each transceiver including a receiver and transmitter), such as one or more radio or optical transceivers, etc. For instance, in some embodiments, the wireless communication subsystems 3125 include a cellular radio transceiver (e.g., 3G or 4G transceiver), a Bluetooth transceiver, and a WiFi transceiver. Through their data channel circuits that utilize standard data protocols (such as IP layer protocols), such transceivers allow the mobile device to connect to different communication networks and different computing devices. For instance, in some embodiments, the WiFi transceiver allows the mobile device to connect to both the mesh and focus networks discussed above, in order to exchange game data along the mesh network and audio data along the focus network. Alternatively, the mobile device in some embodiments can connect to different networks through different transceivers. For example, the WiFi transceiver can be used in some embodiments to connect to mesh network while the cellular radio transceiver can be used in some embodiments to connect to the focus point network, or vice versa. In some embodiments, the different transceivers share hardware resources on the mobile device. For instance, two or more of the transceivers are fully or partially implemented by one or more processing units of the processor 3105 in some embodiments.

The audio subsystems 3130 is coupled to a speaker and a microphone to facilitate voice-enabled functions, such as voice recognition, digital recording, etc. I/O subsystem 3135 involves the transfer between input/output peripheral devices, such as a display, a touch screen, etc., and the data bus of the CPU through the Peripherals Interface. I/O subsystem 3135 can include a touch-screen controller 3155 and other input controllers 3160 to facilitate these functions. Touch-screen controller 3155 can be coupled to the touch screen 3165 and detect contact and movement on the screen using any of multiple touch sensitivity technologies. Other input controllers 3160 can be coupled to other input/control devices, such as one or more buttons.

Memory interface 3110 can be coupled to memory 3170, which can include high-speed random access memory and/or non-volatile memory such as flash memory. Memory can store an operating system (OS) 3172. The OS 3172 can include instructions for handling basic system services and for performing hardware dependent tasks.

Memory can also include communication instructions 3174 to facilitate communicating with one or more additional devices; graphical user interface instructions 3176 to facilitate graphic user interface processing; image/video processing instructions 3178 to facilitate image/video-related processing and functions; phone instructions 3180 to facilitate phone-related processes and functions; media exchange and processing instructions 3182 to facilitate media communication and processing-related processes and functions; camera instructions 3184 to facilitate camera-related processes and functions; and video conferencing instructions 3186 to facilitate video conferencing processes and functions. The above identified instructions need not be implemented as separate software programs or modules. Various functions of mobile computing device can be implemented in hardware and/or in software, including in one or more signal processing and/or application specific integrated circuits.

As mentioned above, some embodiments include electronic components, such as microprocessors, storage and memory that store computer program instructions in a non-transitory machine-readable or computer-readable medium (alternatively referred to as computer-readable storage media, machine-readable media, or machine-readable storage media). Some examples of such non-transitory computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The non-transitory computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computing device", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to non-transitory, tangible, and physical objects that store information in a form that is readable by a computer. These terms exclude any wireless signals, wired download signals, and/or any other ephemeral signals.

It should be recognized by one of ordinary skill in the art that any or all of the components of computing device 3000 or computing device 3100 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks (e.g., the focus network module 2410, the mesh network module 2430, etc.), one of ordinary skill in the art would recognize that some embodiments may combine these modules into a single functional block or element. One of ordinary skill in the art would also recognize that some embodiments may divide a particular module into multiple modules.

In addition, a number of the figures (including FIGS. 6-8, 22, and 25) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium of a first computing device of a first participant in a multi-participant communication session, the machine readable medium storing computer program instructions executable by at least one processing unit to cause the first computing device to perform:
    joining a star network comprising a plurality of computing devices that includes a second computing device acting as a central network hub for distributing content in the multi-participant communication session, wherein each particular computing device is used by a particular participant in the multi-participant communication session;
    exchanging content with other computing devices through the second computing device of a second participant that (i) generates content of the second participant, (ii) receives content from each computing device in the star network, (iii) composites the generated and received content, and (iv) distributes the composited content to said each computing device in the star network;
    determining that the second computing device should no longer be the central network hub for the communication session;
    while maintaining the communication session, dynamically identifying a third computing device of a third participant as a new central network hub; and
    exchanging content with other computing devices through the third computing device, wherein the third computing device of the third participant (i) generates content of the third participant, (ii) receives content from other computing devices in the star network, (iii) composites the generated and received content, and (iv) distributes the composited content to said each computing device in the star network.

2. The non-transitory machine readable medium of claim 1, wherein the program instructions are further executable to perform exchanging data with the other computing devices to identify the third computing device as the new central network hub after determining that the second computing device should no longer be the central network hub.

3. The non-transitory machine readable medium of claim 1, wherein the program instructions are further executable to perform exchanging data with the other computing devices to identify the third computing device as the new central network hub before determining that the second computing device should no longer be the central network hub.

4. The non-transitory machine readable medium of claim 1, wherein said identifying the third computing device comprises:
    sending central network hub capabilities of the first computing device to other computing devices; and
    receiving central network hub capabilities of the other computing devices.

5. The non-transitory machine readable medium of claim 4, wherein central network hub capabilities comprises at least one of (i) device type of the computing device, (ii) type of Network Address Translation (NAT) router the computing device is behind, (iii) number of links that a computing device can establish with the other computing devices, and (iv) quality of the links, wherein a link is either a physical or logical connection between two computing devices.

6. The non-transitory machine readable medium of claim 5, wherein the device type comprises at least one of (i) the speed of the computing device's Central Processing Unit (CPU), and (ii) memory capacity of the computing device.

7. The non-transitory machine readable medium of claim 5, the quality of links comprises at least one of (i) bandwidth of each link, and (ii) bit error rate of each link.

8. The non-transitory machine readable medium of claim 5, wherein said identifying the new central network hub is based on the number of links.

9. The non-transitory machine readable medium of claim 5, wherein said number of links is adjusted based on other central network hub capabilities.

10. The non-transitory machine readable medium of claim 1, wherein said identifying the third computing device comprises exchanging data with other computing devices through the second computing device regarding capabilities of the remaining computing devices as a central network hub.

11. The non-transitory machine readable medium of claim 1, wherein said identifying the third computing device comprises exchanging data with other computing devices through another network regarding capabilities of the remaining computing devices as a central network hub.

12. The non-transitory machine readable medium of claim 1, wherein said determining that the second computing device should no longer be the central network hub comprises detecting disconnection of a link that connected the first and second computing devices.

13. The non-transitory machine readable medium of claim 1, wherein said determining that the second computing device should no longer be the central network hub comprises receiving a notification message from the second computing device before the second computing devices stops participating in the communication session.

14. The non-transitory machine readable medium of claim 13, wherein said identifying the third computing device comprises exchanging data with other computing devices through the second computing device regarding capabilities of the remaining computing devices as a central network hub.

15. The non-transitory machine readable medium of claim 1, wherein said identifying the new central network hub comprises the first computing device using an algorithm that each of the other computing devices uses.

16. The non-transitory machine readable medium of claim 15, wherein said identifying the new central network hub is based on exchanged data that each of the other computing devices also has.

17. The non-transitory machine readable medium of claim 1, wherein the program instructions are further executable to perform:
  determining whether there are less than three remaining computing devices when it is determined that the second computing device no longer is participating in the communication; and
  exchanging content with the other remaining computing device when it is determined there are two remaining computing devices including the first computing device.

18. The non-transitory machine readable medium of claim 1, wherein the program instructions are further executable to perform:
  determining that the third computing device no longer is participating in the communication session;
  identifying dynamically a fourth computing device as a new central network hub based on the exchanged data;
  exchanging content with other computing devices through the fourth computing device.

19. A method for a first computing device to participate in a communication session among a plurality of computing devices through a first network, the method comprising:
  the first computing device joining a star network comprising a plurality of computing devices that includes a second computing device acting as a central network hub for distributing content in a multi-participant communication session, wherein each particular computing device is used by a particular participant in the multi-participant communication session;
  the first computing device exchanging content with other computing devices through the second computing device of a second participant that (i) generates content of the second participant, (ii) receives content from each computing device in the star network, (iii) composites the generated and received content, and (iv) distributes the composited content to said each computing device in the star network;
  the first computing device determining that the second computing device should no longer be the central network hub for the communication session;
  while maintaining the communication session, the first computing device dynamically identifying a third computing of a third participant device as a new central network hub; and
  the first computing device exchanging content with other computing devices through the third computing device, wherein the third computing device of the third participant (i) generates content of the third participant, (ii) receives content from other computing devices in the star network, (iii) composites the generated and received content, and (iv) distributes the composited content to said each computing device in the star network.

20. The method of claim 19, wherein said identifying the third computing device comprises:
  sending central network hub capabilities of the first computing device to other computing devices; and
  receiving central network hub capabilities of the other computing devices.

21. The method of claim 19, wherein said identifying the third computing device comprises exchanging data with other computing devices through another network regarding capabilities of the remaining computing devices as a central network hub.

22. A computing device of a first participant in a multi-participant communication session, the computing device comprising:
  communication circuitry for communicating in a network; and
  processing hardware coupled to the communication circuitry, wherein the processing hardware and the communication circuitry are configured to:
  join a star network comprising a plurality of computing devices that includes a second computing device acting as a central network hub for distributing content in the multi-participant communication session, wherein each particular computing device is used by a particular participant in the multi-participant communication session;
  exchange content with other computing devices through the central network hub that (i) generates content of the participant, (ii) receives content from each computing device in the star network, (iii) composites the generated and received content, and (iv) distributes the composited content to said each computing device in the star network; and
  determine that the second computing device should no longer be the central network hub for the communication session;
  while maintaining the communication session, dynamically identify a third computing device of a third participant as a new central network hub, wherein the third computing device of the third participant (i) generates content of the third participant, (ii) receives content from other computing devices in the star network, (iii) composites the generated and received content, and (iv) distributes the composited content to said each computing device in the star network.

23. The computing device of claim 22, wherein said determining that the second computing device should no longer be the central network hub for the communication session and said dynamically identifying the third computing device uses the same data that other devices use to determine the new central network hub.

24. The computing device of claim 22, wherein said determining that the second computing device should no longer be the central network hub is performed when a disconnect with the second computing device is detected.

25. The computing device of claim 22, wherein said identifying the third computing device as the new central network hub is based on data exchanged with the other computing devices through the second computing device.

26. The non-transitory machine readable medium of claim 1, wherein the first computing device and the other computing devices in the multi-participant communication session identify the same third computing device as the new central network hub.

* * * * *